United States Patent
Xing et al.

(10) Patent No.: US 12,501,305 B2
(45) Date of Patent: Dec. 16, 2025

(54) PROXIMITY SERVICE COMMUNICATION METHOD, MANAGEMENT NETWORK ELEMENT, TERMINAL DEVICE, AND COMMUNICATION SYSTEM

(71) Applicant: HUAWEI TECHNOLOGIES CO., LTD., Shenzhen (CN)

(72) Inventors: Weijun Xing, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 18/154,337

(22) Filed: Jan. 13, 2023

(65) Prior Publication Data

US 2023/0156513 A1     May 18, 2023

Related U.S. Application Data

(63) Continuation of application No. PCT/CN2021/095982, filed on May 26, 2021.

(30) Foreign Application Priority Data

Jul. 16, 2020 (CN) .......................... 202010685765.9

(51) Int. Cl.
H04W 28/02     (2009.01)
H04W 48/16     (2009.01)
(Continued)

(52) U.S. Cl.
CPC ....... *H04W 28/0226* (2013.01); *H04W 48/16* (2013.01); *H04W 64/003* (2013.01);
(Continued)

(58) Field of Classification Search
CPC ... H04W 28/0226; H04W 4/021; H04W 4/80; H04W 48/16; H04W 64/003;
(Continued)

(56) References Cited

U.S. PATENT DOCUMENTS

2014/0066018 A1* 3/2014 Zhu ...................... H04W 12/02
455/411
2015/0141001 A1* 5/2015 Neubacher .............. H04L 69/24
455/552.1
(Continued)

FOREIGN PATENT DOCUMENTS

CN          110166977 A     8/2019

OTHER PUBLICATIONS

Extended European Search Report issued in corresponding European Application No. 21841655.0, dated Nov. 29, 2023, pp. 1-8.
(Continued)

*Primary Examiner* — Kashif Siddiqui
(74) *Attorney, Agent, or Firm* — HAUPTMAN HAM, LLP

(57) ABSTRACT

This application provides a proximity service communication method, a communication apparatus, and a communication system. When a terminal device requests a communication resource corresponding to a first sidelink, a management network element may determine, based on location information of the terminal device, whether the terminal device is located in a geographic area in which the terminal device can use a first application through a sidelink, to determine whether to provide a proximity service parameter for the terminal device. This limits, at an application granularity, sidelink communication used by the terminal device.

18 Claims, 21 Drawing Sheets

(51) Int. Cl.
*H04W 64/00* (2009.01)
*H04W 72/25* (2023.01)
*H04W 72/51* (2023.01)
*H04W 76/18* (2018.01)

(52) U.S. Cl.
CPC .......... *H04W 72/25* (2023.01); *H04W 72/51* (2023.01); *H04W 76/18* (2018.02)

(58) Field of Classification Search
CPC ..... H04W 72/25; H04W 72/51; H04W 76/18; H04W 8/005; H04W 92/18
See application file for complete search history.

(56) References Cited

U.S. PATENT DOCUMENTS

| | | | | |
|---|---|---|---|---|
| 2016/0044725 | A1* | 2/2016 | Enomoto | H04W 8/005 370/329 |
| 2016/0330604 | A1* | 11/2016 | Kim | H04W 72/56 |
| 2018/0124584 | A1* | 5/2018 | Venkatraman | H04W 76/14 |
| 2019/0158993 | A1* | 5/2019 | Kwon | H04L 1/1893 |
| 2019/0289459 | A1* | 9/2019 | Shan | H04W 76/25 |
| 2019/0394624 | A1 | 12/2019 | Karampatsis et al. | |
| 2020/0374828 | A1* | 11/2020 | Ying | H04W 4/50 |
| 2023/0127601 | A1* | 4/2023 | Kousaridas | H04W 40/12 455/432.1 |

OTHER PUBLICATIONS

3GPP TS 23.303 V16.0.0 3rd Generation Partnership Project; Technical Specification Group Services and System Aspects; Proximity-based services (ProSe); Stage 2(Release 16), Technical Specification, Jul. 2020, 130 pages.

3GPP TR 23.752 V0.4.0 (Jun. 2020), 3rd Generation Partnership Project; Technical Specification Group Services and System Aspects; Study on system enhancement for Proximity based Services (ProSe) in the 5G System (5GS) (Release 17), 115 pages.

Chinese Office Action issued in corresponding Chinese Application No. 202010685765.9, dated May 30, 2022, pp. 1-8.

* cited by examiner

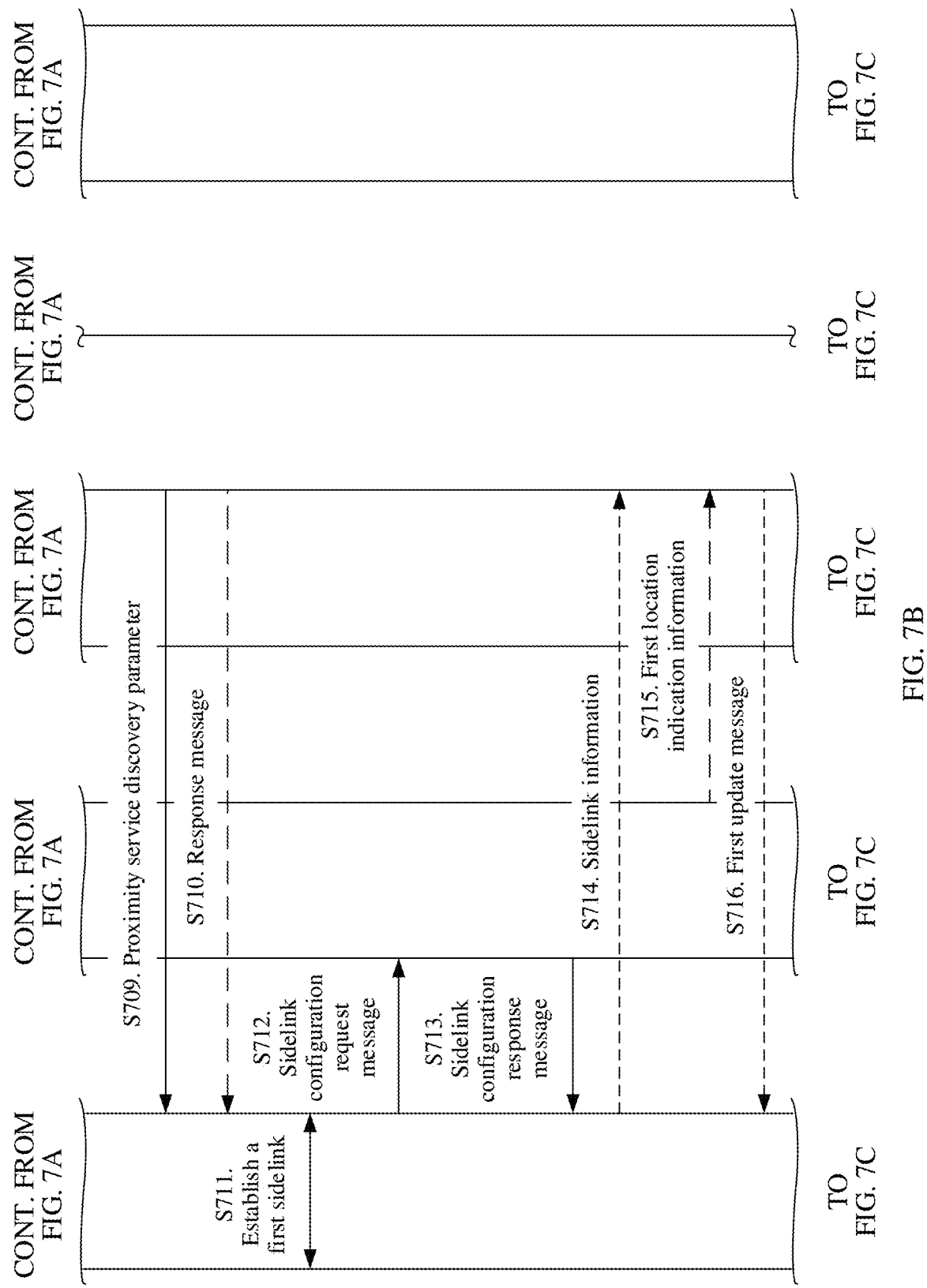

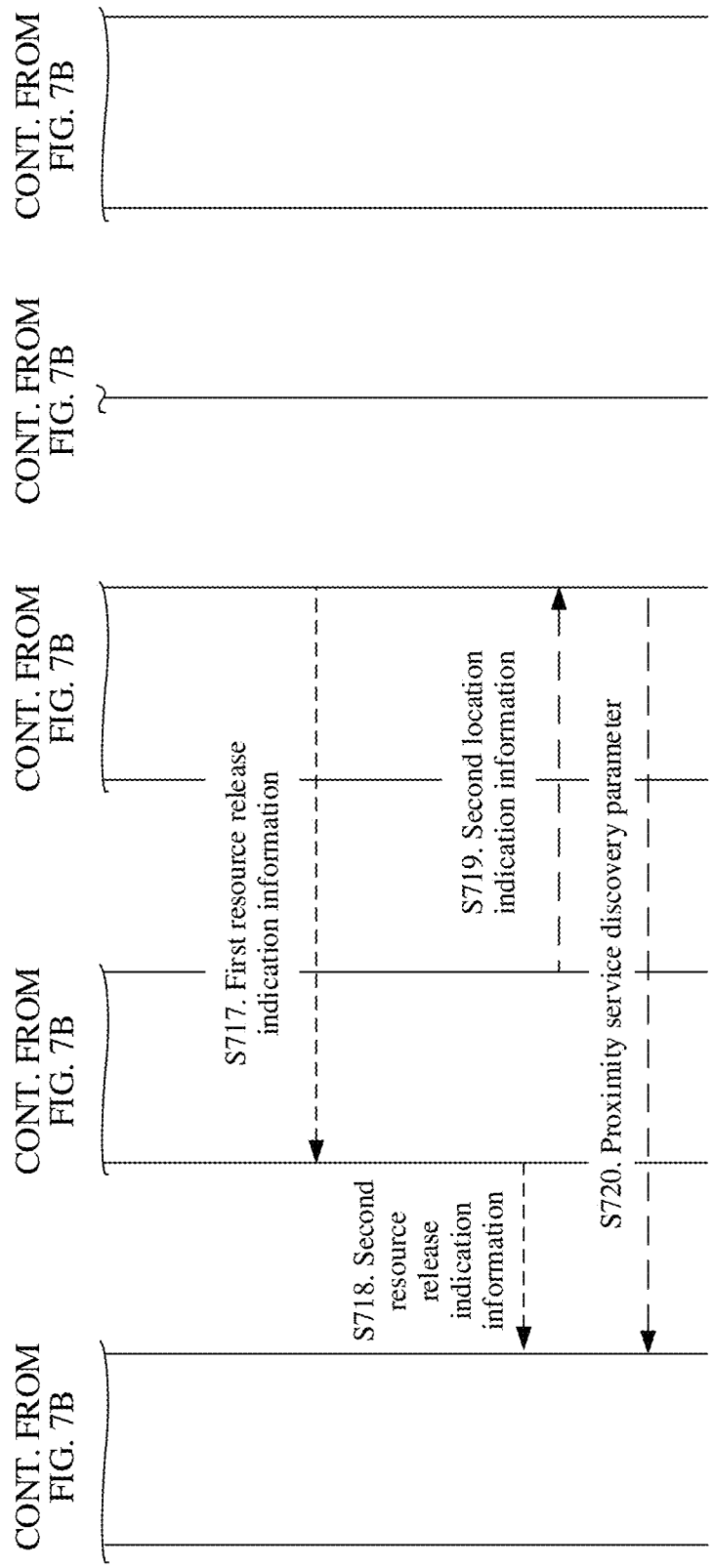

PROXIMITY SERVICE COMMUNICATION METHOD, MANAGEMENT NETWORK ELEMENT, TERMINAL DEVICE, AND COMMUNICATION SYSTEM

CROSS-REFERENCE TO RELATED APPLICATIONS

This application is a continuation of International Patent Application No. PCT/CN2021/095982, filed on May 26, 2021, which claims priority to Chinese Patent Application No. 202010685765.9, filed on Jul. 16, 2020. The disclosures of the aforementioned applications are hereby incorporated by reference in their entireties.

TECHNICAL FIELD

This application relates to the communication field, and more specifically, to a proximity service communication method, a management network element, a terminal device, and a communication system.

BACKGROUND

To improve wireless spectrum utilization and provide a cellular network service for a terminal device without cellular network coverage, proximity-based service (ProSe) communication is introduced into a cellular communication network. In the ProSe communication, a proximal terminal device may directly establish a communication link without performing forwarding communication by using an access network device.

In a ProSe communication manner, an application function (AF) sends, to a policy control function (PCF), information about an area in which a terminal device can use an application through sidelink communication, and the PCF sends the area information to an access and mobility management function (AMF). The AMF sends, based on the area information, authorization information to an access network device in an area indicated by the area information, where the authorization information indicates that the terminal device can use the sidelink communication. Then, the access network device may determine, based on whether the authorization information is stored, whether to provide a sidelink communication resource for the sidelink communication for the terminal device.

In the foregoing manner, the AF limits a sidelink communication area at an application granularity, and the AMF provides sidelink authorization information for the access network device at a terminal device granularity. To be specific, for the terminal device, if sidelink communication in an area is limited, all applications of the terminal device in the area cannot use the sidelink communication. This processing manner is obviously improper, but currently there is no related solution for limiting, at the application granularity, the sidelink communication used by the terminal device.

SUMMARY

This application provides a proximity service communication method, a communication system, and a communication apparatus, so as to limit, at an application granularity, sidelink communication used by a terminal device.

According to a first aspect, a proximity service communication method is provided. The method includes: A management network element receives a request message from a terminal device, where the request message includes information about a first application, the request message requests a proximity service discovery parameter of the first application, and the proximity service discovery parameter is used by the terminal device to discover another terminal device that uses the first application. The management network element obtains information about a first geographic area in which the terminal device is allowed to use the first application through a sidelink, and location information of the terminal device. When a geographic area indicated by the location information is located in the first geographic area, the management network element sends the proximity service discovery parameter to the terminal device.

It should be understood that the information about the first application indicates the first application, and the information about the first application may be an identifier of the first application, an identifier of a service corresponding to the first application, or the like.

According to the proximity service communication method provided in this application, when the terminal device requests a communication resource corresponding to a first sidelink, the management network element may determine, based on the location information of the terminal device, whether the terminal device is located in the geographic area in which the terminal device can use the first application through the sidelink, to determine whether to provide a proximity service parameter for the terminal device. This limits, at an application granularity, sidelink communication used by the terminal device.

In some implementations of the first aspect, the method further includes: When the geographic area indicated by the location information is not in the first geographic area, the management network element sends a response message to the terminal device, where the response message notifies the terminal device that the management network element rejects allocation of the proximity service discovery parameter.

In some implementations of the first aspect, the method further includes: The management network element obtains first location indication information of the terminal device; and when the first location indication information indicates that the terminal device is not in the first geographic area, the management network element sends a first update message to the terminal device, where the first update message notifies the terminal device that the proximity service discovery parameter becomes invalid.

Based on this solution, when the terminal device leaves the first geographic area, the management network element may indicate to the terminal device that the previously allocated proximity service discovery parameter of the first application becomes invalid, so that the terminal device can be controlled not to use the first application when the terminal device is not in the first geographic area.

Optionally, the first update message further notifies a cause why the proximity service discovery parameter becomes invalid.

In some implementations of the first aspect, the method further includes: The management network element receives second location indication information of the terminal device; and if the second location indication information indicates that the terminal device is located in the first geographic area, the management network element sends a second update message to the terminal device, where the second update message is for allocating the proximity service discovery parameter.

Based on this solution, when the terminal device returns to the first geographic area again, the proximity service discovery parameter of the first application may be re-allocated to the terminal device.

Optionally, the second location indication information further indicates a cause why the proximity service discovery parameter is allocated the terminal device.

In some implementations of the first aspect, before that the management network element sends a first update message to the terminal device, the method further includes: The management network element receives sidelink information from the terminal device, where the sidelink information includes an identifier of a first sidelink established by the terminal device for the first application and information about the first application. When the first location indication information of the terminal device indicates that the terminal device is not in the first geographic area, the method further includes: The management network element sends first resource release indication information to an access network device, where the first resource release indication information includes the identifier of the first sidelink, the first resource release indication information is for releasing a resource for establishing the first sidelink, and/or the first resource release indication information indicates the access network device to release a communication resource corresponding to the first sidelink.

Based on this solution, when the terminal device leaves the first geographic area, a resource used by the terminal device to establish a sidelink and/or a resource used by the terminal device to perform communication through a sidelink may be released. This facilitates proper utilization of resources.

According to a second aspect, a proximity service communication method is provided. The method includes: A terminal device sends a request message to a management network element, where the request message includes information about a first application, the request message requests a proximity service discovery parameter of the first application, and the proximity service discovery parameter is used by the terminal device to discover another terminal device that uses the first application. The terminal device receives the proximity service discovery parameter from the management network element. The terminal device establishes, based on the proximity service discovery parameter, a first sidelink with the another terminal device that uses the first application, and obtains, from an access network device, a communication resource corresponding to the first sidelink. When the terminal device is not in a first geographic area, the terminal device receives a first update message from the management network element, where the first update message notifies the terminal device that the proximity service discovery parameter becomes invalid, and the first geographic area is a geographic area in which the terminal device is allowed to use the first application through a sidelink.

According to the proximity service communication method provided in this application, when the terminal device leaves the first geographic area, the management network element may indicate to the terminal device that the previously allocated proximity service discovery parameter of the first application becomes invalid, so that the terminal device can be controlled not to use the first application when the terminal device is not in the first geographic area.

Optionally, the first update message further notifies a cause why the proximity service discovery parameter becomes invalid.

In some implementations of the second aspect, the method further includes: When the terminal device returns to the first geographic area again, the terminal device receives a second update message from the management network element, where the second update message is for allocating the proximity service discovery parameter.

In some implementations of the second aspect, before that the terminal device receives a first update message from the management network element, the method further includes: The terminal device sends sidelink information to the management network element, where the sidelink information includes an identifier of the first sidelink and information about the first application.

In some implementations of the second aspect, the obtaining, from an access network device, a communication resource corresponding to the first sidelink includes: sending a sidelink configuration request message to the access network device, where the sidelink configuration request message includes the identifier of the first sidelink, and the sidelink configuration request message requests the access network device to configure, for the terminal device, the communication resource corresponding to the first sidelink; and receiving a sidelink configuration response message from the access network device, where the sidelink configuration response message is for configuring the communication resource corresponding to the first sidelink.

In some implementations of the second aspect, the method further includes: The terminal device receives second resource release indication information from the access network device, where the second resource release indication information indicates the terminal device to release the communication resource corresponding to the first sidelink.

Based on this solution, when the terminal device leaves the first geographic area, a resource used by the terminal device to establish a sidelink and/or a resource used by the terminal device to perform communication through a sidelink may be released. This facilitates proper utilization of resources.

According to a third aspect, this application provides a communication system, including a management network element and a first network element.

The management network element is configured to: receive a request message from a terminal device, where the request message includes information about a first application, the request message requests a proximity service discovery parameter of the first application, and the proximity service discovery parameter is used by the terminal device to discover another terminal device that uses the first application, and obtain information about a first geographic area in which the terminal device is allowed to use the first application through a sidelink.

The first network element is configured to send location information of the terminal device to the management network element.

The management network element is further configured to: receive the location information sent by the first network element, and when a geographic area indicated by the location information is located in the first geographic area, send the proximity service discovery parameter to the terminal device.

Optionally, the first network element may be a mobility management network element, or another network element that can obtain the location information of the terminal device, for example, a location management function (LMF) network element or an application network element.

According to the communication system provided in this application, when the terminal device requests the proximity service discovery parameter of the first application, the management network element subscribes to the location information of the terminal device from the first network element, and can determine, by determining whether the terminal device is in the geographic area in which the terminal device can use the first application through the sidelink, whether to provide a proximity service parameter for the terminal device. This limits, at an application granularity, sidelink communication used by the terminal device.

In some implementations of the third aspect, the management network element is further configured to: when the geographic area indicated by the location information is not in the first geographic area, send a response message to the terminal device, where the response message notifies the terminal device that the management network element rejects allocation of the proximity service discovery parameter.

In some implementations of the third aspect, the system further includes an access network device, configured to receive a sidelink configuration request message sent by the terminal device, where the sidelink configuration request message includes an identifier of a first sidelink established by the terminal device for the first application, and the sidelink configuration request message requests the access network device to configure, for the terminal device, a communication resource corresponding to the first sidelink; and send sidelink configuration information to the terminal device, where the sidelink configuration information includes the identifier of the first sidelink, and the sidelink configuration information is for configuring the communication resource corresponding to the first sidelink.

Based on this solution, after obtaining the proximity service discovery parameter and establishing the first sidelink with the another terminal device, the terminal device may request, from the access network device, the communication resource corresponding to the first sidelink, and establish a sidelink radio bearer (SLRB) with the another terminal device by using the communication resource that corresponds to the first sidelink and that is configured by the access network device, to implementing actual sidelink communication.

In some implementations of the third aspect, the access network device is further configured to: receive first resource release indication information from the management network element, where the first resource release indication information includes the identifier of the first sidelink, the first resource release indication information is for releasing a resource for establishing the first sidelink, and/or the first resource release indication information indicates the access network device to release the communication resource corresponding to the first sidelink; and send second resource release indication information to the terminal device based on the first resource release indication information, where the second resource release indication information is for releasing the communication resource corresponding to the first sidelink.

Based on this solution, when the terminal device leaves the first geographic area, a resource used by the terminal device to establish a sidelink and/or a resource used by the terminal device to perform communication through a sidelink may be released. This facilitates proper utilization of resources.

According to a fourth aspect, a proximity service communication method is provided. The method includes: An access network device receives a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink. The access network device determines, based on a correspondence between proximity service information and information about a geographic area, that the first proximity service information corresponds to the first geographic area. When the terminal device is located in the first geographic area, the access network device sends sidelink configuration information to the terminal device, where the sidelink configuration information is for configuring the corresponding communication resource for the first sidelink, or when the terminal device is not located in the first geographic area, the access network device sends a configuration rejection message to the terminal device, where the configuration rejection message is for rejecting configuration of the corresponding communication resource for the first sidelink.

According to the proximity service communication method provided in this application, the access network device may obtain the correspondence between the proximity service information and the information about the geographic area. When requesting, from the access network device, the communication resource for using the first application through the sidelink, the terminal device may carry the first proximity service information corresponding to the first application. The access network device may determine, based on the correspondence between the proximity service information and the information about the geographic area, whether the terminal device is located in the first geographic area corresponding to the first proximity service information, to determine, based on a determining result, whether to allocate, to the terminal device, the communication resource for using the first application through the sidelink. This limits, at an application granularity, sidelink communication used by the terminal device.

In some implementations of the fourth aspect, before that an access network device receives a sidelink configuration request message from a terminal device, the method further includes: The access network device receives the first proximity service discovery parameter and the information about the first geographic area from a mobility management network element, or receives the first proximity service key and the information about the first geographic area from a policy control network element. The first proximity service discovery parameter and the information about the first geographic area from the mobility management network element are sent by a management network element. The first proximity service key from the policy control network element is generated by the policy control network element based on the information about the first application and the information about the first geographic area that are from the application network element.

In some implementations of the fourth aspect, the configuration rejection message further indicates a cause why configuration of the corresponding communication resource for the first sidelink is rejected.

In some implementations of the fourth aspect, when the terminal device is handed over from the access network device to a target access network device, the method further includes: The access network device sends the first proximity service information and the information about the first geographic area to the target access network device.

Based on this solution, the target access network device may determine, based on whether the terminal device is located in the first geographic area, whether to continue to allocate, to the terminal device, a communication resource corresponding to a new first sidelink.

In some implementations of the fourth aspect, the first proximity service information and the information about the first geographic area are a part of context of the terminal device.

According to a fifth aspect, a communication system is provided. The system includes a mobility management network element and an access network device.

The mobility management network element is configured to: receive, from a management network element, a first proximity service discovery parameter and information about a corresponding first geographic area in which a terminal device is allowed to use a first application through a sidelink, where the first proximity service discovery parameter is used by the terminal device to discover another terminal device that uses the first application; and send the first proximity service discovery parameter and the information about the first geographic area to at least one access network device, where the at least one access network device includes the access network device.

The access network device is configured to: receive a sidelink configuration request message from the terminal device, where the sidelink configuration request message requests a communication resource corresponding to a first sidelink, the first sidelink is a sidelink established by the terminal device for the first application, and the sidelink configuration request message includes the first proximity service discovery parameter; determine, based on a correspondence between a proximity service discovery parameter and information about a geographic area, that the first proximity service discovery parameter corresponds to the first geographic area; when the terminal device is located in the first geographic area, send sidelink configuration information to the terminal device, where the sidelink configuration information is for configuring a corresponding communication resource for the first sidelink, or when the terminal device is not in the first geographic area, send a configuration rejection message to the terminal device, where the configuration rejection message is for rejecting configuration of the corresponding communication resource for the first sidelink.

According to the communication system provided in this application, the management network element may send the proximity service discovery parameter of the first application and the information about the corresponding first geographic area to the access network device. When requesting, from the access network device, the communication resource for using the first application through the sidelink, the terminal device may carry the proximity service discovery parameter of the first application. The access network device determines, based on the information about the first geographic area corresponding to the proximity service discovery parameter of the first application, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the fifth aspect, the system further includes a management network element, configured to: receive a request message from the terminal device, where the request message requests the first proximity service discovery parameter; generate the first proximity service discovery parameter based on the request message, and obtain the information about the first geographic area; and send the first proximity service discovery parameter and the information about the first geographic area to the mobility management network element, and send the first proximity service discovery parameter to the terminal device.

According to a sixth aspect, a communication system is provided. The system includes a policy control network element and an access network device.

The policy control network element is configured to: receive, from an application network element, information about a first application and information about a first geographic area in which a terminal device is allowed to use the first application through a sidelink; generate a first proximity service key based on the information about the first application and the information about the first geographic area; and send the information about the first geographic area and the first proximity service key to at least one access network device, and send the first proximity service key to the terminal device, where the at least one access network device includes the access network device.

The access network device is configured to: receive a sidelink configuration request message from the terminal device, where the sidelink configuration request message requests a communication resource corresponding to a first sidelink, the first sidelink is a sidelink established by the terminal device for the first application, and the sidelink configuration request message includes the first proximity service key; determine, based on a correspondence between a proximity service key and information about a geographic area, that the first proximity service key corresponds to the first geographic area; when the terminal device is located in the first geographic area, send sidelink configuration information to the terminal device, where the sidelink configuration information is for configuring the corresponding communication resource for the first sidelink, or when the terminal device is not in the first geographic area, send a configuration rejection message to the terminal device, where the configuration rejection message is for rejecting configuration of the corresponding communication resource for the first sidelink.

According to the communication system provided in this application, the policy control network element may generate the first proximity service key based on the proximity service discovery parameter of the first application and the information about the corresponding first geographic area that are provided by the application network element. The policy control network element may provide the first proximity service key for the terminal device, and provide the first proximity service key and the information about the first geographic area for the access network device. When requesting, from the access network device, the communication resource for using the first application through the sidelink, the terminal device may carry the first proximity service key. The access network device determines, based on the information about the first geographic area corresponding to the first proximity service key, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the sixth aspect, the system further includes: a management network element, configured to: receive a request message from the terminal device, where the request message requests the first proximity service discovery parameter, and the first proximity service discovery parameter is used by the terminal device to discover another terminal device that uses the first application; generate the first proximity service discovery parameter based on the request message; and send the first proximity service discovery parameter to the terminal device.

According to a seventh aspect, a proximity service communication method is provided. The method includes: An access network device receives a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink. When the access network device stores the first proximity service information, the access network device sends sidelink configuration information to the terminal device, where the sidelink configuration information is for configuring the communication resource corresponding to the first sidelink, or when the access network device does not store the first proximity service information, the access network device sends a configuration rejection message to the terminal device, where the configuration rejection message is for rejecting configuration of the corresponding communication resource for the first sidelink.

According to the proximity service communication method provided in this application, the access network device located in the first geographic area may obtain the proximity service information. When requesting, from the access network device, the communication resource for using the first application through the sidelink, the terminal device may carry the first proximity service information corresponding to the first application. The access network device may determine, based on whether the obtained proximity service information includes the first proximity service information, whether the terminal device is located in the first geographic area corresponding to the first proximity service information, so as to determine, based on a determining result, whether to allocate, to the terminal device, the communication resource for using the first application through the sidelink. This limits, at an application granularity, sidelink communication used by the terminal device.

In some implementations of the seventh aspect, when the access network device stores the first proximity service information, before that an access network device receives a sidelink configuration request message from a terminal device, the method further includes: The access network device receives the first proximity service discovery parameter from a mobility management network element, or receives the first proximity service key from the policy control network element. The first proximity service discovery parameter from the mobility management network element is sent by a management network element. The first proximity service key from the policy control network element is generated by the policy control network element based on the information about the first application and the information about the first geographic area that are from the application network element.

In some implementations of the seventh aspect, the configuration rejection message further indicates a cause why configuration of the corresponding communication resource for the first sidelink is rejected.

In some implementations of the seventh aspect, when the terminal device is handed over from the access network device to a target access network device, the method further includes: If the target access network device is located in the first geographic area, the access network device sends the first proximity service information to the target access network device.

Based on this solution, the target access network device may continue to allocate, to the terminal device, a communication resource corresponding to a new first sidelink.

In some implementations of the seventh aspect, the first proximity service information is a part of context of the terminal device.

According to an eighth aspect, a communication system is provided. The system includes a mobility management network element and an access network device.

The mobility management network element is configured to: receive, from a management network element, a first proximity service discovery parameter and information about a corresponding first geographic area in which a terminal device is allowed to use a first application through a sidelink, where the first proximity service discovery parameter is used by the terminal device to discover another terminal device that uses the first application; and send the first proximity service discovery parameter to at least one access network device, where the at least one access network device is located in the first geographic area.

The access network device is configured to: receive a sidelink configuration request message from the terminal device, where the sidelink configuration request message requests a communication resource corresponding to a first sidelink, the first sidelink is a sidelink established by the terminal device for the first application, and the sidelink configuration request message includes the first proximity service discovery parameter; and when the at least one access network device includes the access network device, send sidelink configuration information to the terminal device, where the sidelink configuration information is for configuring the communication resource corresponding to the first sidelink, or when the at least one access network device does not include the access network device, send a configuration rejection message to the terminal device, where the configuration rejection message is for rejecting configuration of the corresponding communication resource for the first sidelink.

According to the communication system provided in this application, the management network element may send the proximity service discovery parameter of the first application to the access network device located in the first geographic area corresponding to the proximity service discovery parameter. When requesting, from the access network device, the communication resource for using the first application through the sidelink, the terminal device may carry the proximity service discovery parameter of the first application. The access network device may determine, based on whether the proximity service discovery parameter of the first application is stored, whether the access network device or the terminal device is located in the first geographic area, so as to determine, based on a determining result, whether to allocate, to the terminal device, the communication resource for using the first application through the sidelink. This limits, at an application granularity, a sidelink used by the terminal device.

In some implementations of the eighth aspect, the system further includes a management network element, configured to: receive a request message from the terminal device, where the request message requests the first proximity service discovery parameter; generate the first proximity service discovery parameter based on the request message, and obtain the information about the first geographic area; and send the first proximity service discovery parameter and the information about the first geographic area to the mobility management network element, and send the first proximity service discovery parameter to the terminal device.

According to a ninth aspect, a communication system is provided. The system includes a policy control network element and an access network device.

The policy control network element is configured to: receive, from an application network element, information about a first application and information about a first geographic area in which a terminal device is allowed to use the first application through a sidelink; generate a first proximity service key based on the information about the first application and the information about the first geographic area; and send the first proximity service key to at least one access network device and the terminal device, where the at least one access network device is located in the first geographic area.

The access network device is configured to: receive a sidelink configuration request message from the terminal device, where the sidelink configuration request message requests a communication resource corresponding to a first sidelink, the first sidelink is a sidelink established by the terminal device for the first application, and the sidelink configuration request message includes the first proximity service key; and when the at least one access network device includes the access network device, send sidelink configuration information to the terminal device, where the sidelink configuration information is for configuring the communication resource corresponding to the first sidelink, or when the at least one access network device does not include the access network device, send a configuration rejection message to the terminal device, where the configuration rejection message is for rejecting configuration of the corresponding communication resource for the first sidelink.

According to the communication system provided in this application, the policy control network element may generate the first proximity service key based on the information of the first application and the information about the corresponding first geographic area that are provided by the application network element. The policy control network element may provide the first proximity service key for the terminal device and the access network device located in the first geographic area. When requesting, from the access network device, the communication resource for using the first application through the sidelink, the terminal device may carry the first proximity service key. The access network device may determine, based on whether the first proximity service key is stored, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the ninth aspect, the system further includes: a management network element, configured to: receive a request message from the terminal device, where the request message requests the first proximity service discovery parameter, and the first proximity service discovery parameter is used by the terminal device to discover another terminal device that uses the first application; generate the first proximity service discovery parameter based on the request message; and send the first proximity service discovery parameter to the terminal device.

According to a tenth aspect, a proximity service communication method is provided. The method includes: An access network device receives a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink. The access network device sends the first proximity service information to a central control device. The access network device receives first indication information or second indication information from the central control device, where the first indication information indicates that the access network device is allowed to configure the communication resource corresponding to the first sidelink for the terminal device, and the second indication information indicates that the access network device is not allowed to configure the communication resource corresponding to the first sidelink for the terminal device. The access network device sends sidelink configuration information to the terminal device based on the first indication information, where the sidelink configuration information is for configuring the corresponding communication resource for the first sidelink, or the access network device sends a configuration rejection message to the terminal device based on the second indication information, where the configuration rejection message is for rejecting configuration of the corresponding communication resource for the first sidelink.

According to the proximity service communication method provided in this application, the central control device may obtain the first proximity service information and the information about the corresponding first geographic area. When requesting, from the access network device, the communication resource for using the first application through the sidelink, the terminal device may carry the first proximity service information. The access network device may send the first proximity service information to the central control device, and the central control device determines, based on the information about the first geographic area corresponding to the first proximity service information, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the tenth aspect, the configuration rejection message further indicates a cause why configuration of the corresponding communication resource for the first sidelink is rejected.

According to an eleventh aspect, a proximity service communication method is provided. The method includes: A central control device receives first proximity service information from an access network device, where the first proximity service information is a first proximity service discovery parameter or a first proximity service key, the first proximity service discovery parameter is used by a terminal device to discover another terminal device that uses a first application, and the first proximity service key is generated based on information about the first application and information about a first geographic area in which the terminal device is allowed to use the first application through a sidelink. The central control device determines, based on a correspondence between proximity service information and information about a geographic area, that the first proximity service information corresponds to the first geographic area. When the access network device is located in the first geographic area, the central control device sends first indication information to the access network device, where the first indication information indicates that the access network device is allowed to configure a communication resource corresponding to a first sidelink for the terminal device, and the first sidelink is a sidelink established by the terminal device for the first application, or when the access network device is not in the first geographic area, the central control device sends second indication information to the access network device, where the second indication information indicates that the access network device is not allowed to configure the communication resource corresponding to the first sidelink for the terminal device.

According to the proximity service communication method provided in this application, the central control device may obtain the first proximity service information and the information about the corresponding first geographic area. When requesting, from the access network device, the communication resource for using the first application through the sidelink, the terminal device may carry the first proximity service information. The access network device may send the first proximity service information to the central control device, and the central control device determines, based on the information about the first geographic area corresponding to the first proximity service information, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the eleventh aspect, before that a central control device receives first proximity service information from an access network device, the method further includes: The central control device receives the first proximity service discovery parameter and the information about the first geographic area from a mobility management network element, or receives the first proximity service key and the information about the first geographic area from a policy control network element. The first proximity service discovery parameter and the information about the first geographic area from the mobility management network element are sent by a management network element. The first proximity service key from the policy control network element is generated by the policy control network element based on the information about the first application and the information about the first geographic area that are from the application network element.

In some implementations of the eleventh aspect, the first proximity service information and the corresponding first area information are a part of context of the terminal device.

According to a twelfth aspect, a communication system is provided. The system includes a central control device and an access network device.

The access network device is configured to: receive a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink; and send the first proximity service information to the central control device.

The central control device is configured to: determine, based on a correspondence between proximity service information and information about a geographic area, that the first proximity service information corresponds to the first geographic area; and when the access network device is located in the first geographic area, send first indication information to the access network device, where the first indication information indicates that the access network device is allowed to configure the communication resource corresponding to the first sidelink for the terminal device, and the first sidelink is a sidelink established by the terminal device for the first application, or when the access network device is not in the first geographic area, send second indication information to the access network device, where the second indication information indicates that the access network device is not allowed to configure the communication resource corresponding to the first sidelink for the terminal device.

According to the communication system provided in this application, the central control device may obtain the first proximity service information and the information about the corresponding first geographic area. When requesting, from the access network device, the communication resource for using the first application through the sidelink, the terminal device may carry the first proximity service information. The access network device may send the first proximity service information to the central control device, and the central control device determines, based on the information about the first geographic area corresponding to the first proximity service information, whether the terminal device is located in the first geographic area, so as to determine, based on a determining result, whether to allocate, to the terminal device, the communication resource for using the first application through the sidelink. This limits, at an application granularity, sidelink communication used by the terminal device.

In some implementations of the twelfth aspect, the system further includes a mobility management network element and a management network element.

The management network element is configured to: receive a request message from the terminal device, where the request message requests the first proximity service discovery parameter; generate the first proximity service discovery parameter based on the request message, and obtain the information about the first geographic area; and send the first proximity service discovery parameter and the information about the first geographic area to the mobility management network element, and send the first proximity service discovery parameter to the terminal device.

The mobility management network element is configured to send the first proximity service discovery parameter and the information about the first geographic area to the central control device.

In some implementations of the twelfth aspect, the system further includes a policy control network element and a management network element.

The management network element is configured to: receive a request message from the terminal device, where the request message requests the first proximity service discovery parameter; generate the first proximity service discovery parameter based on the request message; and send the first proximity service discovery parameter to the terminal device.

The policy control network element is configured to: obtain the information about the first application and the information about the first geographic area from an application network element; generate the first proximity service key based on the information about the first application and the information about the first geographic area; and send the first proximity service key and the information about the first geographic area to the central control device.

According to a thirteenth aspect, a proximity service communication method is provided. The method includes: A mobility management network element receives, from a management network element, a first proximity service discovery parameter and information about a corresponding first geographic area in which a terminal device is allowed to use a first application through a sidelink, where the first proximity service discovery parameter is used by the terminal device to discover another terminal device that uses the first application. The mobility management network element sends the first proximity service discovery parameter and the information about the first geographic area to at least one access network device, or the mobility management network element sends the first proximity service discovery parameter to at least one access network device, where the at least one access network device is located in the first geographic area, or the mobility management network element sends the first proximity service discovery parameter and the information about the first geographic area to a central control device.

Based on this solution, the mobility management network element may provide the first proximity service discovery parameter and the information about the first geographic area for the access network device or the central control device, or provide the first proximity service discovery parameter for the access network device located in the first geographic area.

According to a fourteenth aspect, a proximity service communication method is provided. The method includes: A management network element receives a request message from a terminal device, where the request message requests a first proximity service discovery parameter, and the first proximity service discovery parameter is used by the terminal device to discover another terminal device that uses a first application. The management network element generates the first proximity service discovery parameter based on the request message, and obtains information about a corresponding first geographic area in which the terminal device is allowed to use the first application through a sidelink. The management network element sends the first proximity service discovery parameter and the information about the first geographic area to a mobility management network element, and sends the first proximity service discovery parameter to the terminal device.

According to the method, the management network element may send the first proximity service discovery parameter and the information about the first geographic area to the mobility management network element based on a request of the terminal device for the first proximity service discovery parameter, and send the first proximity service discovery parameter to the terminal device. In this way, the mobility management network element may send the first proximity service discovery parameter and the information about the first geographic area to an access network device or a central control device, and the access network device or the central control device determines location information of the terminal device based on the first proximity service discovery parameter or the information about the first geographic area and determines whether to allocate, to the terminal device, a resource for sidelink communication.

According to a fifteenth aspect, a proximity service communication method is provided. The method includes: A policy control network element receives, from an application network element, information about a first application of a terminal device and information about a first geographic area in which the terminal device is allowed to use the first application through a sidelink. The policy control network element generates a first proximity service key based on the information about the first application and the information about the first geographic area. The policy control network element sends the information about the first geographic area and the first proximity service key to at least one access network device, or the policy control network element sends the first proximity service key to at least one access network device, where the at least one access network device is located in the first geographic area, or the policy control network element sends the information about the first geographic area and the first proximity service key to a central control device.

Based on the method, the policy control network element may send, to the access network device or the central control device, the first proximity service key that is generated based on the information about the first application and the information about the first geographic area that are provided by the application network element, so that the access network device or the central control device may determine location information of the terminal device based on the first proximity service key, to determine whether to allocate, to the terminal device, a resource for sidelink communication.

According to a sixteenth aspect, a communication apparatus is provided. The apparatus includes modules or units configured to perform the method in any one of the first aspect or the possible implementations of the first aspect, includes modules or units configured to perform the method in any one of the second aspect or the possible implementations of the second aspect, includes modules or units configured to perform the method in any one of the fourth aspect or the possible implementations of the fourth aspect, includes modules or units configured to perform the method in any one of the seventh aspect or the possible implementations of the seventh aspect, includes modules or units configured to perform the method in any one of the tenth aspect or the possible implementations of the tenth aspect, includes modules or units configured to perform the method in any one of the eleventh aspect or the possible implementations of the eleventh aspect, includes modules or units configured to perform the method in any one of the thirteenth aspect or the possible implementations of the thirteenth aspect, includes modules or units configured to perform the method in any one of the fourteenth aspect or the possible implementations of the fourteenth aspect, or includes modules or units configured to perform the method in any one of the fifteenth aspect or the possible implementations of the fifteenth aspect.

According to a seventeenth aspect, an apparatus is provided. The apparatus includes a processor. The processor is coupled to a memory, and may be configured to execute instructions in the memory, to enable the apparatus to perform the method according to any one of the first aspect or the possible implementations of the first aspect, enable the apparatus to perform the method according to any one of the second aspect or the possible implementations of the second aspect, enable the apparatus to perform the method according to any one of the fourth aspect or the possible implementations of the fourth aspect, enable the apparatus to perform the method according to any one of the seventh aspect or the possible implementations of the seventh aspect, enable the apparatus to perform the method in any one of the tenth aspect or the possible implementations of the tenth aspect, enable the apparatus to perform the method in any one of the eleventh aspect or the possible implementations of the eleventh aspect, enable the apparatus to perform the method in any one of the thirteenth aspect or the possible implementations of the thirteenth aspect, enable the apparatus to perform the method in any one of the fourteenth aspect or the possible implementations of the fourteenth aspect, or enable the apparatus to perform the method in any one of the fifteenth aspect or the possible implementations of the fifteenth aspect.

Optionally, the apparatus further includes the memory. Optionally, the apparatus further includes an interface circuit, and the processor is coupled to the interface circuit.

According to an eighteenth aspect, a processor is provided. The processor includes an input circuit, an output circuit, and a processing circuit. The processing circuit is configured to receive a signal by using an input circuit, and transmit a signal by using the output circuit, to enable the processor to perform the method in any one of the first aspect or the possible implementations of the first aspect, enable the processor to perform the method in any one of the second aspect or the possible implementations of the second aspect, enable the processor to perform the method in any one of the fourth aspect or the possible implementations of the fourth aspect, enable the processor to perform the method in any one of the seventh aspect or the possible implementations of the seventh aspect, enable the processor to perform the method in any one of the tenth aspect or the possible implementations of the tenth aspect, enable the processor to perform the method in any one of the eleventh aspect or the possible implementations of the eleventh aspect, enable the processor to perform the method in any one of the thirteenth aspect or the possible implementations of the thirteenth aspect, enable the processor to perform the method in any one of the fourteenth aspect or the possible implementations of the fourteenth aspect, or enable the processor to perform the method in any one of the fifteenth aspect or the possible implementations of the fifteenth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a nineteenth aspect, a processing apparatus is provided. The apparatus includes a processor and a memory. The processor is configured to: read instructions stored in the memory, receive a signal by using a receiver, and transmit a signal by using a transmitter, to perform the method in any one of the first aspect or the possible implementations of the first aspect, perform the method in any one of the second aspect or the possible implementations of the second aspect, perform the method in any one of the fourth aspect or the possible implementations of the fourth aspect, perform the method in any one of the seventh aspect or the possible implementations of the seventh aspect, perform the method in any one of the tenth aspect or the possible implementations of the tenth aspect, perform the method in any one of the eleventh aspect or the possible implementations of the eleventh aspect, perform the method in any one of the thirteenth aspect or the possible implementations of the thirteenth aspect, perform the method in any one of the fourteenth aspect or the possible implementations of the fourteenth aspect, or perform the method in any one of the fifteenth aspect or the possible implementations of the fifteenth aspect.

Optionally, there are one or more processors, and there are one or more memories.

Optionally, the memory may be integrated with the processor, or the memory and the processor are separately disposed.

The processing apparatus according to the nineteenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a twentieth aspect, a computer program product is provided. The computer program product includes a computer program (which may also be referred to as code or instructions). When the computer program is run, a computer is enabled to perform the method in any one of the first aspect or the possible implementations of the first aspect, the computer is enabled to perform the method in any one of the second aspect or the possible implementations of the second aspect, the computer is enabled to perform the method in any one of the fourth aspect or the possible implementations of the fourth aspect, the computer is enabled to perform the method in any one of the seventh aspect or the possible implementations of the seventh aspect, the computer is enabled to perform the method in any one of the tenth aspect or the possible implementations of the tenth aspect, the computer is enabled to perform the method in any one of the eleventh aspect or the possible implementations of the eleventh aspect, the computer is enabled to perform the method in any one of the thirteenth aspect or the possible implementations of the thirteenth aspect, the computer is enabled to perform the method in any one of the fourteenth aspect or the possible implementations of the fourteenth aspect, or the computer is enabled to perform the method in any one of the fifteenth aspect or the possible implementations of the fifteenth aspect.

According to a twenty-first aspect, a computer-readable medium is provided. The computer-readable medium stores a computer program (which may also be referred to as code or instructions). When the computer program is run on a computer, the computer is enabled to perform the method in any one of the first aspect or the possible implementations of the first aspect, the computer is enabled to perform the method in any one of the second aspect or the possible implementations of the second aspect, the computer is enabled to perform the method in any one of the fourth aspect or the possible implementations of the fourth aspect, the computer is enabled to perform the method in any one of the seventh aspect or the possible implementations of the seventh aspect, the computer is enabled to perform the method in any one of the tenth aspect or the possible implementations of the tenth aspect, the computer is enabled to perform the method in any one of the eleventh aspect or the possible implementations of the eleventh aspect, the computer is enabled to perform the method in any one of the thirteenth aspect or the possible implementations of the thirteenth aspect, the computer is enabled to perform the method in any one of the fourteenth aspect or the possible implementations of the fourteenth aspect, or the computer is enabled to perform the method in any one of the fifteenth aspect or the possible implementations of the fifteenth aspect.

BRIEF DESCRIPTION OF DRAWINGS

FIG. 7A to FIG. 7C are a schematic flowchart of a proximity service communication method according to this application;

DESCRIPTION OF EMBODIMENTS

Figure 1:
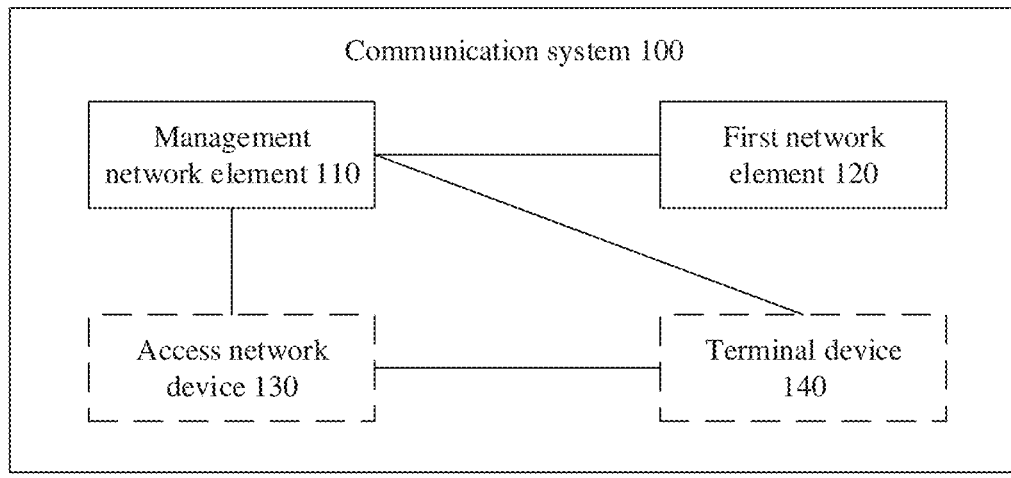
FIG. 1 is a schematic diagram of a communication system according to this application.

The following describes technical solutions of this application with reference to accompanying drawings.

The technical solutions in embodiments of this application may be applied to a 5th generation (5G) system or a new radio (NR) communication system, or may be applied to another communication system that may appear in the future, for example, a 6G communication system.

The technical solutions provided in this application relate to ProSe communication. The ProSe communication is sometimes also referred to as device to device (D2D) communication. A direct communication interface between two terminal devices having a D2D communication function is a PC5 interface. Therefore, the D2D communication may also be referred to as PC5 communication. A direct communication link between two terminal devices having a D2D communication function is defined as a sidelink (SL), and the sidelink may also be referred to as a PC5 link, or a PC5 connection.

This application mainly relates to the following network elements or devices:

(1) Terminal device: The terminal device may be user equipment (UE), an access terminal, a terminal in V2X communication, a subscriber unit, a subscriber station, a mobile station, a remote station, a remote terminal, a mobile device, a user terminal, a terminal device, a wireless communication device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal may alternatively include a V2X device, for example, a vehicle or an on-board unit (OBU) in a vehicle.

(2) Access network device: The terminal device is connected to a radio access network (RAN) device (referred to as an "access network device" in this specification) in a wireless manner. The access network device may be an access device by using which the terminal device accesses a mobile communication system wirelessly, may be a base station (for example, a gNodeB (gNB) in a 5G mobile communication system), a base station in a future mobile communication system, an access node in a wireless fidelity (Wi-Fi) system, or the like, or may be a radio controller in a cloud radio access network (CRAN) scenario. Alternatively, the access network device may be a relay station, an access point, a vehicle-mounted device, a wearable device, a network device in a future 5G network, a network device in a future evolved PLMN network, or the like. A specific technology and a specific device form that are used by the access network device are not limited in this embodiment of this application.

(3) Management network element: The management network element is mainly configured to allocate a proximity service discovery parameter. The management network element may be an independent network element, or may be integrated into a control plane network element (for example, a policy control function (PCF)) or a user plane network element (for example, a user plane function (UPF)) of a core network as a logical network element, or may be deployed in a network element such as an AF, a proximity function (ProSe Function), or a proximity application server (ProSe Application Server).

(4) Policy control network element: The policy control network element is configured to manage network behavior, and provide a policy, a rule, and the like for a control plane.

(5) Mobility management network element: The mobility management network element is mainly for access and mobility management and control.

(6) Application network element: The application network element can be an application server corresponding to an application.

(7) Central control device: The central control device is connected to the access network device, and may implement a control function on the access network device. A specific form of the central control device may be the same as or different from that of the access network device. This is not limited in this application.

This application provides four different communication systems. The following separately provides descriptions with reference to FIG. 1 to FIG. 4.

FIG. 1 is a schematic diagram of a communication system 100 according to this application. As shown in FIG. 1, the system 100 includes a management network element 110 and a first network element 120. Optionally, the system 100 may further include an access network device 130 and/or a terminal device 140. Optionally, the system 100 may further include a terminal device.

The management network element 110 is configured to: receive a request message from a terminal device 140, where the request message includes information about a first application, the request message requests a proximity service discovery parameter of the first application, and the proximity service discovery parameter is used by the terminal device 140 to discover another terminal device that uses the first application, and obtain information about a first geographic area in which the terminal device 140 is allowed to use the first application through a sidelink.

The first network element 120 is configured to send location information to the management network element.

The management network element 110 is further configured to: receive the location information sent by the first network element, and when a geographic area indicated by the location information is located in the first geographic area, send the proximity service discovery parameter to the terminal device 140.

Optionally, when the geographic area indicated by the location information is not in the first geographic area, the management network element 110 is further configured to send a response message to the terminal device 140, where the response message notifies the terminal device 140 that the management network element rejects allocation of the proximity service discovery parameter.

Optionally, the first network element 120 is further configured to: when the terminal device 140 is not in the first geographic area, send first location indication information of the terminal device 140 to the management network element 110. The management network element 110 is further configured to send a first update message to the terminal device 140, where the first update message notifies the terminal device 140 that the proximity service discovery parameter becomes invalid.

Further, the first update message further notifies a cause why the proximity service discovery parameter becomes invalid.

Optionally, the first network element 120 is further configured to: when the terminal device 140 returns to the first geographic area again, send second location indication information of the terminal device 140 to the management network element 110. The management network element 110 is further configured to send a second update message to the terminal device 140, where the second update message is for allocating the proximity service discovery parameter.

Optionally, the management network element 110 is further configured to receive sidelink information from the terminal device 140, where the sidelink information includes an identifier of a first sidelink established by the terminal device 140 for the first application and information about the first application.

Optionally, the access network device 130 is configured to receive a sidelink configuration request message sent by the terminal device 140, where the sidelink configuration request message includes the identifier of the first sidelink established by the terminal device 140 for the first application, and the sidelink configuration request message requests the access network device to configure, for the terminal device 140, a communication resource corresponding to the first sidelink; and send sidelink configuration information to the terminal device 140, where the sidelink configuration information includes the identifier of the first sidelink, and the sidelink configuration information is for configuring the communication resource corresponding to the first sidelink.

Optionally, the management network element 110 is further configured to send first resource release indication information to the access network device 130, where the first resource release indication information includes the identifier of the first sidelink, the first resource release indication information is for releasing a resource for establishing the first sidelink, and/or the first resource release indication information indicates the access network device to release the communication resource corresponding to the first sidelink. The access network device 130 is further configured to send second resource release indication information to the terminal device 140 based on the first resource release indication information, where the second resource release indication information is for releasing the communication resource corresponding to the first sidelink.

According to the communication system provided in this application, the management network element may determine, by determining whether the terminal device is in a geographic area in which the terminal device can use an application (for example, the first application) through a sidelink, whether to provide the proximity service parameter for the terminal device. This limits, at an application granularity, sidelink communication used by the terminal device.

Figure 2:
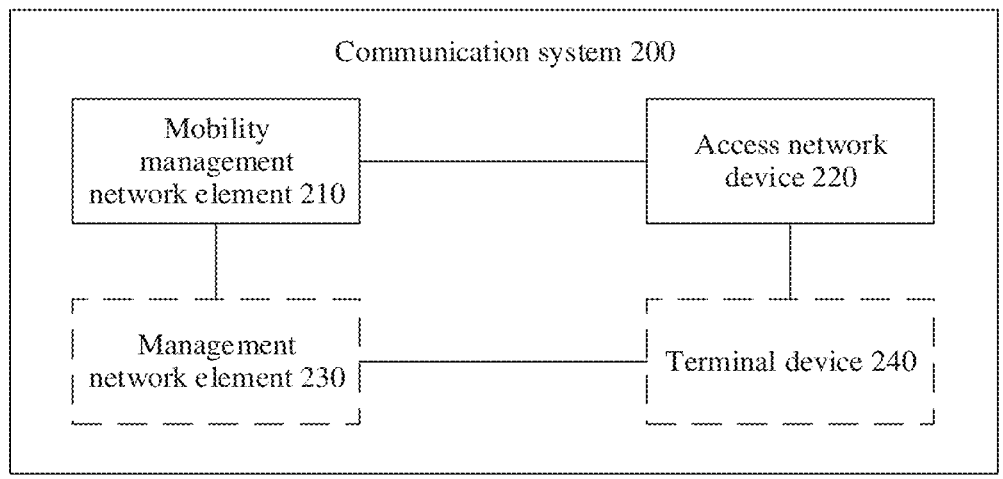
FIG. 2 is a schematic diagram of another communication system according to an embodiment of this application.

FIG. 2 is a schematic diagram of another communication system 200 according to this application. As shown in FIG. 2, the system 200 includes a mobility management network element 210 and an access network device 220. Optionally, the system may further include a management network element 230 and/or a terminal device 240.

In an implementation, the mobility management network element 210 is configured to: receive, from a management network element, a first proximity service discovery parameter and information about a corresponding first geographic area in which a terminal device is allowed to use a first application through a sidelink, where the first proximity service discovery parameter is used by the terminal device 240 to discover another terminal device that uses the first application; and send the first proximity service discovery parameter and information about the first geographic area to at least one access network device, where the at least one access network device includes the access network device.

The access network device 220 is configured to: receive a sidelink configuration request message from the terminal device 240, where the sidelink configuration request message requests a communication resource corresponding to a first sidelink, the first sidelink is a sidelink established by the terminal device 240 for the first application, and the sidelink configuration request message includes the first proximity service discovery parameter; determine, based on a correspondence between a proximity service discovery parameter and information about a geographic area, that the first proximity service discovery parameter corresponds to the first geographic area; when the terminal device 240 is located in the first geographic area, send sidelink configuration information to the terminal device 240, where the sidelink configuration information is for configuring a corresponding communication resource for the first sidelink, or when the terminal device 240 is not in the first geographic area, send a configuration rejection message to the terminal device 240, where the configuration rejection message is for rejecting configuration of the corresponding communication resource for the first sidelink.

Optionally, the management network element 230 is configured to: receive a request message from the terminal device 240, where the request message requests the first proximity service discovery parameter; generate the first proximity service discovery parameter based on the request message, and obtain the information about the first geographic area; and send the first proximity service discovery parameter and the information about the first geographic area to the mobility management network element, and send the first proximity service discovery parameter to the terminal device 240.

Optionally, when the terminal device 240 is handed over from the access network device 220 to the target access network device, the access network device 220 is further configured to send the first proximity service discovery parameter and the information about the first geographic area to the target access network device.

According to the communication system provided in this application, the management network element may send the proximity service discovery parameter of the first application and the information about the corresponding first geographic area to the access network device, and send the proximity service discovery parameter of the first application to the terminal device. When requesting, from the access network device, the communication resource for using the first application through the sidelink, the terminal device may carry the proximity service discovery parameter of the first application. The access network device determines, based on the information about the first geographic area corresponding to the proximity service discovery parameter of the first application, whether the terminal device is located in the first geographic area, so as to determine, based on a determining result, whether to allocate, to the terminal device, the communication resource for using the first application through the sidelink. This limits, at an application granularity, sidelink communication used by the terminal device.

In another implementation, the mobility management network element 210 is configured to: receive, from a management network element 230, a first proximity service discovery parameter and information about a corresponding first geographic area in which a terminal device 240 is allowed to use a first application through a sidelink, where the first proximity service discovery parameter is used by the terminal device 240 to discover another terminal device that uses the first application; and send the first proximity service discovery parameter to at least one access network device 220, where the at least one access network device 220 is located in the first geographic area.

The access network device 220 is configured to: receive a sidelink configuration request message from the terminal device 240, where the sidelink configuration request message requests a communication resource corresponding to a first sidelink, the first sidelink is a sidelink established by the terminal device 240 for the first application, and the sidelink configuration request message includes the first proximity service discovery parameter; and when the at least one access network device 220 includes the access network device 220, send sidelink configuration information to the terminal device 240, where the sidelink configuration information is for configuring the communication resource corresponding to the first sidelink, or when the at least one access network device 220 does not include the access network device 220, send a configuration rejection message to the terminal device 240, where the configuration rejection message is for rejecting configuration of the corresponding communication resource for the first sidelink.

Optionally, the management network element 230 is configured to: receive a request message from the terminal device 240, where the request message requests the first proximity service discovery parameter; generate the first proximity service discovery parameter based on the request message, and obtain the information about the first geographic area; send the first proximity service discovery parameter and the information about the first geographic area to the mobility management network element 210; and send the first proximity service discovery parameter to the terminal device 240.

According to the communication system provided in this application, the management network element may send the proximity service discovery parameter of the first application to the access network device located in the first geographic area corresponding to the proximity service discovery parameter. When requesting, from the access network device, the communication resource for using the first application through the sidelink, the terminal device may carry the proximity service discovery parameter of the first application. The access network device may determine, based on whether the proximity service discovery parameter of the first application is stored, whether the access network device or the terminal device is located in the first geographic area, so as to determine, based on a determining result, whether to allocate, to the terminal device, the communication resource for using the first application through the sidelink. This limits, at an application granularity, sidelink communication used by the terminal device.

Figure 3:
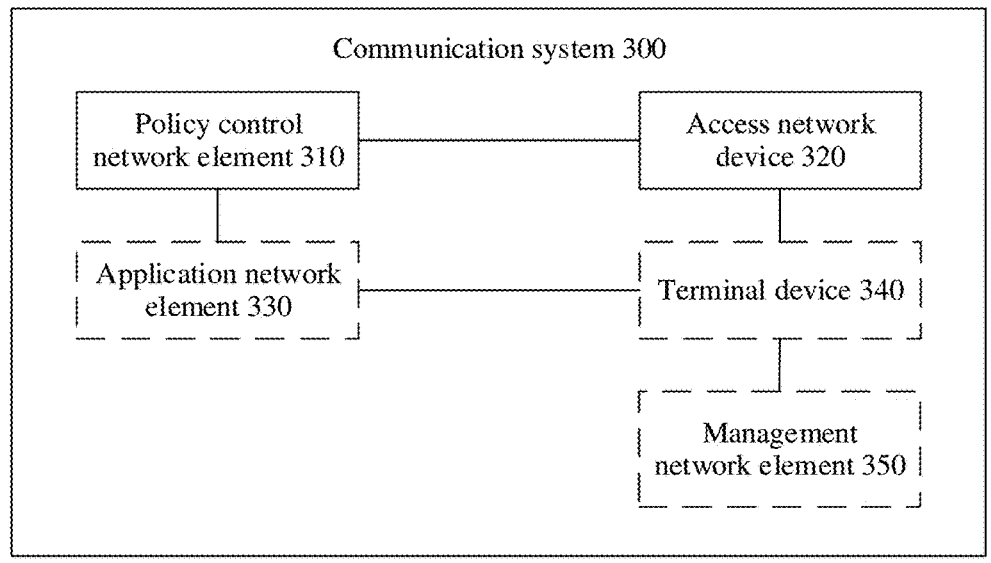
FIG. 3 is a schematic diagram of a communication system according to this application.

FIG. 3 is a schematic diagram of another communication system 300 according to this application. As shown in FIG. 3, the system 300 includes a policy control network element 310 and an access network device 320. Optionally, the system may further include one or more of the following: an application network element 330, a terminal device 340, and a management network element 350.

In an implementation, the policy control network element 310 is configured to: receive, from an application network element 330, information about a first application and information about a first geographic area in which a terminal device 340 is allowed to use the first application through a sidelink; generate a first proximity service key based on the information about the first application and the information about the first geographic area; and send the information about the first geographic area and the first proximity service key to at least one access network device 320, and send the first proximity service key to the terminal device 340, where the at least one access network device 320 includes the access network device 320.

The access network device 320 is configured to: receive a sidelink configuration request message from the terminal device 340, where the sidelink configuration request message requests a communication resource corresponding to a first sidelink, the first sidelink is a sidelink established by the terminal device 340 for the first application, and the sidelink configuration request message includes the first proximity service key; determine, based on a correspondence between a proximity service key and information about a geographic area, that the first proximity service key corresponds to the first geographic area; when the terminal device 340 is located in the first geographic area, send sidelink configuration information to the terminal device 340, where the sidelink configuration information is for configuring a corresponding communication resource for the first sidelink, or when the terminal device 340 is not in the first geographic area, send a configuration rejection message to the terminal device 340, where the configuration rejection message is for rejecting configuration of the corresponding communication resource for the first sidelink.

It should be understood that the policy control network element 310 may send the information about the first geographic area and the first proximity service key to the access network device 320 by using the mobility management network element, and the policy control network element may send the first proximity service key to the terminal device 340 by using the mobility management network element and the access network device 320.

Optionally, the management network element 350 is configured to: receive a request message from the terminal device 340, where the request message requests the first proximity service discovery parameter, and the first proximity service discovery parameter is used by the terminal device 340 to discover another terminal device that uses the first application; and generate the first proximity service discovery parameter based on the request message, and send the first proximity service discovery parameter to the terminal device 340.

Optionally, when the terminal device 340 is handed over from the access network device 220 to the target access network device, the access network device 320 is further configured to send the first proximity service key to the target access network device.

According to the communication system provided in this application, the policy control network element may generate the first proximity service key based on the proximity service discovery parameter of the first application and the information about the corresponding first geographic area that are provided by the application network element. The policy control network element may provide the first proximity service key for the terminal device, and provide the first proximity service key and the information about the first geographic area for the access network device. When requesting, from the access network device, the communication resource for using the first application through the sidelink, the terminal device may carry the first proximity service key. The access network device determines, based on the information about the first geographic area corresponding to the first proximity service key, whether the terminal device is located in the first geographic area, so as to determine, based on a determining result, whether to allocate, to the terminal device, the communication resource for using the first application through the sidelink. This limits, at an application granularity, sidelink communication used by the terminal device.

In another implementation, the policy control network element 310 is configured to: receive, from an application network element 330, information about a first application and information about a first geographic area in which a terminal device 340 is allowed to use the first application through a sidelink; generate a first proximity service key based on the information about the first application and the information about the first geographic area; and send the first proximity service key to at least one access network device 320 and the terminal device 340, where the at least one access network device 320 is located in the first geographic area.

The access network device 320 is configured to: receive a sidelink configuration request message from the terminal device 340, where the sidelink configuration request message requests a communication resource corresponding to a first sidelink, the first sidelink is a sidelink established by the terminal device 340 for the first application, and the sidelink configuration request message includes the first proximity service key; and when the at least one access network device 320 includes the access network device 320, send sidelink configuration information to the terminal device 340, where the sidelink configuration information is for configuring the communication resource corresponding to the first sidelink, or when the at least one access network device 320 does not include the access network device 320, send a configuration rejection message to the terminal device 340, where the configuration rejection message is for rejecting configuration of the corresponding communication resource for the first sidelink.

It should be understood that the policy control network element 310 may send the first proximity service key to the access network device 320 by using the mobility management network element, and the policy control network element may send the first proximity service key to the terminal device 340 by using the mobility management network element and the access network device 320.

Optionally, the management network element 350 is configured to: receive a request message from the terminal device 340, where the request message requests the first proximity service discovery parameter, and the first proximity service discovery parameter is used by the terminal device 340 to discover another terminal device that uses the first application; generate the first proximity service discovery parameter based on the request message; and send the first proximity service discovery parameter to the terminal device 340.

According to the communication system provided in this application, the policy control network element may generate the first proximity service key based on the proximity service discovery parameter of the first application and the information about the corresponding first geographic area that are provided by the application network element. The policy control network element may provide the first proximity service key for the terminal device and the access network device located in the first geographic area. When requesting, from the access network device, the communication resource for using the first application through the sidelink, the terminal device may carry the first proximity service key. The access network device may determine, based on whether the first proximity service key is stored, whether the terminal device is located in the first geographic area, so as to determine, based on a determining result, whether to allocate, to the terminal device, the communication resource for using the first application through the sidelink. This limits, at an application granularity, sidelink communication used by the terminal device.

Figure 4:
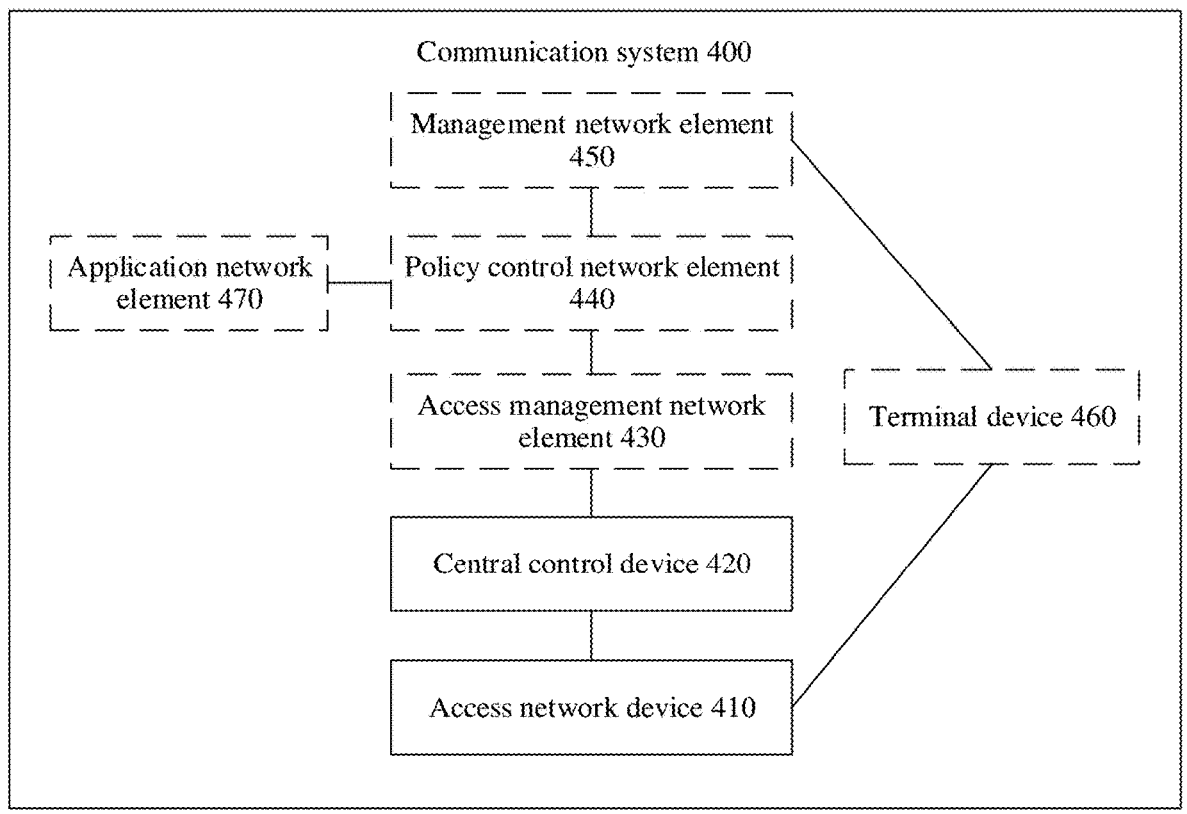
FIG. 4 is a schematic diagram of another communication system according to an embodiment of this application.

FIG. 4 is a schematic diagram of another communication system 400 according to this application. As shown in FIG. 4, the system 400 includes an access network device 410 and a central control device 420. Optionally, the system may further include one or more of the following: a mobility management network element 430, a policy control network element 440, a management network element 450, a terminal device 460, and an application network element 470.

The access network device 410 is configured to: receive a sidelink configuration request message from a terminal device 460, where the sidelink configuration request message requests a communication resource corresponding to a first sidelink, the first sidelink is a sidelink established by the terminal device 460 for a first application, the sidelink configuration request message includes first proximity service information, the first proximity service information is a first proximity service discovery parameter or a first proximity service key, the first proximity service discovery parameter is used by the terminal device 460 to discover another terminal device 460 that uses the first application, and the first proximity service key is generated based on information about the first application and information about a first geographic area in which the terminal device 460 is allowed to use the first application through a sidelink; and send the first proximity service information to a central control device.

The central control device 420 is configured to: determine, based on a correspondence between proximity service information and information about a geographic area, that the first proximity service information corresponds to the first geographic area; and when the access network device 410 is located in the first geographic area, send first indication information to the access network device 410, where the first indication information indicates that the access network device 410 is allowed to configure the communication resource corresponding to the first sidelink for the terminal device 460, and the first sidelink is a sidelink established by the terminal device 460 for the first application, or when the access network device 410 is not in the first geographic area, send second indication information to the access network device 410, where the second indication information indicates that the access network device 410 is not allowed to configure the communication resource corresponding to the first sidelink for the terminal device 460.

Optionally, the management network element 450 is configured to: receive a request message from the terminal device 460, where the request message requests the first proximity service discovery parameter; generate the first proximity service discovery parameter based on the request message, and obtain the information about the first geographic area; send the first proximity service discovery parameter and the information about the first geographic area to the mobility management network element 430; and send the first proximity service discovery parameter to the terminal device 460.

The mobility management network element 430 is configured to send the first proximity service discovery parameter and the information about the first geographic area to the central control device.

It should be understood that the mobility management network element 430 may send the first proximity service key to the terminal device 460 by using the access network device 410.

Optionally, the application network element 470 is configured to send the information about the first application, the first proximity service discovery parameter, and the information about the first geographic area to the policy control network element 440.

The policy control network element 440 is configured to: generate the first proximity service key based on the information about the first application and the information about the first geographic area; and send the first proximity service key and the information about the first geographic area to the central control device, and send the first proximity service key to the terminal device 460.

It should be understood that the policy control network element 440 may send the first proximity service key to the terminal device 460 by using the mobility management network element 430 and the access network device 410.

Optionally, the management network element 450 is configured to: receive a request message from the terminal device 460, where the request message requests the first proximity service discovery parameter; generate the first proximity service discovery parameter based on the request message; and send the first proximity service discovery parameter to the terminal device 460.

According to the communication system provided in this application, in a manner, the management network element may provide the proximity service discovery parameter of the first application and the information about the corresponding first geographic area for the central control device by using the mobility management network element, and the mobility management network element may further provide the proximity service discovery parameter of the first application and the information about the corresponding first geographic area for the central control device. When requesting, from the access network device, the communication resource for using the first application through the sidelink, the terminal device may carry the first proximity service discovery parameter. The access network device may send the first proximity service discovery parameter to the central control device, and the central control device determines, based on the information about the first geographic area corresponding to the first proximity service discovery parameter, whether the terminal device is located in the first geographic area, so as to determine, based on a determining result, whether to allocate, to the terminal device, the communication resource for using the first application through the sidelink. This limits, at an application granularity, sidelink communication used by the terminal device. In another manner, the policy control network element may generate the first proximity service key based on the information about the first application and the information about the corresponding first geographic area that are provided by the application network element, and may provide the first proximity service key for the terminal device, and provide the first proximity service key and the information about the corresponding first geographic area for the central control device. When requesting, from the access network device, the communication resource for using the first application through the sidelink, the terminal device may carry the first proximity service key. The access network device may send the first proximity service key to the central control device, and the central control device determines, based on the information about the first geographic area corresponding to the first proximity service key, whether the terminal device is located in the first geographic area, so as to determine, based on a determining result, whether to allocate, to the terminal device, the communication resource for using the first application through the sidelink. This limits, at an application granularity, sidelink communication used by the terminal device.

It should be understood that in any one of the system 100, the system 200, the system 300, and the system 400, a network element other than the terminal device may be implemented by one device, or may be jointly implemented by a plurality of devices. This is not specifically limited in this embodiment of this application. It may be understood that functions of the network elements may be implemented by hardware, or may be implemented by software, or may be implemented by a combination of hardware and software.

It should be further understood that the management network element, the policy control network element, the mobility management network element, and the like are merely names, and the names do not constitute a limitation on the devices. In a 5G network and another future network, the foregoing network elements may also have other names. In addition, any system shown in FIG. 1 to FIG. 4 may further include another network element that interacts or communicates with a network element in the figure.

Any system shown in FIG. 1 to FIG. 4 may be implemented by a 5G system and another possible future system. This is not specifically limited in embodiments of this application. When any one of the foregoing systems is implemented by a 5G system, the terminal device, the access network device, the policy control network element, the mobility management network element, the application network element, and the management network element in the foregoing system may respectively correspond to UE, a RAN, a PCF, an AMF, an AF, and a DDNMF in the 5G system.

Figure 5:
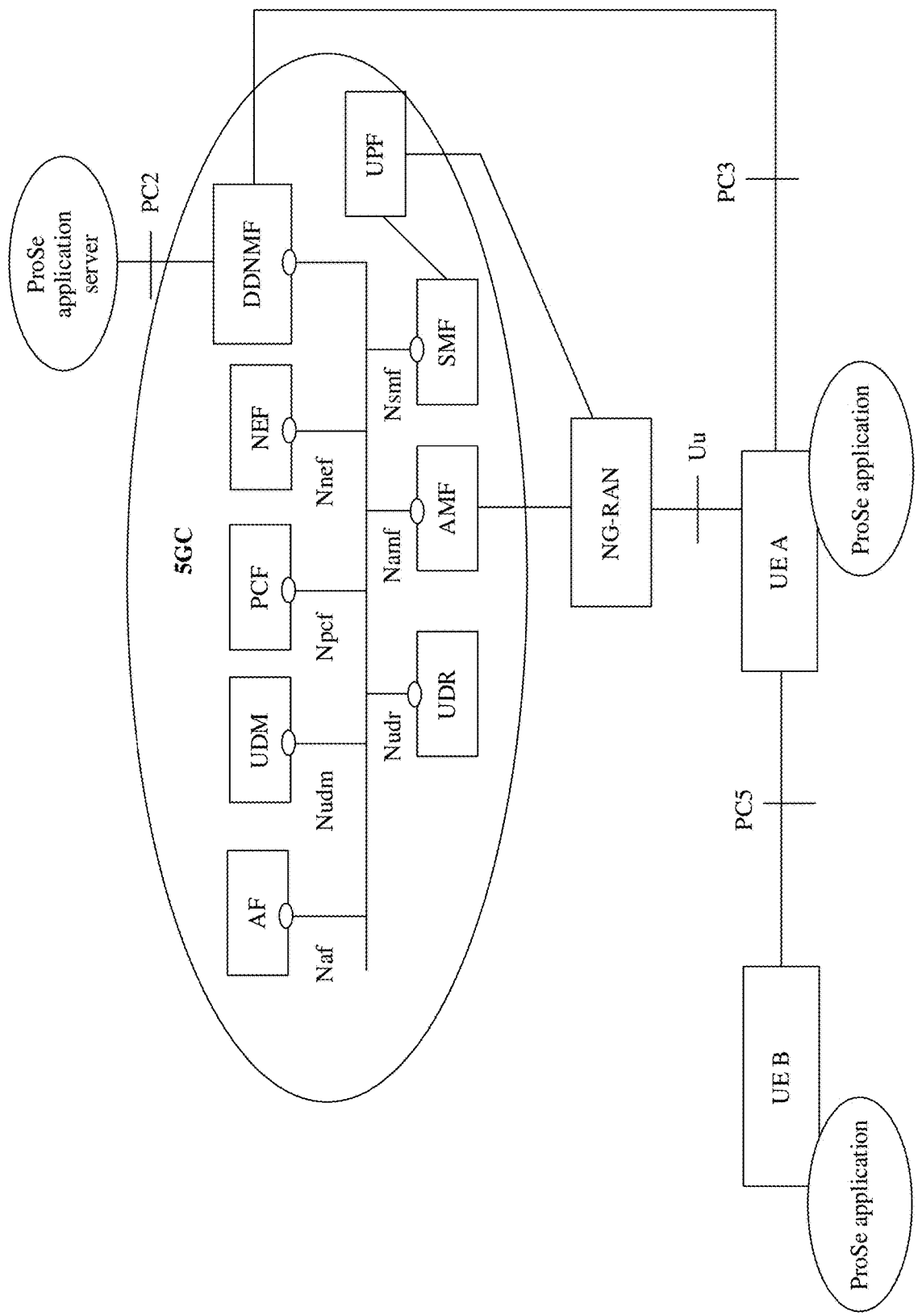
FIG. 5 is an example diagram of a 5G system architecture.

The following describes the 5G system with reference to FIG. 5.

FIG. 5 is an example diagram of a 5G system architecture. It should be understood that the 5G system architecture shown in FIG. 5 is merely an example of a 5G system architecture, and should not constitute any limitation on this application.

As shown in FIG. 5, the system includes an access and mobility management function (AMF), a session management function (session management function, SMF), a radio access network (RAN), a unified data management function (UDM), a policy control function (PCF), a user plane function (UPF), a user equipment (UE), a unified data repository (UDR), a network exposure function (NEF), a direct discovery name management function (DDNMF), and an application function (AF).

Main functions of the network elements are described as follows:

UDM: configured to manage subscription data and authentication data of a user.

UDR: configured to store and retrieve a PCF policy, store and retrieve structured data for exposure, store user information requested by the application function, and the like.

PCF: configured to manage network behavior, provide policies and rules for the control plane, and make policy decisions based on subscription information and the like.

SMF: mainly performs functions such as session management, execution of a control policy delivered by the PCF, UPF selection, and UE IP address allocation.

AMF: mainly used for functions related to access and mobility, for example, connection management, mobility management, registration management, access authentication and authorization, reachability management, and security context management.

UPF: mainly used for functions related to a user plane, for example, data packet routing and transmission, packet detection, service usage reporting, QoS processing, lawful interception, uplink packet detection, and downlink data packet storage.

(R)AN: a (radio) access network that corresponds to different access networks in 5G, for example, a wired access network and a wireless base station access network.

NEF: mainly connects a core network element to an external application server, and provides services such as authentication and data transfer when the external application server initiates a service request to a core network.

DDNMF: mainly responsible for allocation of a ProSe communication discovery parameter, used as a logical network element, and capable of being integrated into another network element during deployment.

AF: may be an application server corresponding to an application.

UE: can support ProSe communication or other services. The UE can receive or send messages over PC5 or Uu interfaces. It should be understood that UE A and UE B shown in the figure may support ProSe communication.

It should be understood that each network element shown in FIG. 5 may be a hardware device, or may be a chip, or may run a software function on dedicated hardware, or may be an instantiated virtualization function on a platform (for example, a cloud platform). It should be further understood that some network elements shown in FIG. 5 may be deployed at a same location (for example, on a same hardware device or a software function), or may be separately deployed. This is not limited in this application.

It should be further understood that the interfaces between the network elements shown in FIG. 5 are merely an example. In practice, the interfaces between the network elements may change.

In addition, the 5G network architecture shown in FIG. 5 is intended to describe the technical solutions in embodiments of this application more clearly, and does not constitute a limitation on the technical solutions provided in embodiments of this application. A person of ordinary skill in the art may learn that, with evolution of the network architecture, the technical solutions provided in embodiments of this application are also applicable to similar technical problems.

Figure 6:
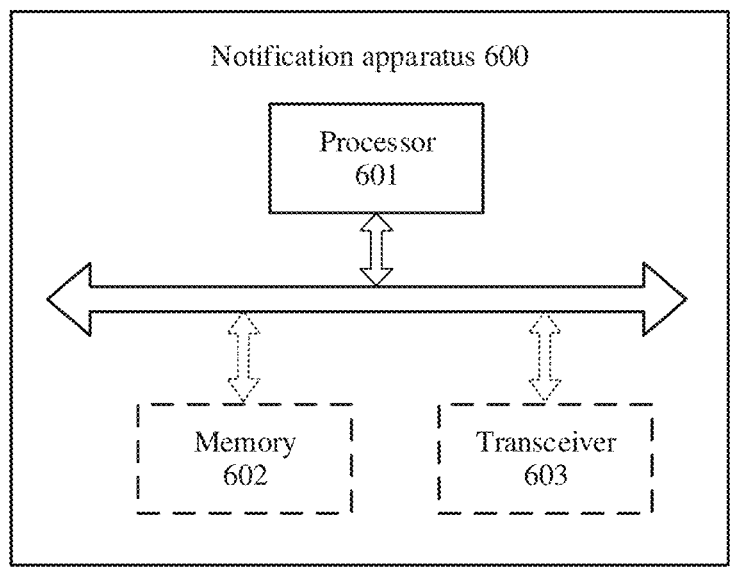
FIG. 6 is a schematic block diagram of a communication apparatus according to this application.

FIG. 6 is a schematic block diagram of a communication apparatus 600 according to an embodiment of this application. Any network element, such as a management network element, a policy control network element, or a mobility management network element, in any one of the foregoing systems 100 to 500 may be implemented by the communication apparatus shown in FIG. 6.

It should be understood that the communication apparatus 600 may be a physical device, may be a component (for example, an integrated circuit or a chip) of the physical device, or may be a functional module in the physical device.

As shown in FIG. 6, the communication apparatus 600 includes one or more processors 601. The processor 601 may store an executable instruction used to perform the method in the embodiments of this application. Optionally, the processor 601 may invoke an interface to implement receiving and sending functions. The interface may be a logical interface or a physical interface. This is not limited. For example, the interface may be a transceiver circuit or an interface circuit. The transceiver circuit or the interface circuit configured to implement the receiving and sending functions may be separated or may be integrated together. The transceiver circuit or the interface circuit may be configured to read and write code/data, or the transceiver circuit or the interface circuit may be configured to transmit or transfer a signal.

Optionally, the interface may be implemented through a transceiver. Optionally, the communication apparatus 600 may further include a transceiver 603. The transceiver 603 may be referred to as a transceiver unit, a transceiver circuit, or the like, and is configured to implement receiving and sending functions.

Optionally, the communication apparatus 600 may further include a memory 602. A specific deployment location of the memory 602 is not specifically limited in this embodiment of this application. The memory may be integrated into the processor, or may be independent of the processor. When the communication apparatus 600 does not include a memory, the communication apparatus 600 only needs to have a processing function, and the memory may be deployed at another location (for example, a cloud system).

The processor 601, the memory 602, and the transceiver 603 communicate with each other through an internal connection path, to transfer a control and/or data signal.

It may be understood that, although not shown, the communication apparatus 600 may further include another apparatus, for example, an input apparatus, an output apparatus, or a battery.

Optionally, in some embodiments, the memory 602 may store the executable instruction used to perform the method in the embodiments of this application. The processor 601 may execute the instruction stored in the memory 602, to complete, in combination with other hardware (for example, the transceiver 603), steps to be performed in the following methods. For a specific working process and beneficial effect, refer to descriptions in the following method embodiments.

The method disclosed in the embodiments of this application may be applied to the processor 603, or implemented by the processor 603. The processor 603 may be an integrated circuit chip and has a signal processing capability. In an implementation process, the steps of the method may be performed through a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

It may be understood that the memory 602 may be a volatile memory or a non-volatile memory, or may include both a volatile memory and a non-volatile memory. The non-volatile memory may be a read-only memory ROM, a programmable read-only memory (programmable ROM, PROM), an erasable programmable read-only memory (EPROM), an electrically erasable programmable read-only memory (EEPROM), or a flash memory. The volatile memory may be a random access memory RAM and may serve as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (, DR RAM). It should be noted that the memory of the systems and methods described in this specification includes but is not limited to these and any memory of another proper type.

For ease of understanding of this application, the following describes the solutions provided in this application by using names of network elements in a 5G system as an example. That is, the following network elements have the following correspondence with the network elements in the systems shown in FIG. 1 to FIG. 4:

UE: terminal device;
RAN: access network device;
PCF: policy control network element;
AMF: mobility management network element;
DDNMF: management network element;
AF: application network element.

In addition, it should be noted that, for any method described below, an execution sequence of steps included in the method is determined only by internal logic of the method, and is not limited by corresponding reference signs.

Figure 7A:
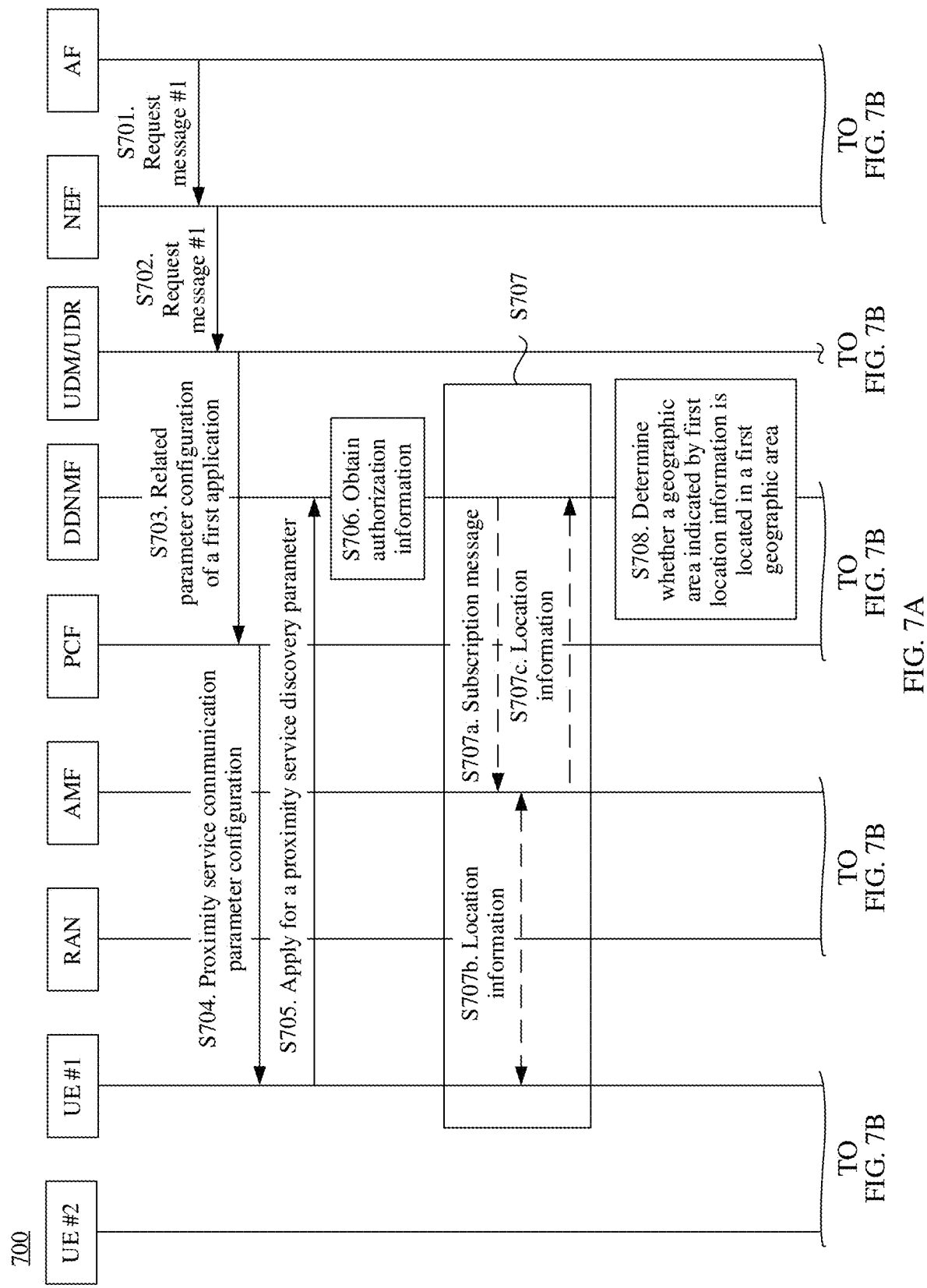

FIG. 7A to FIG. 7C are a schematic flowchart of a proximity service communication method 700 according to this application. The method 700 may be applied to the system 100 shown in FIG. 1.

S701. An AF requests an NEF to create or update a related parameter configuration of a first application.

The AF may send, to the NEF, a message for requesting to create or update the related parameter configuration of the first application, where the message is denoted as, for example, a request message #1. Correspondingly, the NEF receives the request message #1.

The request message #1 may include information about the first application and information about a first geographic area. The information about the first application indicates the first application. For example, the information about the first application may be one or more of the following: a data network name (DNN), a single network slice selection assistance information (S-NSSAI) AF service identifier, and an identifier of the first application (application ID). AF-Service-Identifier is an application function service identifier, which indicates an identifier of a specific service on the AF. The NEF may map AF-Service-Identifier to information that can be identified by a content network element in a core network, such as a corresponding DNN and/or S-NSSAI, or an application identifier (Application ID). The first geographic area is a geographic area in which the UE is allowed to use the first application through a sidelink. In other words, the UE can use the first application through a sidelink only when the UE is in the first geographic area. The information about the first geographic area may be geographic location coordinate information, such as longitude and latitude, or may be other information that may indicate a geographic location range.

In addition, if the first application is specific to a specific user (that is, specific UE), that is, only the specific user can use the first application, the request message #1 may further carry user information, where the user information indicates the specific user. The specific user includes a plurality of users, for example, the plurality of users may be a group of users. For example, user information (which may also be referred to as an identifier of the UE) may include one or more of the following: a general public subscription identifier (GPSI), an IP address of the UE, a media access control (MAC) address of the UE, and an external user group identifier (external group identifier). When the specific user is a group of UEs, the user information may be the external user group identifier. If the first application is for all UEs, that is, any UE can use the first application, the request message #1 may not carry the identification information of the UE.

For ease of understanding, an example in which UE #1 and UE #2 may use the first application is used below for description.

S702. The NEF verifies whether the AF is allowed to create or update the related parameter configuration of the first application, and after the verification succeeds, the NEF sends the request message #1 of the AF to a UDR or a UDM. Correspondingly, the UDR or the UDM receives the request message #1.

In addition, the NEF converts the information provided by the AF into internal (identifier) information that can be identified by the core network. For example, the NEF maps AF-Service-Identifier to a combination of a DNN and S-NSSAI or an application ID, maps a GPSI to a subscription permanent identifier (SUPI), and maps an external user group identifier to an internal group identifier.

It should be noted that, in an alternative manner of S701 and S702, if the AF network element is not a third-party network element or has been authenticated by an operator, the AF may not send the request message #1 to the UDR or the UDM by using the NEF network element, but directly send the request message #1 to the UDR or the UDM. In this case, the information about the first application and the identification information of the specific UE that are carried in the AF network element may be an internal identifier that can be identified by the core network (that is, an identifier obtained after conversion performed by the NEF).

S703. The PCF obtains the related parameter configuration of the first application from the UDM or the UDR.

When registering with a core network or updating a user policy (UE Policy), the UE #1 needs to request latest user policy information from the PCF, where the latest user policy information includes proximity service communication policy information. Specifically, when registering with the core network, the UE #1 may carry proximity service communication capability information. After receiving the information, the AMF may select, based on a configuration of an operator, a PCF to provide a proximity service communication policy for the UE #1, and request user policy information from the selected PCF. After receiving the request from the AMF, the PCF obtains related policy information of the UE #1 from the UDM or the UDR. For example, the related policy information may include subscription data, policy data, and application data of the UE #1. In this step, the UDM or the UDR may send the related parameter configuration that is of the first application and that is provided by the AF as a part of application data to the PCF. In addition, the PCF may subscribe to a data update notification service (that is, a Nudr_DM_Subscribe service) of the UE from the UDR, and the subscription message carries an identifier of the UE #1 and/or the information about the first application. When the subscription data, the policy data, or the application data of the UE #1 changes, the UDR may notify the PCF of a change result (by using a Nudr_DM_Notify service).

In addition to triggering provision of the proximity service communication policy in the registration process, when a user policy of the UE #1 needs to be updated, or subscription data of the UE #1 is updated (for example, the AF network element, the UDM network element, or the UDR network element updates the service-related parameter configuration information), step S703 is also triggered.

If the AF includes user information in the related parameter configuration of the first application, that is, the related parameter configuration of the first application is only specific to some users, the UDM or the UDR may send only the related parameter configuration of the first application to the specified UE by using the PCF (for example, the UDM or the UDR may determine the specific UE based on the SUPI provided by the PCF). If the AF does not include the user information in the related parameter configuration of the first application, the UDM or the UDR sends, by using the PCF, the application data to all UEs that can obtain the proximity service communication parameter.

S704. The PCF network element sends a proximity service communication parameter configuration to the UE #1, where the proximity service communication parameter configuration includes the related parameter configuration that is of the first application and that is provided by the AF. Correspondingly, the UE #1 receives the proximity service communication parameter configuration sent by the PCF.

For example, the PCF network element may store the related parameter configuration of the first application in a user policy container, and send the user policy container to the UE #1 along with the user configuration information of the UE #1 by using the AMF network element.

S705. The UE #1 applies for a proximity service discovery parameter from a DDNMF.

When the UE #1 needs to use the first application through a sidelink, the UE #1 may send a request message #2 to the DDNMF. Correspondingly, the DDNMF receives the request message #2.

The request message #2 requests the proximity service discovery parameter of the first application, and the proximity service discovery parameter is used to discover another UE (for example, UE #2) that uses the first application. The request message #2 may include the information about the first application. Optionally, the request message #2 may further include the identifier of the UE #1.

For example, if the DDNMF is deployed in a control plane on the core network, the UE #1 may include a proximity service container in a NAS message sent to the AMF, where the proximity service container includes a proximity service discovery parameter application (where the application requests the proximity service discovery parameter) and the information about the first application. Optionally, the identifier of the UE #1 may be further included. After receiving the NAS message, the AMF forwards the proximity service container to the DDNMF.

For another example, if the DDNMF is deployed in the user plane, the UE may directly use an IP address or a domain name of the DDNMF to send the request message #2 to the DDNMF.

S706. The DDNMF obtains authorization information of the UE #1.

After receiving the request message #2 of the UE #1, the DDNMF obtains the authorization information of the UE #1 from the PCF, the UDM, or the UDR. Specifically, the DDNMF may send an authorization information request message to the PCF, the UDM, or the UDR, where the authorization information request message may include identification information of the UE #1 and/or the information about the first application. After receiving the authorization information request message, the PCF, the UDM, or the UDR feeds back the authorization information of the UE #1 to the DDNMF. The authorization information may include information about whether the UE #1 is authorized to use sidelink communication, or information about whether the UE #1 is authorized to use the first application, and the information about the first geographic area.

S707. The DDNMF obtains location information of the UE #1.

In a manner, a first network element may send the location information of the UE #1 to the DDNMF. For example, the DDNMF may subscribe to the location information of the UE #1 from the first network element. For example, the first network element may be an AMF, or another network element that can obtain the location information of the UE #1, for example, a location management function (LMF) or an AF. For example, the first network element is an AMF. S707 may include the following steps.

S707a. The DDNMF sends a subscription message to the AMF. Correspondingly, the AMF receives the subscription message.

The subscription message may include the identifier of the UE #1, and the subscription message is used to subscribe to information related to a location of the UE #1.

S707b. The AMF obtains the location information of the UE #1 by using an identifier of a RAN connected to the UE #1.

S707c. The AMF sends the location information of the UE #1 to the DDNMF. Correspondingly, the DDNMF receives the location information of the UE #1 that is sent by the AMF.

In another manner, the request message #2 may include the location information of the UE #1.

S708. The DDNMF determines whether a geographic area indicated by the location information is located in the first geographic area.

S709. If the geographic area indicated by the location information is located in the first geographic area, the DDNMF sends, to the UE #1, the proximity service discovery parameter that is of the first application and that is requested by the UE #1. Correspondingly, the UE #1 receives the proximity service discovery parameter.

S710. If the geographic area indicated by the location information is not in the first geographic area, the DDNMF sends a response message to the UE #1, where the response message notifies the UE #1 that the DDNMF rejects allocation of the proximity service discovery parameter that is of the first application and that is requested by the UE #1. Correspondingly, the UE #1 receives the response message.

It should be understood that in practice, only one of the two steps S709 and S710 is performed.

S711. The UE #1 establishes a sidelink (denoted as a first sidelink below) with the UE #2.

The UE #1 discovers the UE #2 by broadcasting the proximity service discovery parameter of the first application, and establishes a sidelink with the UE #2. For details about how to discover peer UE by using the proximity service discovery parameter and how to establish a sidelink between two UEs, refer to the current technologies. Details are not described herein. It should be understood that establishing a sidelink between the UE #1 and the UE #2 may also be understood as establishing a PC5 connection between the UE #1 and the UE #2.

It should be noted that the UE #2 also needs to perform steps similar to steps S703 to S710, to obtain the proximity service discovery parameter of the first application.

S712. The UE #1 sends a sidelink configuration request message to the RAN. Correspondingly, the RAN receives the sidelink configuration request message sent by the UE #1.

The sidelink configuration request message requests the RAN to configure, for the UE #1, a communication resource corresponding to the first sidelink. The sidelink configuration request message may include QoS configuration information (PC5 QoS Profile) of the first sidelink. The QoS configuration information of the first sidelink includes QoS information of the first sidelink, and the QoS information of the first sidelink may include a QoS flow identifier of the first sidelink, that is, a corresponding QoS parameter. The QoS parameter may be a standardized PC5 QoS identifier (PQI). Different PQI values correspond to different QoS parameter combinations. The QoS parameter includes a delay, a packet loss rate, a priority, and the like, or a specific QoS parameter such as a delay, a packet loss rate, and a priority.

Optionally, the sidelink configuration request message may further include an identifier of the first sidelink. The identifier of the first sidelink is a link identifier generated by the UE #1. For example, identifiers that are of the first sidelink, namely, the PC5 sidelink, and that are generated by the UE #1 and the UE #2 may be different.

S713. The RAN sends a sidelink configuration response message to the UE #1. The sidelink configuration response message is for configuring the communication resource corresponding to the first sidelink. Correspondingly, the UE #1 receives the sidelink configuration response message sent by the RAN.

The communication resource corresponding to the first sidelink may be an SLRB configuration, and the SLRB configuration is for establishing an SLRB corresponding to the first sidelink.

After receiving the sidelink configuration response message, the UE #1 may establish an SLRB corresponding to the first sidelink with the UE #2, and then may use the first application through the first sidelink.

According to the proximity service communication method provided in this application, when the UE requests the communication resource corresponding to the first sidelink, the DDNMF may determine, based on the location information of the UE, whether the UE is located in the geographic area in which the UE can use the first application through a sidelink, to determine whether to provide the proximity service parameter for the UE. This limits, at an application granularity, sidelink communication used by the UE.

Optionally, the method may further include one or more of the following steps.

S714. The UE #1 sends sidelink information to the DDNMF. Correspondingly, the DDNMF receives the sidelink information sent by the UE #1.

The sidelink information includes the identifier of the first sidelink established by the UE #1 for the first application and the information about the first application.

S715. The first network element sends location indication information of the UE #1 to the DDNMF. Correspondingly, the UE #1 receives the location indication information.

For ease of understanding, the location indication information herein is denoted as first location indication information. In addition, for example, the first network element in the following description is the AMF.

For example, the first network element may periodically feed back the location information of the UE #1 to the DDNMF. In this case, the first location indication information may be specifically a geographical location of the UE, for example, a longitude and a latitude. For another example, the first network element may also feed back an event. The event is that the UE #1 leaves the first geographic area or the UE #1 re-enters the first geographic area. In this case, the first location indication information is specifically an event.

S716. When the first location indication information indicates that the UE #1 is not in the first geographic area, the DDNMF sends a first update message to the UE #1. Correspondingly, the UE #1 receives the first update message sent by the DDNMF.

The first update message notifies the UE #1 that the proximity service discovery parameter that is of the first application and that is allocated in step S709 becomes invalid. After receiving the first update message, the UE #1 may delete the proximity service discovery parameter.

For example, in step S709, when sending the proximity service discovery parameter of the first application to the UE #1, the DDNMF may further send an identifier corresponding to the proximity service discovery parameter. For example, the identifier is denoted as a discovery entry identifier (Discovery Entry ID). Correspondingly, in S716, the first update message may include the discovery entry identifier.

Optionally, the first update message may further notify a cause why the proximity service discovery parameter becomes invalid, and the cause is that the UE #1 is not in the first geographic area.

S717. The DDNMF sends first resource release indication information to the RAN. Correspondingly, the RAN receives the first resource release indication information sent by the DDNMF.

If the DDNMF obtains the identifier of the first sidelink in step S714, when the DDNMF obtains, from the first network element, that a location of the UE #1 is outside the first geographic area, the DDNMF may send the first resource release indication information to the RAN by using the AMF. The first resource release indication information may include the identifier of the first sidelink, and the first resource release indication information is for releasing a resource for establishing the first sidelink, and/or the first resource release indication information indicates the RAN to release the communication resource corresponding to the first sidelink. It should be understood that, the resource for establishing the first sidelink is used only for establishing the first sidelink, and when communication needs to be performed through the first sidelink, the UE #1 further needs to establish an SLRB based on the communication resource corresponding to the first sidelink.

For example, the first resource release indication information may be carried in a Namf_Communication_N1N2MessageTransfer service message, the first resource release indication information may be included in an N2 container, and the Namf_Communication_N1N2MessageTransfer service message may include the identifier of the UE #1 and the identifier of the first sidelink.

S718. The RAN sends second resource release indication information to the UE #1, where the second resource release indication information is for releasing the communication resource corresponding to the first sidelink. Correspondingly, the UE #1 receives the second resource release indication information sent by the RAN.

Based on the method, when the UE #1 leaves the first geographic area, the DDNMF may indicate to the UE #1 that the previously allocated proximity service discovery parameter of the first application becomes invalid, so that the UE #1 can be controlled not to use the first application when the UE #1 is not in the first geographic area. In addition, when the UE #1 leaves the first geographic area, a resource used by the UE #1 to establish a sidelink and/or a resource used by the UE #1 to perform communication through a sidelink may be released, so as to facilitate proper utilization of resources.

S719. The first network element sends the location indication information of the UE #1 to the DDNMF. Correspondingly, the UE #1 receives the location indication information sent by the DDNMF.

For ease of understanding, the location indication information herein is denoted as second location indication information.

The second location indication information may be a geographic location of the UE #1 that is periodically sent, or may be an event that the UE #1 leaves the first geographic area or the UE #1 re-enters the first geographic area.

S720. If the second location indication information indicates that the UE #1 is located in the first geographic area, the DDNMF sends a second update message to the UE #1, where the second update message is for allocating the proximity service discovery parameter. Correspondingly, the UE #1 receives the second update message sent by the DDNMF.

When the UE #1 returns to the first geographic area again, the DDNMF may re-allocate the proximity service discovery parameter of the first application to the UE #1.

Optionally, the second update message may further include a cause why the proximity service discovery parameter is allocated, and the cause is that the UE #1 returns to the first geographic area.

This application further provides several other proximity service communication methods. The following separately describes the methods with reference to FIG. 8A to FIG. 13B. It should be noted that, for content that has been explained and described above, for example, a possible form of the information about the first application and a meaning of the proximity service parameter, refer to the foregoing descriptions unless otherwise specified below.

Figure 8A:
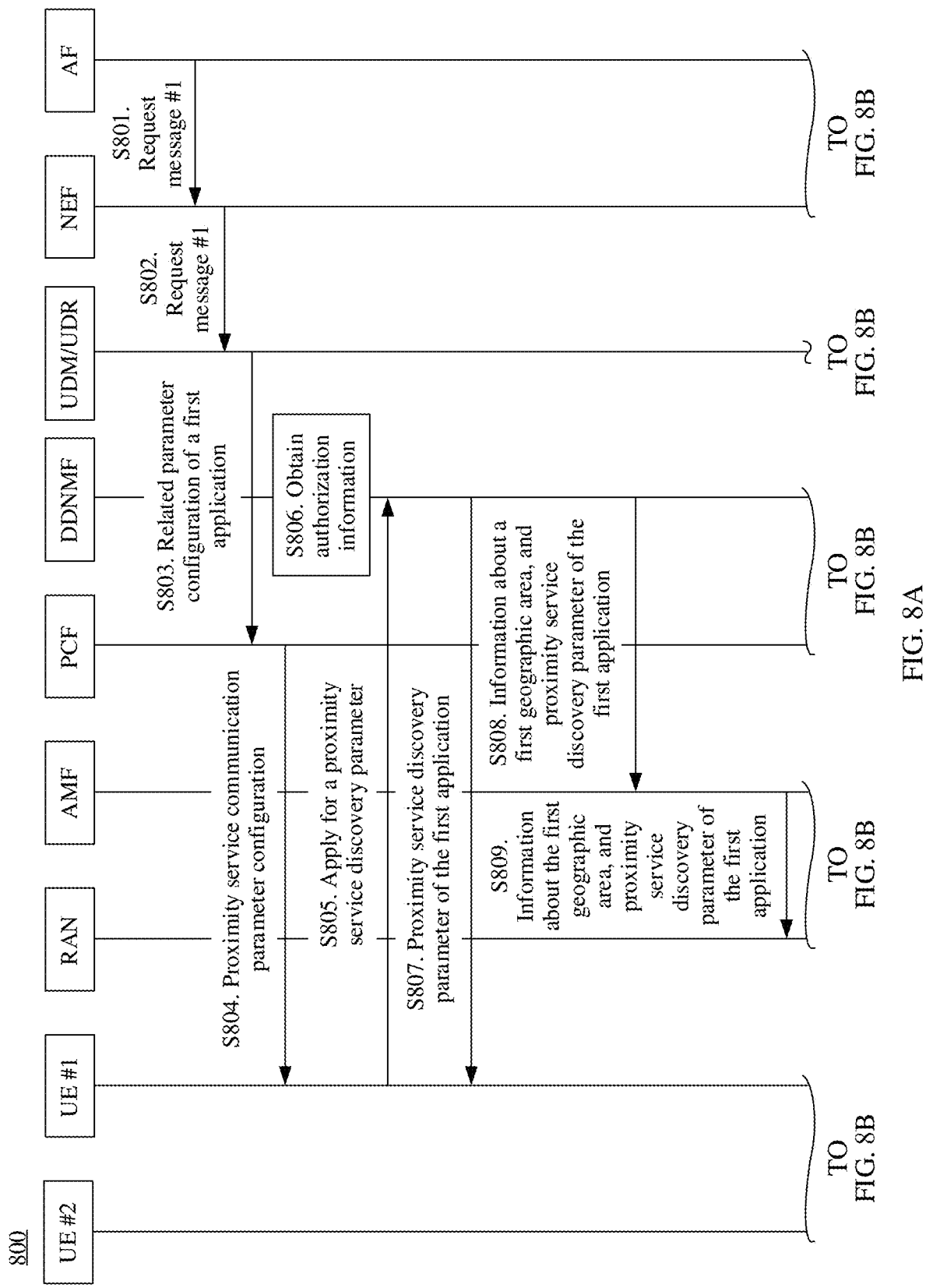
FIG. 8A and FIG. 8B are a schematic flowchart of a proximity service communication method according to this application.
Figure 8B:
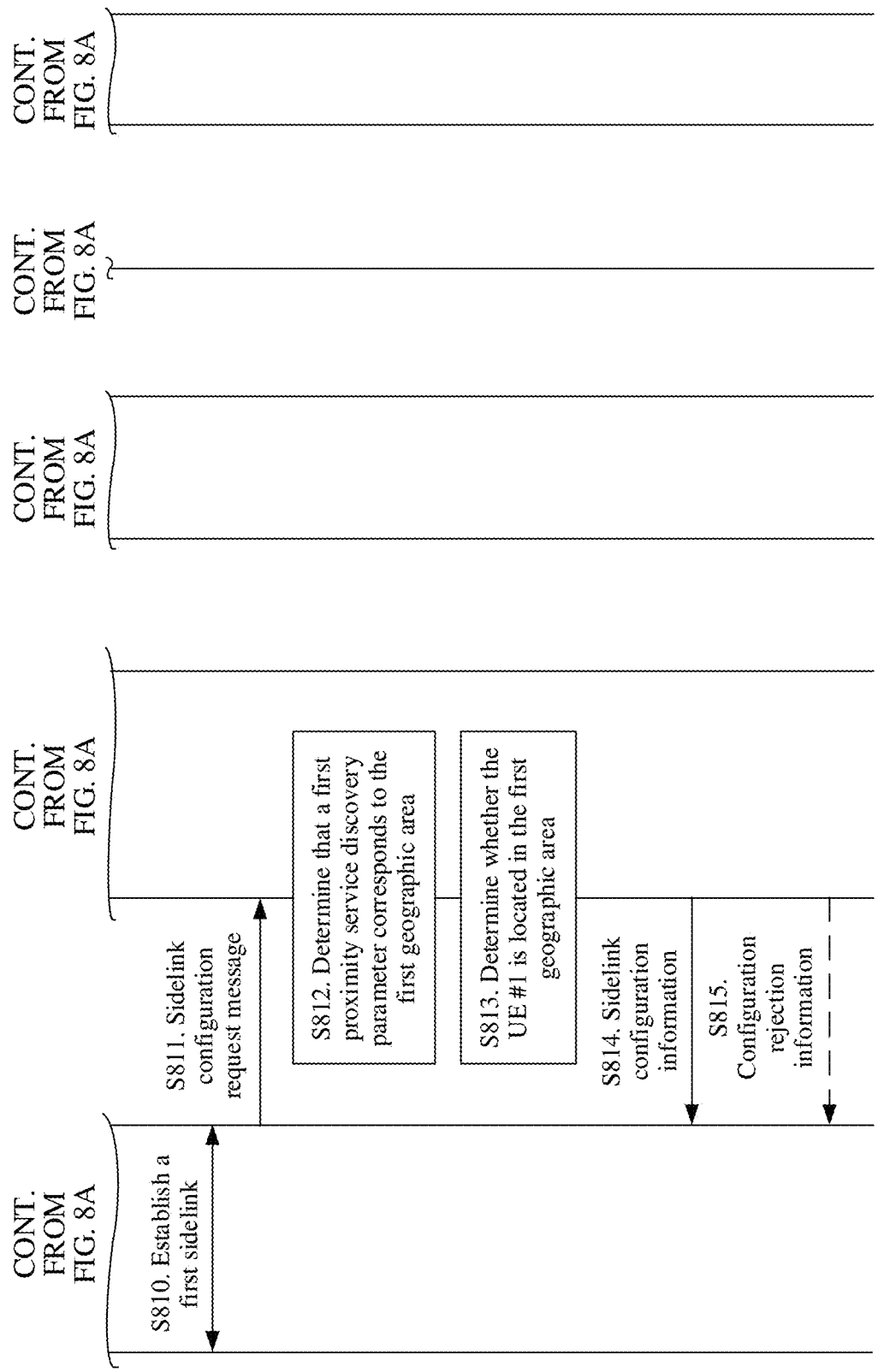

FIG. 8A and FIG. 8B are a schematic flowchart of a proximity service communication method according to this application. The method 800 may be applied to the system 200 shown in FIG. 2.

S801 to S806 are the same as steps S701 to S706 in the method 700.

S807. The DDNMF sends, to the UE #1, the proximity service discovery parameter that is of the first application and that is requested by the UE #1. Correspondingly, the UE #1 receives the proximity service discovery parameter that is of the first application and that is sent by the DDNMF.

S808. The DDNMF sends the information about the first geographic area and the proximity service discovery parameter of the first application to the AMF. Correspondingly, the AMF receives the information about the first geographic area and the proximity service discovery parameter of the first application that are sent by the DDNMF.

Optionally, the DDNMF may further send the identifier of the UE #1 to the AMF.

S809. The AMF sends the information about the first geographic area and the proximity service discovery parameter of the first application to at least one RAN. Correspondingly, the at least one RAN receives the information about the first geographic area and the proximity service discovery parameter of the first application that are sent by the AMF.

Optionally, the AMF may send the information about the first geographic area and the proximity service discovery parameter of the first application to the at least one RAN as a part of context of the UE #1.

The at least one RAN may be all RANs connected to the AMF.

S810. The UE #1 establishes a first sidelink with the UE #2.

This step is the same as S711.

S811. The UE #1 sends a sidelink configuration request message to the RAN. Correspondingly, the RAN receives the sidelink configuration request message sent by the UE #1.

The sidelink configuration request message includes the proximity service discovery parameter of the first application. In addition, the sidelink configuration request message may further include QoS configuration information of the first sidelink. For specific content of the QoS configuration information of the first sidelink, refer to the foregoing descriptions of S712.

S812. The RAN determines, based on a correspondence between a proximity service discovery parameter and information about a geographic area, that the proximity service discovery parameter of the first application is corresponding to the first geographic area.

Specifically, the RAN may store the correspondence between the proximity service discovery parameter and the information about the geographic area sent by the AMF, for example, store a correspondence between the proximity service discovery parameter of the first application and the information about the first geographic area. When receiving the proximity service discovery parameter that is of the first application and that is carried in the sidelink configuration request message, the RAN may determine, based on the correspondence between the proximity service discovery parameter and the information about the geographic area, that the proximity service discovery parameter of the first application corresponds to the first geographic area.

S813. The RAN determines whether the UE #1 is located in the first geographic area.

S814. If the UE #1 is located in the first geographic area, the RAN sends sidelink configuration information to the UE #1. The sidelink configuration information is for configuring a corresponding communication resource for the first sidelink. Correspondingly, the UE #1 receives the sidelink configuration information sent by the RAN.

Optionally, the sidelink configuration information may further include a cause why the communication resource corresponding to the first sidelink is configured, and the cause is that the UE #1 is located in the first geographic area.

S815. If the UE #1 is not in the first geographic area, the RAN sends a configuration rejection message to the UE #1. The configuration rejection message is for rejecting configuration of the corresponding communication resource for the first sidelink. Correspondingly, the UE #1 receives the configuration rejection message sent by the RAN.

Optionally, the configuration rejection message further indicates a cause why configuration of the corresponding communication resource for the first sidelink is rejected. The cause is that the UE #1 is not in the first geographic area.

It should be understood that in practice, only one of the two steps S814 and S815 is performed, and the two steps are not performed simultaneously.

Optionally, the method may further include the following step.

When the UE #1 is handed over from the RAN to a target RAN, the RAN sends the proximity service discovery parameter of the first application and the information about the corresponding first geographic area to the target RAN. Correspondingly, the target RAN receives the proximity service discovery parameter of the first application and the information about the corresponding first geographic area that are sent by the RAN.

In other words, if the UE #1 is handed over to a RAN due to movement or the like, the proximity service discovery parameter of the first application and the information about the corresponding first geographic area may be sent by a source RAN to a target RAN during the handover. In this way, the target RAN may determine, based on whether the UE #1 is in the first geographic area, whether to continue to allocate, to the UE #1, a communication resource corresponding to a new first sidelink.

In conclusion, according to the proximity service communication method provided in this application, the DDNMF may send the proximity service discovery parameter of the first application and the information about the corresponding first geographic area to the RAN, and send the proximity service discovery parameter of the first application to the UE. When requesting, from the RAN, the communication resource for using the first application through a sidelink, the UE may carry the proximity service discovery parameter of the first application. The RAN determines, based on the information about the first geographic area corresponding to the proximity service discovery parameter of the first application, whether the UE is located in the first geographic area, so as to determine, based on a determining result, whether to allocate, to the UE, the communication resource for using the first application through a sidelink. This limits, at an application granularity, sidelink communication used by the UE.

The method 800 differs from the method 700 in that the DDNMF does not need to monitor a location of the UE, but the RAN determines whether a geographic area in which the UE is located is in a geographic area in which the UE can use the first application through a sidelink. This reduces changes of a core network element.

Figure 9A:
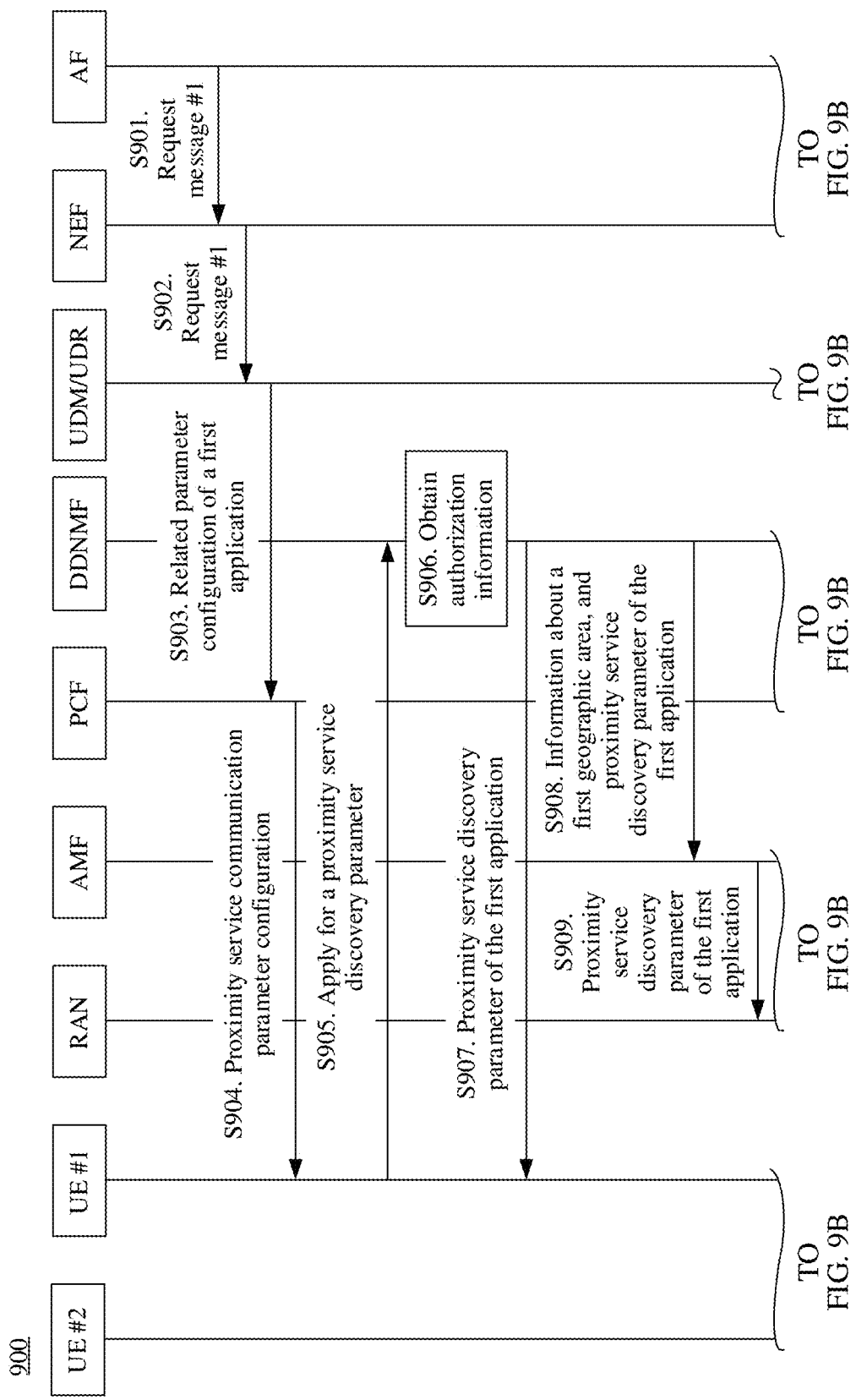
FIG. 9A and FIG. 9B are a schematic flowchart of a proximity service communication method according to this application.
Figure 9B:
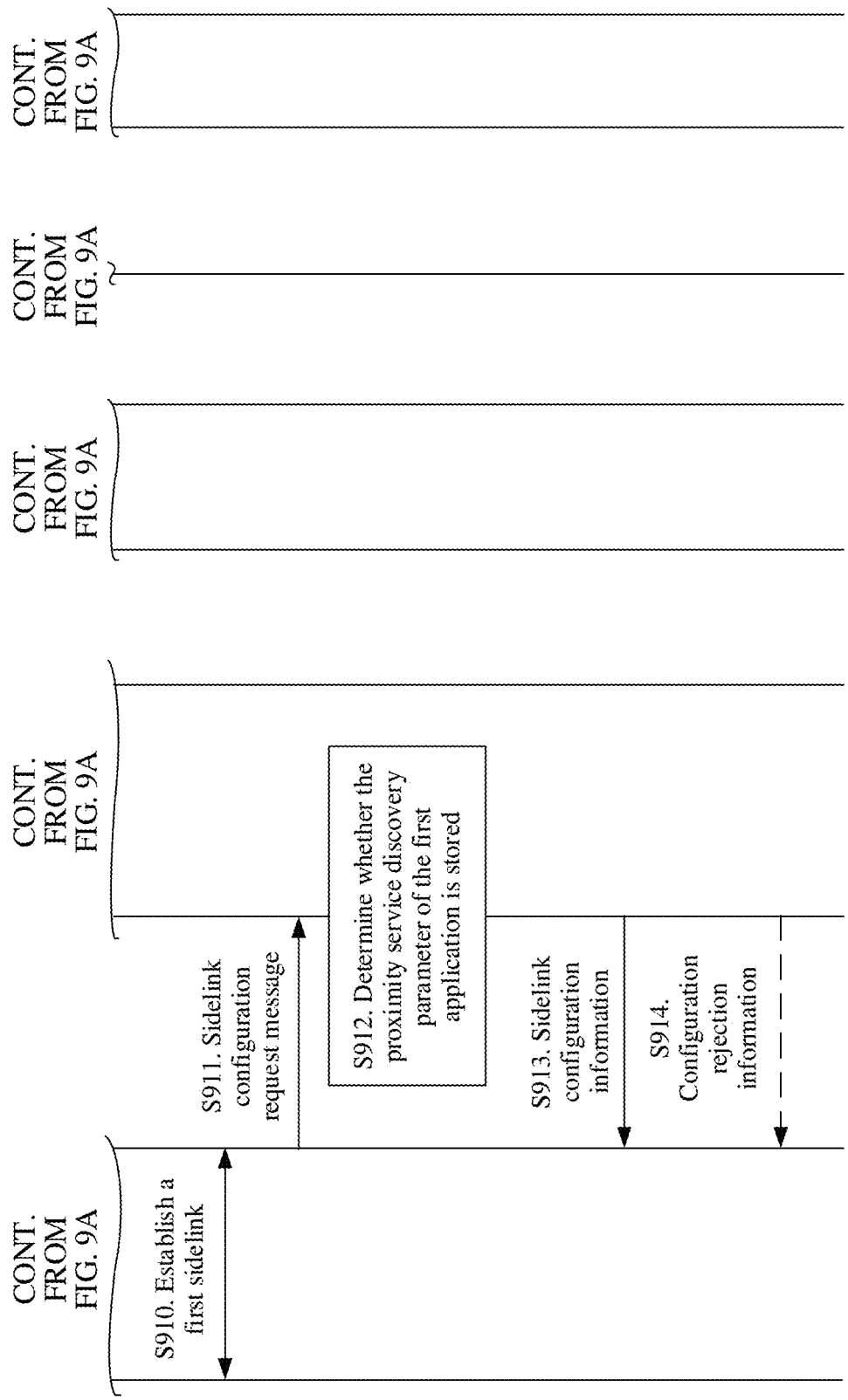

FIG. 9A and FIG. 9B are a schematic flowchart of a proximity service communication method according to this application. The method 900 may be applied to the system 200 shown in FIG. 2. The method differs from the method 800 in: In the method 800, the AMF may send the proximity service discovery parameter of the first application and the information about the corresponding first geographic area to all connected RANs, and the RAN determines, based on the proximity service discovery parameter of the first application provided by the UE, whether the UE is in the corresponding first geographic area, so as to determine whether to allocate, to the UE, the communication resource for using the first application through a sidelink. However, in the method 900, the AMF sends the proximity service discovery parameter of the first application only to the RAN located in the first geographic area, so that the RAN indirectly determines, based on whether the proximity service discovery parameter of the first application is stored, whether the UE is in the corresponding first geographic area, so as to determine whether to allocate, to the UE, the communication resource for using the first application through a sidelink.

S901 to S908 are the same as steps S801 to S808 in the method 800.

S909. The AMF sends the proximity service discovery parameter of the first application to at least one RAN. Correspondingly, the at least one RAN receives the proximity service discovery parameter of the first application sent by the AMF.

Optionally, the AMF may send the proximity service discovery parameter of the first application to the at least one RAN as a part of context of the UE #1.

The at least one RAN is located in the first geographic area. In other words, in S909, the AMF may send the proximity service discovery parameter of the first application to the RAN located in the first geographic area.

S910. The UE #1 establishes a first sidelink with the UE #2. This step is the same as S711 and S810.

S911. The UE #1 sends a sidelink configuration request message to the RAN. Correspondingly, the RAN receives the sidelink configuration request message sent by the UE #1. This step is the same as S811.

S912. The RAN determines whether the proximity service discovery parameter of the first application is stored.

S913. If the RAN stores the proximity service discovery parameter of the first application, the RAN sends sidelink configuration information to the UE #1. The sidelink configuration information is for configuring a corresponding communication resource for the first sidelink. Correspondingly, the UE #1 receives the sidelink configuration information sent by the RAN.

Optionally, the sidelink configuration information may further include a cause why the communication resource corresponding to the first sidelink is configured, and the cause is that the UE #1 is located in the first geographic area.

S914. If the RAN does not store the proximity service discovery parameter of the first application, the RAN sends a configuration rejection message to the UE #1. The configuration rejection message is for rejecting configuration of the corresponding communication resource for the first sidelink. Correspondingly, the UE #1 receives the configuration rejection message sent by the RAN.

If the RAN stores the proximity service discovery parameter of the first application, it indicates that the RAN is located in the first geographic area, and the UE #1 is located in the first geographic area, either. Therefore, the RAN may configure, for the UE #1, the communication resource corresponding to the first sidelink. In this case, the UE #1 and the UE #2 can use the first application through the first sidelink.

If the RAN does not store the proximity service discovery parameter of the first application, it indicates that the RAN is not in the first geographic area, and the UE #1 is not in the first geographic area either. Therefore, the RAN may reject configuration of the communication resource corresponding to the first sidelink for the UE #1. In this case, the UE # and the UE #2 cannot use the first application through the first sidelink.

Optionally, the configuration rejection message further indicates a cause why configuration of the corresponding communication resource for the first sidelink is rejected, and the cause is that the UE #1 is not in the first geographic area.

It should be understood that in practice, only one of the two steps S913 and S914 is performed, and the two steps are not performed simultaneously.

Optionally, the method may further include the following step.

When the UE #1 is handed over from the RAN to a target RAN, if the target RAN is located in the first geographic area, the RAN sends the proximity service discovery parameter of the first application to the target RAN. Correspondingly, the target RAN receives the proximity service discovery parameter of the first application sent by the RAN.

In other words, if the UE #1 is handed over to a RAN due to movement or the like, if the target RAN is located in the first geographic area, the proximity service discovery parameter of the first application may be sent by a source RAN to a target RAN during the handover. In this way, the target RAN may determine, based on whether the proximity service discovery parameter of the first application is stored, whether to continue to allocate, to the UE #1, a communication resource corresponding to a new first sidelink.

In conclusion, according to the proximity service communication method provided in this application, the DDNMF may send the proximity service discovery parameter of the first application to the RAN located in the first geographic area corresponding to the proximity service discovery parameter. When requesting, from the RAN, the communication resource for using the first application through a sidelink, the UE may carry the proximity service discovery parameter of the first application. The RAN may determine, based on whether the proximity service discovery parameter of the first application is stored, whether the UE is located in the first geographic area, so as to determine, based on a determining result, whether to allocate, to the UE, the communication resource for using the first application through the sidelink. This limits, at an application granularity, side communication used by the UE.

The method 900 differs from the method 700 in that, the DDNMF does not need to monitor a location of the UE, but the RAN determines whether the first proximity service discovery parameter is stored. This reduces changes of a core network element.

Figure 10A:
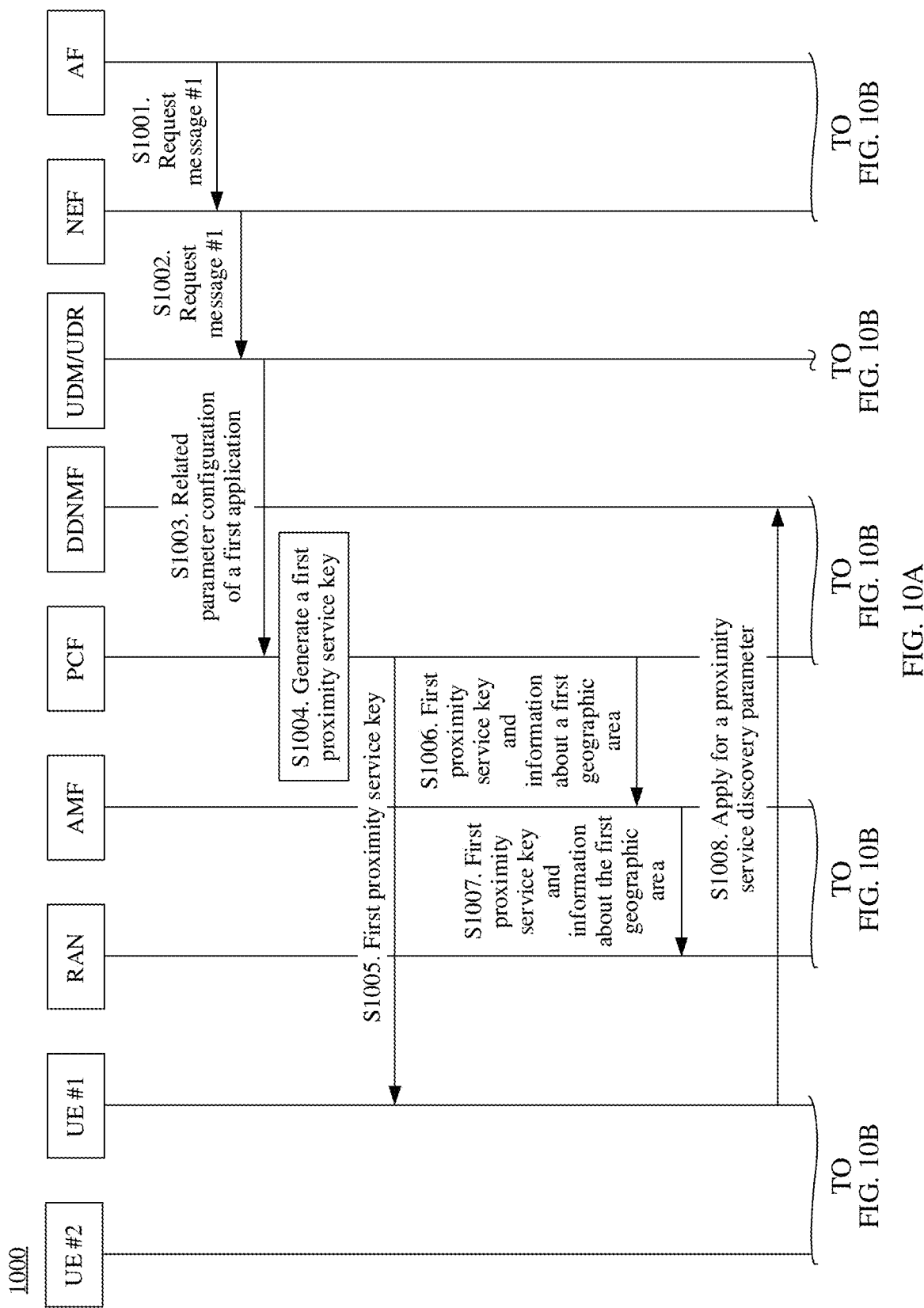
FIG. 10A and FIG. 10B are a schematic flowchart of a proximity service communication method according to this application.
Figure 10B:
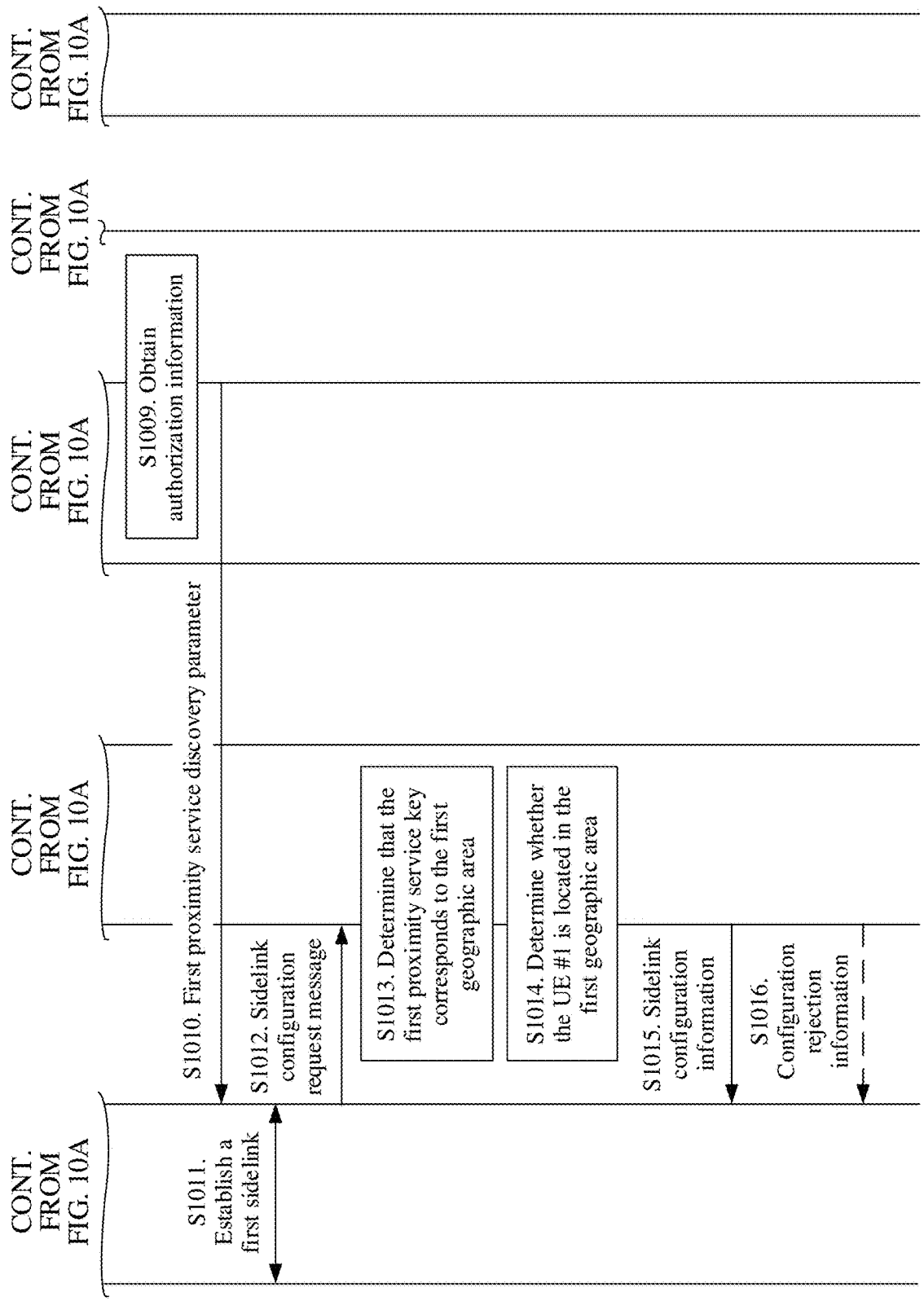

FIG. 10A and FIG. 10B are a schematic flowchart of a proximity service communication method according to this application. The method 1000 may be applied to the system 300 shown in FIG. 3.

S1001 to S1003 are the same as steps S701 to S703 in the method 700.

S1004. The PCF generates a first proximity service key based on the information about the first application or based on the information about the first application and the information about the first geographic area.

If geographic areas in which all UEs can use the first application are the first geographic area, the PCF may generate a key, that is, the first proximity service key, based on the information about the first application. If geographic areas in which different UEs can use the first application are different, the PCF may generate the first proximity service key based on the information about the first application, the information about the first geographic area, and an identifier of UE #1.

S1005. The PCF sends the first proximity service key to the UE #1. Correspondingly, the UE #1 receives the first proximity service key sent by the PCF.

The PCF network element may store the first proximity service key in a user policy container, and send the user policy container to the UE #1 along with user configuration information of the UE #1 by using an AMF network element.

S1006. The PCF sends the first proximity service key and the information about the first geographic area to the AMF. Correspondingly, the AMF receives the first proximity service key and the information about the first geographic area that are sent by the PCF.

Optionally, the PCF may further send the identifier of the UE #1.

S1007. The AMF sends the first proximity service key and the information about the first geographic area to at least one RAN. Correspondingly, the at least one RAN receives the first proximity service key and the information about the first geographic area that are sent by the AMF.

Optionally, the AMF may further send the identifier of the UE #1.

Optionally, the AMF may send the first proximity service key and the information about the first geographic area to the at least one RAN as a part of context of the UE #1.

The at least one RAN may be all RANs connected to the AMF.

S1008 to S1010 are the same as S805 to S807 in the method 800.

S1011. The UE #1 establishes a first sidelink with the UE #2. This step is the same as S810.

S1012. The UE #1 sends a sidelink configuration request message to the RAN. Correspondingly, the RAN receives the sidelink configuration request message sent by the UE #1.

The sidelink configuration request message includes the first proximity service key. In addition, the sidelink configuration request message may further include QoS configuration information of the first sidelink. For specific content of the QoS configuration information of the first sidelink, refer to the foregoing descriptions of S712.

S1013. The RAN determines, based on a correspondence between a proximity service key and information about a geographic area, that the first proximity service key corresponds to the first geographic area.

Specifically, the RAN may store the correspondence that is between the proximity service key and the information about the geographic area and that is sent by the AMF, for example, store a correspondence between the first proximity service key and the information about the first geographic area. When receiving the first proximity service key carried in the sidelink configuration request message, the RAN may determine, based on the correspondence between the proximity service key and the information about the geographic area, that the first proximity service key corresponds to the first geographic area.

S1014 to S1016 are the same as steps S813 to S815.

In other words, the RAN determines whether the UE #1 is located in the first geographic area. If the UE #1 is located in the first geographic area, the RAN sends sidelink configuration information to the UE #1. The sidelink configuration information is for configuring a corresponding communication resource for the first sidelink. Otherwise, the RAN sends a configuration rejection message to the UE #1. The configuration rejection message is for rejecting configuration of the corresponding communication resource for the first sidelink.

Optionally, the configuration rejection message further indicates a cause why configuration of the corresponding communication resource for the first sidelink is rejected. The cause is that the UE #1 is not in the first geographic area.

Optionally, the method may further include the following step.

When the UE #1 is handed over from the RAN to a target RAN, the RAN sends the first proximity service key and the information about the corresponding first geographic area to the target RAN. Correspondingly, the target RAN receives the first proximity service key and the information about the corresponding first geographic area that are sent by the RAN.

In other words, if the UE #1 is handed over to a RAN due to movement or the like, the first proximity service key and the information about the corresponding first geographic area may be sent by a source RAN to the target RAN during handover. In this way, the target RAN may determine, based on whether the UE #1 is in the first geographic area, whether to continue to allocate, the UE #1, a communication resource corresponding to a new first sidelink.

In conclusion, according to the proximity service communication method provided in this application, the PCF may generate the first proximity service key based on the information about the first application and/or the information about the corresponding first geographic area that are/is provided by the AF. The PCF may provide the first proximity service key for the UE, and provide the first proximity service key and the information about the first geographic area for the RAN. When requesting, from the RAN, the communication resource for using the first application through a sidelink, the UE may carry the first proximity service key. The RAN determines, based on the information about the first geographic area corresponding to the first proximity service key, whether the UE is located in the first geographic area, so as to determine, based on a determining result, whether to allocate, to the UE, the communication resource for using the first application through the sidelink. This limits, at an application granularity, sidelink communication used by the UE.

The method 1000 differs from the method 800 in that a core network element does not need to monitor a location of the UE. This reduces operations of the core network. Further, in the method, the first proximity service key generated by the PCF at an application granularity can be sent to the UE along with policy information of the UE. In terms of operation, this is a static configuration. In the methods 800 and 900, configurations of the first proximity service discovery parameter are dynamical configurations. Therefore, the method 1000 can further reduce operation complexity and is easy to implement.

Figure 11A:
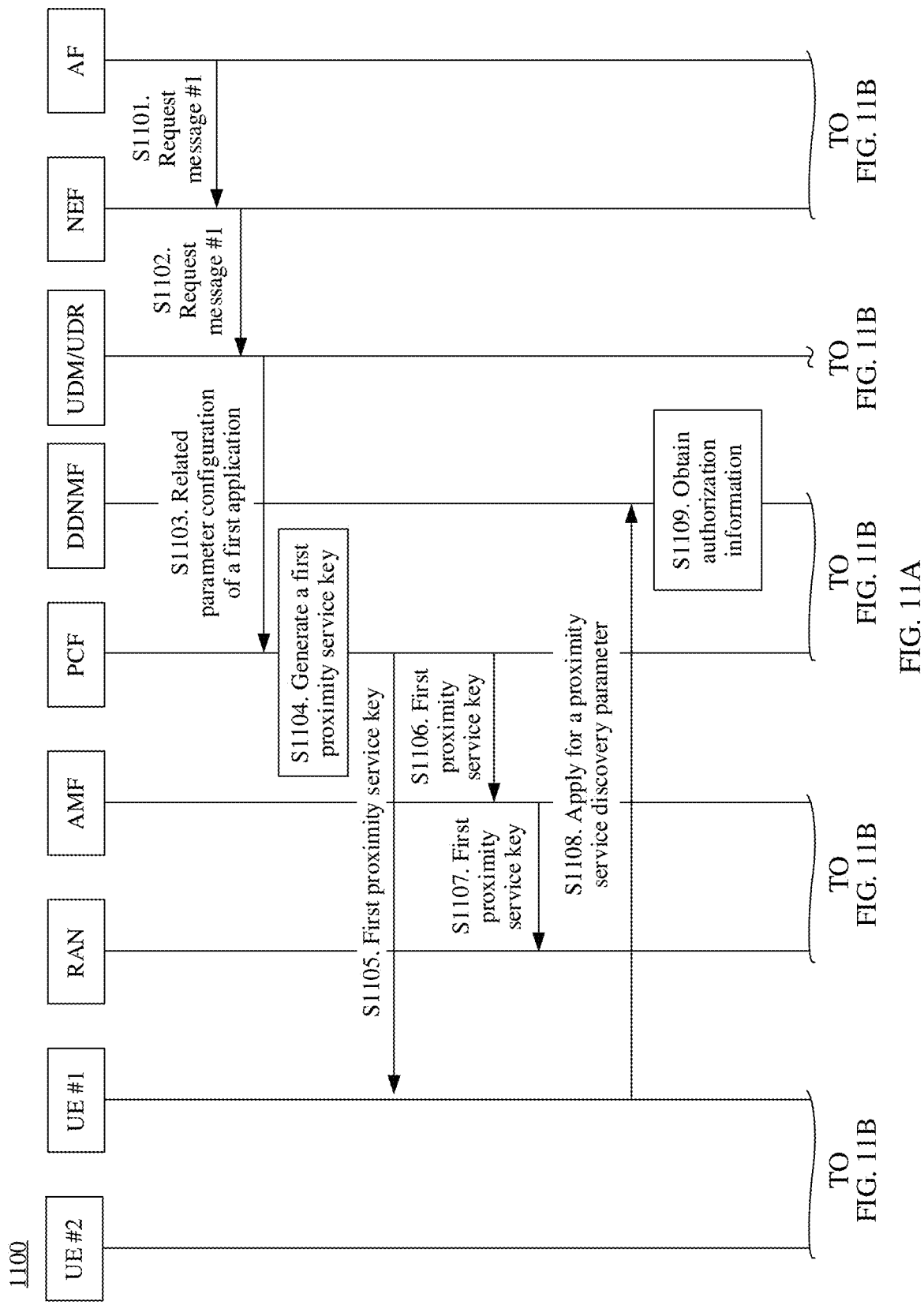
FIG. 11A and FIG. 11B are a schematic flowchart of a proximity service communication method according to this application.
Figure 11B:
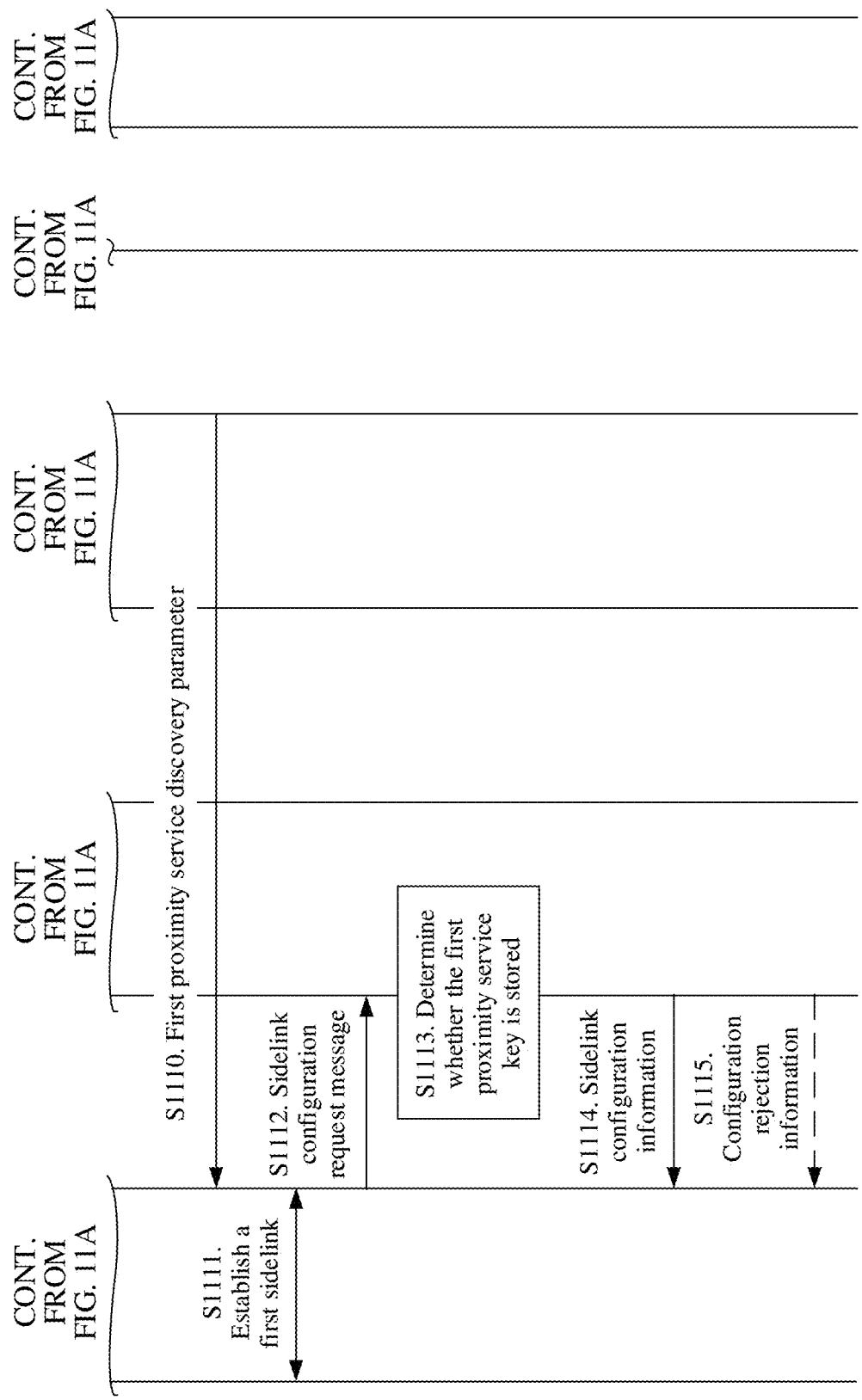

FIG. 11A and FIG. 11B are a schematic flowchart of a proximity service communication method according to this application. The method 1100 may be applied to the system 300 shown in FIG. 3. The method differs from the method 1000 in: In the method 1000, the AMF may send, to all connected RANs, the first proximity service key corresponding to the first application and the information about the corresponding first geographic area, and the RAN determines, based on the first proximity service key provided by the UE, whether the UE is in the corresponding first geographic area, so as to determine whether to allocate, to the UE, the communication resource for using the first application through a sidelink. However, in the method 1100, the AMF sends, to only a RAN located in the first geographic area, the first proximity service key corresponding to the first application, so that the RAN indirectly determines, based on whether the first proximity service key is stored, whether the UE is in the corresponding first geographic area, so as to determine whether to allocate, to the UE, the communication resource for using the first application through a sidelink.

- S1101 to S1106 are the same as steps S1001 to S1006 in the method 1000.
- S1107. The AMF sends the first proximity service key to at least one RAN. Correspondingly, the at least one RAN receives the first proximity service key sent by the AMF.

Optionally, the AMF may further send an identifier of the UE #1.

Optionally, the AMF may send the first proximity service key to the at least one RAN as a part of context of the UE #1.

The at least one RAN is located in the first geographic area. In other words, in S1107, the AMF may send the first proximity service key to the RAN located in the first geographic area.

- S1108 to S1112 are the same as S1008 to S1012 in the method 1000.
- S1113. The RAN determines whether the first proximity service key is stored.
- S1114. If the RAN stores the first proximity service key, the RAN sends sidelink configuration information to the UE #1. The sidelink configuration information is for configuring a corresponding communication resource for a first sidelink. Correspondingly, the UE #1 receives the sidelink configuration information sent by the RAN.
- S1115. If the RAN does not store the first proximity service key, the RAN sends a configuration rejection message to the UE #1. The configuration rejection message is for rejecting configuration of the corresponding communication resource for the first sidelink. Correspondingly, the UE #1 receives the configuration rejection message sent by the RAN.

If the RAN stores the first proximity service key, it indicates that the RAN is located in the first geographic area, and the UE #1 is also located in the first geographic area. Therefore, the RAN may configure, for the UE #1, the communication resource corresponding to the first sidelink, so that the UE #1 can use the first application with the UE #2 through the first sidelink.

If the RAN does not store the first proximity service key, it indicates that the RAN is not in the first geographic area, and the UE #1 is not in the first geographic area either. Therefore, the RAN may reject configuration of the communication resource corresponding to the first sidelink for the UE #1. In this case, the UE #1 cannot use the first application with the UE #2 through the first sidelink.

Optionally, the configuration rejection message further indicates a cause why configuration of the corresponding communication resource for the first sidelink is rejected, and the cause is that the UE #1 is not in the first geographic area.

Optionally, the method may further include the following step.

When the UE #1 is handed over from the RAN to a target RAN, if the target RAN is located in the first geographic area, the RAN sends the first proximity service key to the target RAN. Correspondingly, the target RAN receives the first proximity service key sent by the RAN.

In other words, if the UE #1 is handed over to a RAN due to movement or the like, if the target RAN is located in the first geographic area, the first proximity service key may be sent by a source RAN to the target RAN during handover. In this way, the target RAN may determine, based on whether the first proximity service key is stored, whether to continue to allocate, to the UE #1, a communication resource corresponding to a new first sidelink.

In conclusion, according to the proximity service communication method provided in this application, the PCF may generate the first proximity service key based on the proximity service discovery parameter of the first application and the information about the corresponding first geographic area that are provided by the AF. The PCF may provide the first proximity service key to the UE and the RAN located in the first geographic area. When requesting, from the RAN, the communication resource for using the first application through a sidelink, the UE may carry the first proximity service key. The RAN may determine, based on whether the first proximity service key is stored, whether the UE is located in the first geographic area, so as to determine, based on a determining result, whether to allocate, to the UE, the communication resource for using the first application through the sidelink. This limits, at an application granularity, sidelink communication by the UE.

The method 1100 differs from the methods 800 and 900 in that a core network element does not need to monitor a location of the UE. This reduces operations of the core network. Further, in the method, the first proximity service key generated by the PCF at an application granularity can be sent to the UE along with policy information of the UE. In terms of operation, this is a static configuration. In the methods 800 and 900, configurations of the first proximity service discovery parameter are dynamic configurations. Therefore, the method 1100 can further reduce operation complexity and is easy to implement.

Figure 12A:
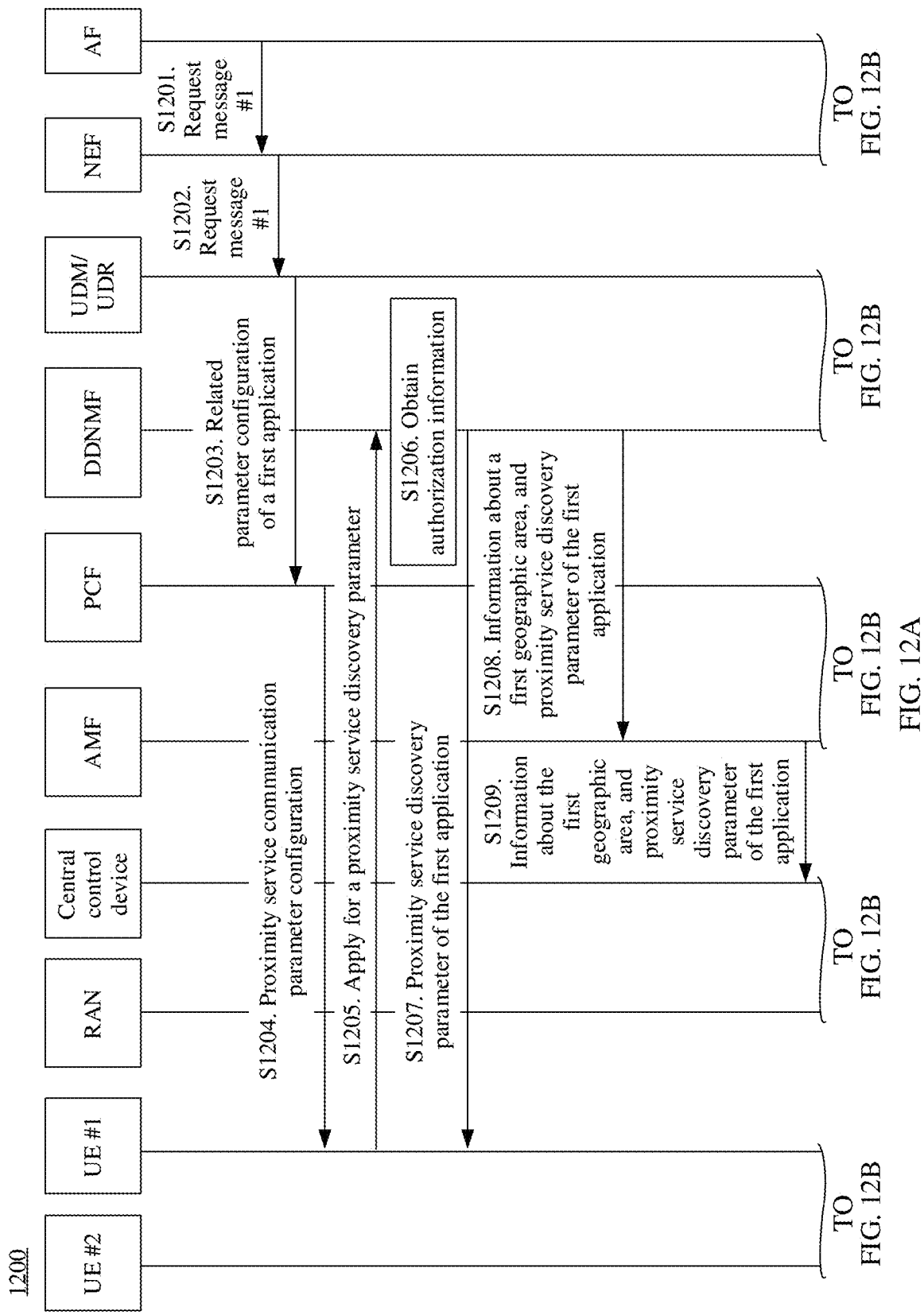
FIG. 12A and FIG. 12B are a schematic flowchart of a proximity service communication method according to this application.
Figure 12B:
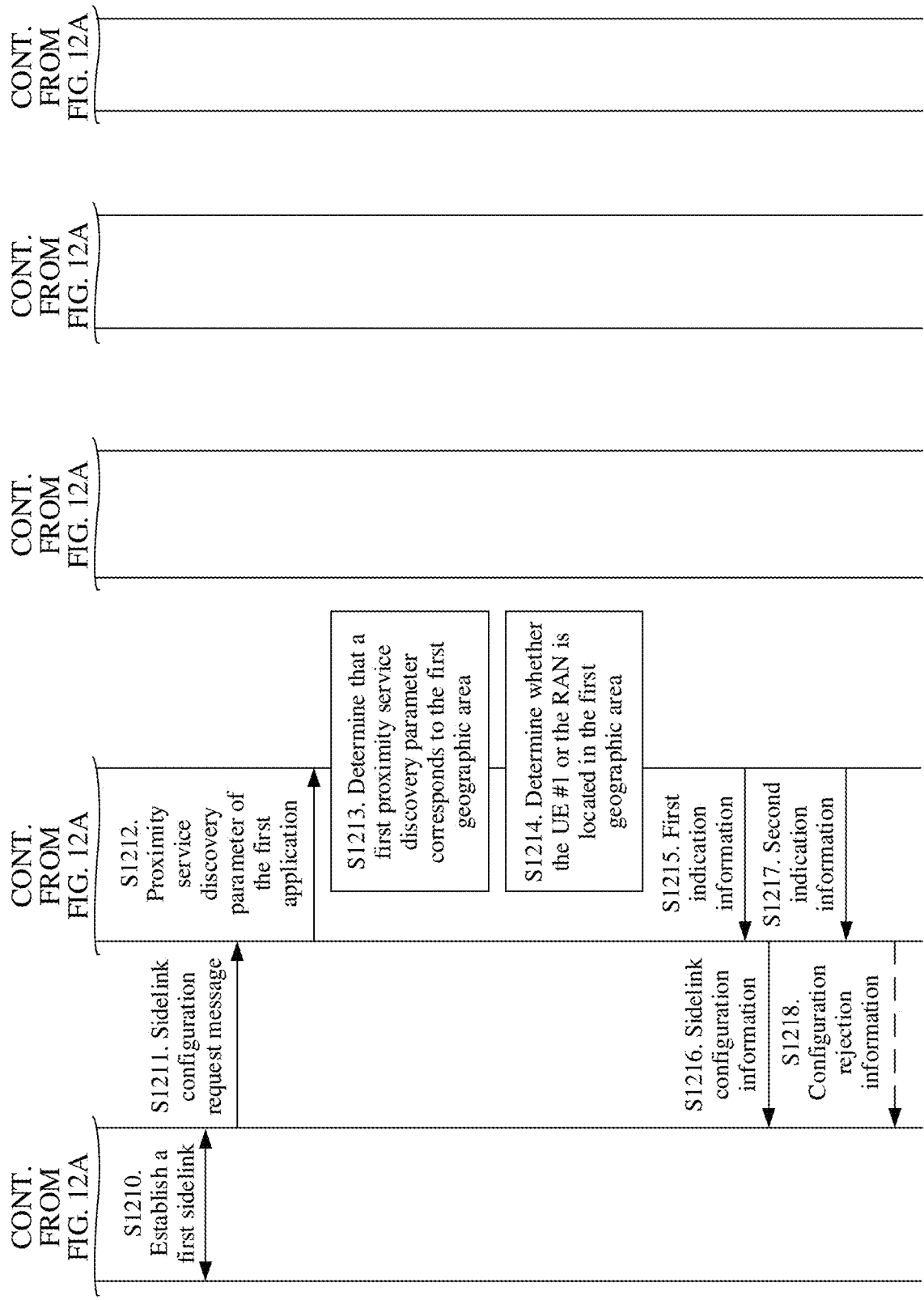

FIG. 12A and FIG. 12B are a schematic flowchart of a proximity service communication method according to this application. The method 1200 may be applied to the system 400 shown in FIG. 4.

- S1201 to S1208 are the same as S801 to S808 in the method 800.
- S1209. The AMF sends the information about the first geographic area and the proximity service discovery parameter of the first application to a central control device. Correspondingly, the central control device receives the information about the first geographic area and the proximity service discovery parameter of the first application that are sent by the AMF.

Optionally, the AMF may send the proximity service discovery parameter of the first application to the central control device as a part of context of the UE #1.

Step S1209 differs from the method S809 in that, the AMF herein sends the information about the first geographic area and the proximity service discovery parameter of the first application to the central control device, but sends the information about the first geographic area and the proximity service discovery parameter of the first application to the RAN in S809.

- S1210 and S1211 are the same as steps S810 and S811 in the method 800.

S1212. The RAN sends the first proximity service discovery parameter to the central control device. Correspondingly, the central control device receives the first proximity service discovery parameter sent by the RAN.

S1213. The central control device determines, based on a correspondence between a proximity service discovery parameter and information about a geographic area, that the first proximity service discovery parameter corresponds to the first geographic area.

Specifically, the central control device may store the correspondence that is between the proximity service discovery parameter and the information about the geographic area and that is sent by the AMF, for example, store a correspondence between the first proximity service discovery parameter and the information about the first geographic area. When receiving the first proximity service discovery parameter, the central control device may determine, based on the correspondence between the proximity service discovery parameter and the information about the geographic area, that the first proximity service discovery parameter corresponds to the first geographic area.

S1214. The central control device determines whether the UE #1 (or the RAN) is located in the first geographic area.

S1215. If the UE #1 (or the RAN) is located in the first geographic area, the central control device sends first indication information to the RAN. The first indication information indicates that the RAN is allowed to configure, for the UE #1, the communication resource corresponding to the first sidelink. Correspondingly, the RAN receives the first indication information sent by the central control device.

S1216. The RAN sends sidelink configuration information to the UE #1, where the sidelink configuration information is for configuring the corresponding communication resource for the first sidelink. Correspondingly, the UE #1 receives the sidelink configuration information sent by the RAN.

S1217. If the UE #1 (or the RAN) is not in the first geographic area, the central control device sends second indication information to the RAN. The second indication information indicates that the RAN is not allowed to configure, for the UE #1, the communication resource corresponding to the first sidelink. Correspondingly, the RAN receives the second indication information sent by the central control device.

S1218. The RAN sends a configuration rejection message to the UE #1, where the configuration rejection message is for rejecting configuration of the corresponding communication resource for the first sidelink. Correspondingly, the UE #1 receives the configuration rejection message sent by the RAN.

Optionally, the configuration rejection message further indicates a cause why configuration of the corresponding communication resource for the first sidelink is rejected, and the cause is that the UE #1 is not in the first geographic area.

According to the proximity service communication method provided in this application, the DDNMF may provide the proximity service discovery parameter of the first application and the information about the corresponding first geographic area for the central control device by using the AMF. When requesting, from the RAN, the communication resource for using the first application through a sidelink, the UE may carry the first proximity service discovery parameter. The RAN may send the first proximity service discovery parameter to the central control device.

The central control device may determine, based on the information about the first geographic area corresponding to the first proximity service discovery parameter, whether the UE or the RAN is located in the first geographic area, so as to determine, based on a determining result, whether to allocate, to the UE, the communication resource for using the first application through the sidelink. This limits, at an application granularity, sidelink communication used by the UE.

Figure 13A:
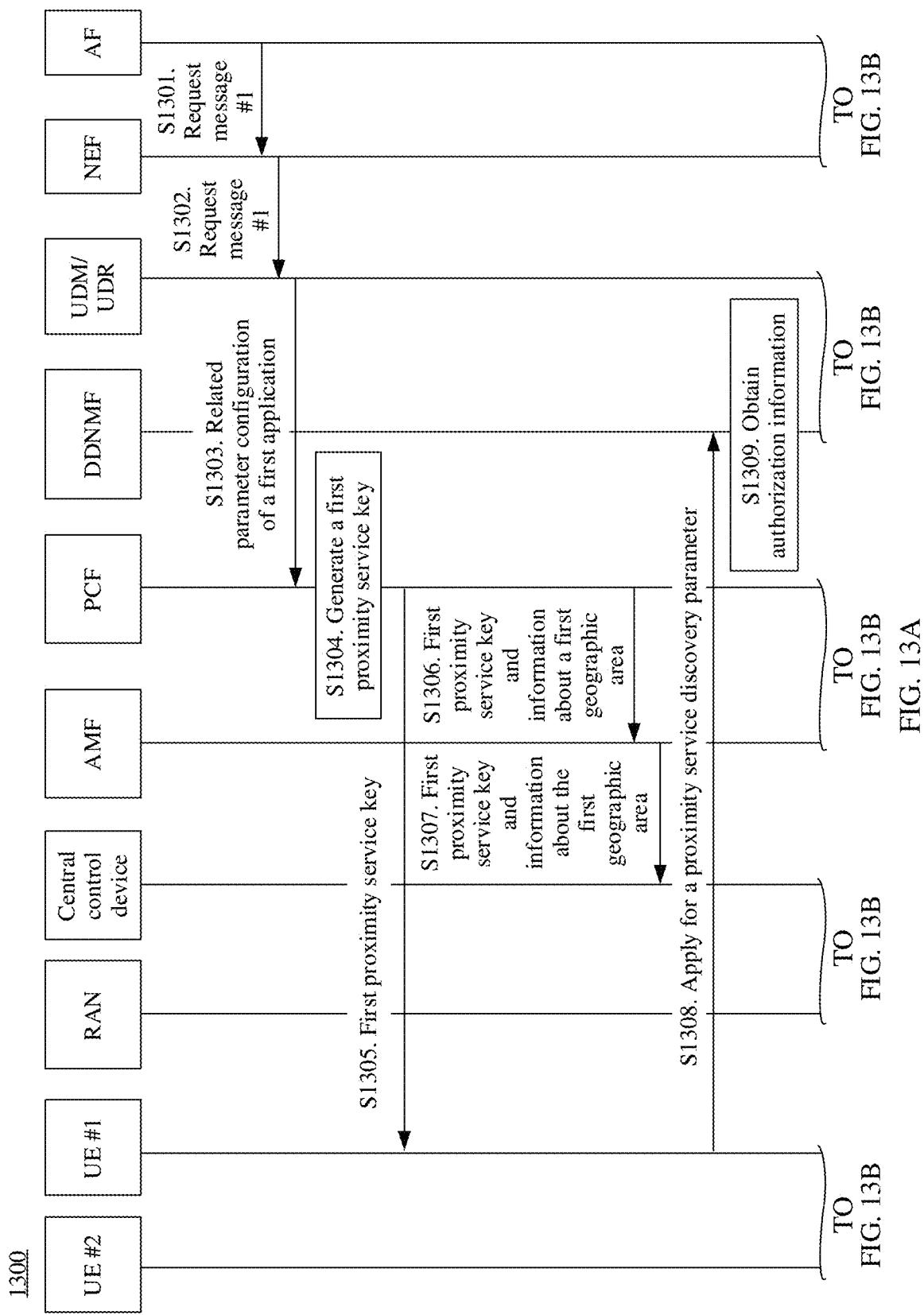
FIG. 13A and FIG. 13B are a schematic flowchart of a proximity service communication method according to this application.
Figure 13B:
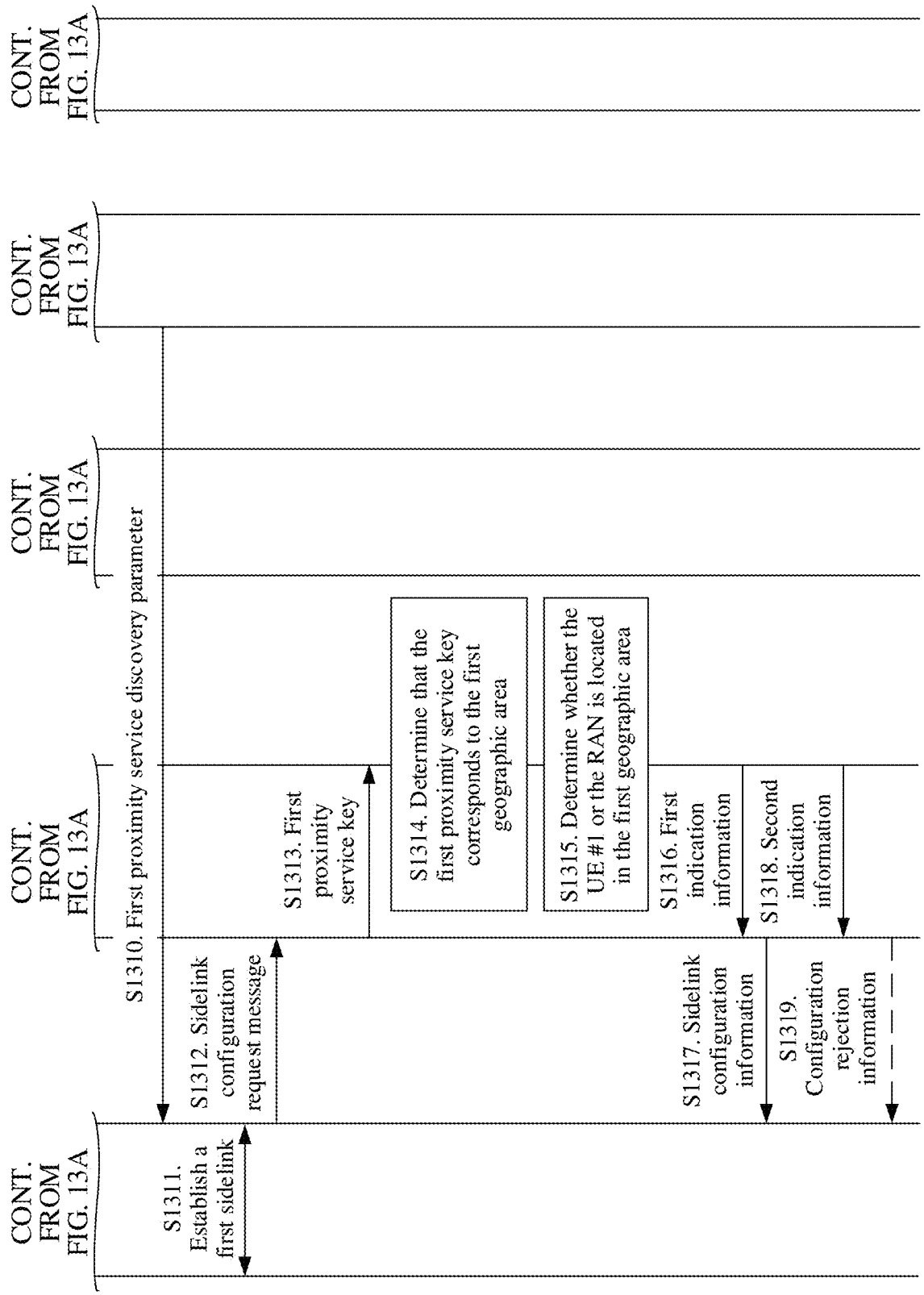

FIG. 13A and FIG. 13B are a schematic flowchart of a proximity service communication method according to this application. The method 1300 may be applied to the system 400 shown in FIG. 4.

S1301 to S1306 are the same as steps S1001 to S1006 in the method 1000.

S1307. The AMF sends the first proximity service key and the information about the first geographic area to a central control device. Correspondingly, the central control device receives the first proximity service key and the information about the first geographic area that are sent by the AMF.

Optionally, the AMF may send the first proximity service key as a part of context of the UE #1 to the central control device.

Step S1307 differs from the method S1007 in that the AMF herein sends the information about the first geographic area and the first proximity service key to the central control device, but sends the information about the first geographic area and the first proximity service key to the RAN in S1007.

S1308 to S1312 are the same as steps S1008 to S1012 in the method 1000.

In other words, the UE #1 establishes a first sidelink with the UE #2. After establishing the first sidelink, the UE #1 sends a sidelink configuration request message to the RAN, where the sidelink configuration request message includes the first proximity service key.

S1313. The RAN sends the first proximity service key to the central control device. Correspondingly, the central control device receives the first proximity service key sent by the RAN.

S1314. The central control device determines, based on a correspondence between a proximity service key and information about a geographic area, that the first proximity service key corresponds to the first geographic area.

Specifically, the central control device may store the correspondence that is between the proximity service key and the information about the geographic area and that is sent by the AMF, for example, store a correspondence between the first proximity service key and the information about the first geographic area. When receiving the proximity service key, the central control device may determine, based on the correspondence between the proximity service key and the information about the geographic area, that the first proximity service key corresponds to the first geographic area.

S1315 to S1319 are the same as S1214 to S1218 in the method 1200.

In conclusion, according to the proximity service communication method provided in this application, the PCF may generate the first proximity service key based on the proximity service discovery parameter of the first application and the information about the corresponding first geographic area that are provided by the AF, and may provide the first proximity service key for the UE, and provide the first proximity service key and the information about the corresponding first geographic area for the central control device by using the AMF. When requesting, from the RAN, the communication resource for using the first application through a sidelink, the UE may carry the first proximity service key. The RAN may send the first proximity service key to the central control device. The central control device determines, based on the information about the first geographic area corresponding to the first proximity service key, whether the UE or the RAN is located in the first geographic area, so as to determine, based on a determining result, whether to allocate, to the UE, the communication resource for using the first application through the sidelink. This limits, at an application granularity, a sidelink used by the UE.

The methods provided in embodiments of this application are described above in detail with reference to FIG. 7A to FIG. 13B. Apparatuses provided in embodiments of this application are described below in detail with reference to FIG. 14 and FIG. 16.

Figure 14:
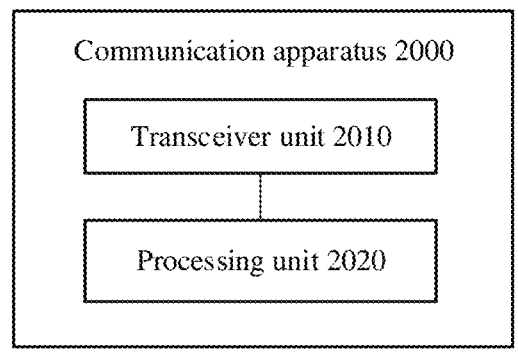
FIG. 14 is a schematic block diagram of a communication apparatus according to this application.

FIG. 14 is a schematic block diagram of a communication apparatus according to an embodiment of this application. As shown in FIG. 14, the communication apparatus 2000 may include a transceiver unit 2010 and/or a processing unit 2020.

The transceiver unit 2010 may be configured to send information to another apparatus or device, or receive information from another apparatus or device, for example, send or receive a proximity service discovery parameter of a first application. The processing unit 2020 may be configured to perform partial processing of the apparatus, for example, determine that the proximity service discovery parameter of the first application or a proximity service key corresponding to the first application corresponds to a first geographic area.

In an implementation, the communication apparatus 2000 corresponds to the management network element in the foregoing system or the DDNMF in the foregoing method embodiment. The communication apparatus 2000 may be a management network element (for example, the DDNMF) or a chip configured in the management network element, and may include units configured to perform operations performed by the management network element.

In an example, the communication apparatus 2000 corresponds to the management network element in the system 100 or the DDNMF in the method 700, and units in the communication apparatus 2000 are separately configured to implement operations performed by the management network element in the system 100 or operations performed by the DDNMF in the method 700.

Specifically, the transceiver unit 2010 is configured to: receive a request message from a terminal device, where the request message includes information about a first application, the request message requests a proximity service discovery parameter of the first application, and the proximity service discovery parameter is used by the terminal device to discover another terminal device that uses the first application; obtain information about a first geographic area in which the terminal device is allowed to use the first application through a sidelink, and location information of the terminal device; and when a geographic area indicated by the location information is located in the first geographic area, send the proximity service discovery parameter to the terminal device.

Optionally, the transceiver unit 2010 is further configured to: when the geographic area indicated by the location information is not in the first geographic area, send a response message to the terminal device, where the response message notifies the terminal device that the communication apparatus rejects allocation of the proximity service discovery parameter.

Optionally, the transceiver unit 2010 is further configured to: obtain first location indication information of the terminal device; and when the first location indication information indicates that the terminal device is not in the first geographic area, send a first update message to the terminal device, where the first update message notifies the terminal device that the proximity service discovery parameter becomes invalid.

Optionally, the transceiver unit 2010 is further configured to: receive second location indication information of the terminal device; and if the second location indication information indicates that the terminal device is located in the first geographic area, send a second update message to the terminal device, where the second update message is for allocating the proximity service discovery parameter.

Optionally, the transceiver unit 2010 is further configured to: receive sidelink information from the terminal device, where the sidelink information includes an identifier of a first sidelink established by the terminal device for the first application and information about the first application; and when the first location indication information of the terminal device indicates that the terminal device is not in the first geographic area, send first resource release indication information to an access network device, where the first resource release indication information includes the identifier of the first sidelink, the first resource release indication information is for releasing a resource for establishing the first sidelink, and/or the first resource release indication information indicates the access network device to release a communication resource corresponding to the first sidelink.

In another example, the communication apparatus 2000 corresponds to the management network element in the system 200, 300, or 400, or the DDNMF in any one of the methods 800 to 1300, and units in the communication apparatus 2000 are separately used to implement operations performed by the management network element in the corresponding systems or operations performed by the DDNMF in the corresponding methods.

Specifically, the transceiver unit 2010 is configured to receive a request message from a terminal device, where the request message requests a first proximity service discovery parameter, and the first proximity service discovery parameter is used by the terminal device to discover another terminal device that uses a first application. The processing unit 2020 is configured to generate the first proximity service discovery parameter based on the request message. The transceiver unit 2010 is further configured to obtain information about a corresponding first geographic area in which the terminal device is allowed to use the first application through a sidelink. The transceiver unit 2010 is further configured to send the first proximity service discovery parameter and the information about the first geographic area to a mobility management network element, and send the first proximity service discovery parameter to the terminal device.

In an implementation, the communication apparatus 2000 corresponds to the terminal device in the foregoing system or the UE in the foregoing method embodiment. The communication apparatus 2000 may be a terminal device (for example, UE) or a chip configured in the terminal device, and may include units configured to perform operations performed by the terminal device.

In an example, the communication apparatus 2000 corresponds to the terminal device in the system 100 or the UE in the method 700, and units in the communication apparatus 2000 are separately used to implement operations performed by the terminal device in the system 100 or operations performed by the UE in the method 700.

Specifically, the transceiver unit 2010 is configured to send a request message to a management network element, where the request message includes information about a first application, the request message requests a proximity service discovery parameter of the first application, and the proximity service discovery parameter is used by the terminal device to discover another terminal device that uses the first application. The transceiver unit 2010 is further configured to receive the proximity service discovery parameter from the management network element. The processing unit 2020 is configured to establish, based on the proximity service discovery parameter, a first sidelink with the another terminal device that uses the first application. The transceiver unit 2010 is further configured to obtain, from an access network device, a communication resource corresponding to the first sidelink. The transceiver unit 2010 is further configured to: when the terminal device is not in a first geographic area, receive a first update message from the management network element, where the first update message notifies the terminal device that the proximity service discovery parameter becomes invalid, and the first geographic area is a geographic area in which the terminal device is allowed to use the first application through a sidelink.

Optionally, the transceiver unit 2010 is further configured to: when the terminal device returns to the first geographic area again, receive a second update message from the management network element, where the second update message is for allocating the proximity service discovery parameter.

Optionally, the transceiver unit 2010 is further configured to send sidelink information to the management network element, where the sidelink information includes an identifier of the first sidelink and information about the first application.

Optionally, the transceiver unit 2010 is specifically configured to: send a sidelink configuration request message to the access network device, where the sidelink configuration request message includes the identifier of the first sidelink, and the sidelink configuration request message requests the access network device to configure, for the terminal device, the communication resource corresponding to the first sidelink; and receive a sidelink configuration response message from the access network device, where the sidelink configuration response message is for configuring the communication resource corresponding to the first sidelink.

Optionally, the transceiver unit 2010 is further configured to receive second resource release indication information from the access network device, where the second resource release indication information indicates the terminal device to release the communication resource corresponding to the first sidelink.

It should be understood that the communication apparatus 2000 may further correspond to the terminal device in any one of the systems 200 to 400 or the UE in any one of the methods 800 to 1300, and units in the communication apparatus 2000 are separately used to implement operations performed by the terminal device in the corresponding systems or operations performed by the UE in the corresponding methods. For details, refer to the foregoing descriptions of the corresponding systems or methods. Details are not described herein again.

In an implementation, the communication apparatus 2000 corresponds to the access network device in the foregoing systems or the RAN in the method embodiments. The communication apparatus 2000 may be an access network device (for example, UE) or a chip configured in the access network device, and may include units configured to perform operations performed by the access network device.

In an example, the communication apparatus 2000 corresponds to the access network device in the system 200 or 300, or the RAN in any one of the methods 800 to 1000, and units in the communication apparatus 2000 are separately used to implement operations performed by the access network device in the corresponding systems or operations performed by the RAN in the corresponding methods.

For example, the transceiver unit 2010 is configured to receive a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink. The processing unit 2020 is configured to determine, based on a correspondence between proximity service information and information about a geographic area, that the first proximity service information corresponds to the first geographic area. The transceiver unit 2010 is further configured to: when the terminal device is located in the first geographic area, send sidelink configuration information to the terminal device, where the sidelink configuration information is for configuring a corresponding communication resource for the first sidelink, or when the terminal device is not located in the first geographic area, send a configuration rejection message to the terminal device, where the configuration rejection message is for rejecting configuration of the corresponding communication resource for the first sidelink.

Optionally, the transceiver unit 2010 is further configured to receive the first proximity service discovery parameter and the information about the first geographic area from a mobility management network element, or receive the first proximity service key and the information about the first geographic area from a policy control network element. The first proximity service discovery parameter and the information about the first geographic area from the mobility management network element are sent by a management network element. The first proximity service key from the policy control network element is generated by the policy control network element based on the information about the first application and the information about the first geographic area that are from the application network element.

Optionally, the configuration rejection message further indicates a cause why configuration of the corresponding communication resource for the first sidelink is rejected.

Optionally, when the terminal device is handed over from the communication apparatus 2000 to a target access network device, the transceiver unit 2010 is further configured to send the first proximity service information and the information about the first geographic area to the target access network device.

Optionally, the first proximity service information and the information about the first geographic area are a part of context of the terminal device.

For another example, the transceiver unit 2010 is configured to: receive a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on the information about the first application and information about a first geographic area in which the terminal device is allowed to use the first application through a sidelink; and when the communication apparatus 2000 stores the first proximity service information, send sidelink configuration information to the terminal device, where the sidelink configuration information is for configuring a communication resource corresponding to the first sidelink, or when the communication apparatus 2000 does not store the first proximity service information, send a configuration rejection message to the terminal device, where the configuration rejection message is for rejecting configuration of the corresponding communication resource for the first sidelink.

Optionally, when the communication apparatus 2000 stores the first proximity service information, the transceiver unit 2010 is further configured to: receive the first proximity service discovery parameter from a mobility management network element, or receive the first proximity service key from a policy control network element. The first proximity service discovery parameter from the mobility management network element is sent by a management network element. The first proximity service key from the policy control network element is generated by the policy control network element based on the information about the first application and the information about the first geographic area that are from the application network element.

Optionally, the configuration rejection message further indicates a cause why configuration of the corresponding communication resource for the first sidelink is rejected.

Optionally, when the terminal device is handed over from the communication apparatus 2000 to a target access network device, the transceiver unit 2010 is further configured to: if the target access network device is located in the first geographic area, send the first proximity service information to the target access network device.

Optionally, the first proximity service information is a part of context of the terminal device.

In an example, the communication apparatus 2000 corresponds to the access network device in the system 400 or the RAN in the method 1200 or 1300, and units in the communication apparatus 2000 are separately used to implement operations performed by the access network device in the corresponding systems or operations performed by the RAN in the corresponding methods.

Specifically, the transceiver unit 1210 is configured to: receive a sidelink configuration request message from a terminal device, where the sidelink configuration request message requests a communication resource corresponding to a first sidelink, the first sidelink is a sidelink established by the terminal device for a first application, the sidelink configuration request message includes first proximity service information, the first proximity service information is a first proximity service discovery parameter or a first proximity service key, the first proximity service discovery parameter is used by the terminal device to discover another terminal device that uses the first application, and the first proximity service key is generated based on information about the first application and information about a first geographic area in which the terminal device is allowed to use the first application through a sidelink; send the first proximity service information to a central control device; receive first indication information or second indication information from the central control device, where the first indication information indicates that the communication apparatus 2000 is allowed to configure the communication resource corresponding to the first sidelink for the terminal device, and the second indication information indicates that the communication apparatus 2000 is not allowed to configure the communication resource corresponding to the first sidelink for the terminal device; and send sidelink configuration information to the terminal device based on the first indication information, where the sidelink configuration information is for configuring the corresponding communication resource for the first sidelink, or send a configuration rejection message to the terminal device based on the second indication information, where the configuration rejection message is for rejecting configuration of the corresponding communication resource for the first sidelink.

Optionally, the configuration rejection message further indicates a cause why configuration of the corresponding communication resource for the first sidelink is rejected.

In an implementation, the communication apparatus 2000 corresponds to the central control device in the system 400, or the method 1200 or 1300, and units in the communication apparatus 2000 are separately used to implement operations performed by the central control device in the corresponding systems or methods.

Specifically, the transceiver unit 1210 is configured to receive first proximity service information from an access network device, where the first proximity service information is a first proximity service discovery parameter or a first proximity service key, the first proximity service discovery parameter is used by a terminal device to discover another terminal device that uses a first application, and the first proximity service key is generated based on information about the first application and information about a first geographic area in which the terminal device is allowed to use the first application through a sidelink.

The processing unit 1220 is configured to determine, based on a correspondence between proximity service information and information about a geographic area, that the first proximity service information corresponds to the first geographic area.

The transceiver unit 1210 is further configured to: when the access network device is located in the first geographic area, send first indication information to the access network device, where the first indication information indicates that the access network device is allowed to configure the communication resource corresponding to the first sidelink for the terminal device, and the first sidelink is a sidelink established by the terminal device for the first application, or when the access network device is not in the first geographic area, send second indication information to the access network device, where the second indication information indicates that the access network device is not allowed to configure the communication resource corresponding to the first sidelink for the terminal device.

Optionally, the transceiver unit 2010 is further configured to receive the first proximity service discovery parameter and the information about the first geographic area from a mobility management network element, or receive the first proximity service key and the information about the first geographic area from a policy control network element. The first proximity service discovery parameter and the information about the first geographic area from the mobility management network element are sent by a management network element. The first proximity service key from the policy control network element is generated by the policy control network element based on the information about the first application and the information about the first geographic area that are from the application network element.

Optionally, the first proximity service information and the corresponding first area information are a part of context of the terminal device.

It should be understood that the communication apparatus 2000 may further perform operations performed by any other network element in the systems 100 to 400 and the methods 700 to 1300. For details, refer to descriptions of corresponding systems or methods. Details are not described herein again.

It should be understood that a specific process in which the units perform the foregoing corresponding steps is described in detail in the foregoing method embodiments, and for brevity, details are not described herein.

It should be further understood that the transceiver unit 2010 in the communication apparatus 2000 may correspond to the transceiver 503 in the communication apparatus 600 shown in FIG. 6, and the processing unit 2020 in the communication apparatus 2000 may correspond to the processor 501 in the communication apparatus 600 shown in FIG. 6.

Figure 15:
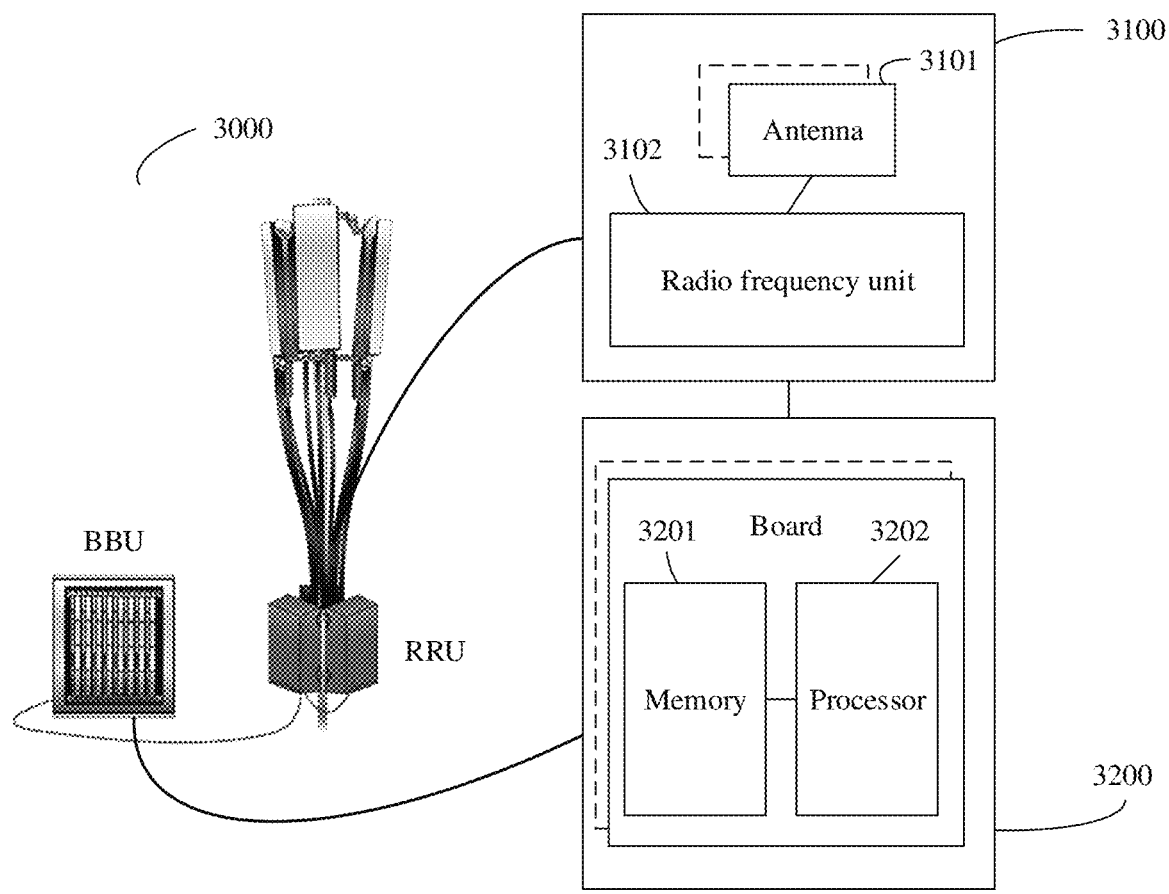
FIG. 15 is a schematic block diagram of an access network device according to this application.

It should also be understood that, when the communication apparatus 2000 is an access network device, the transceiver unit 2010 in the communication apparatus may correspond to an RRU 3100 in the access network device 2000 shown in FIG. 15, and the processing unit 2020 in the communication apparatus may correspond to a BBU 3200 in the access network device 2000 shown in FIG. 15. When the communication apparatus 2000 is a chip configured in the access network device, the transceiver unit 2010 in the communication apparatus may be an input/output interface.

Figure 16:
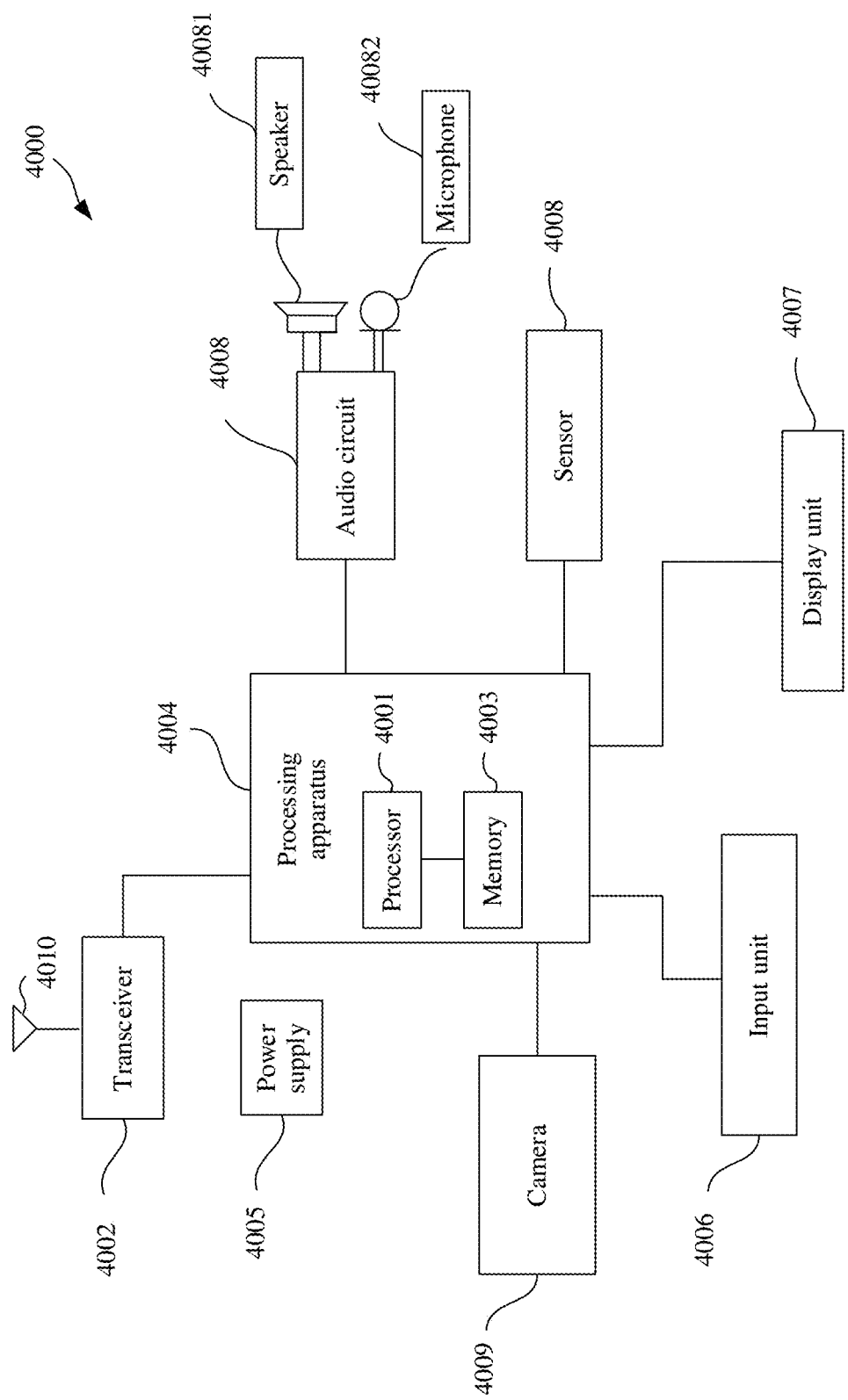
FIG. 16 is a schematic block diagram of a terminal device according to this application.

It should be further understood that when the communication apparatus 2000 is a terminal device, the transceiver unit 2010 in the communication apparatus 2000 may correspond to a transceiver 4002 in the terminal device 4000 shown in FIG. 16, and the processing unit 2020 in the communication apparatus 2000 may correspond to the processor 4001 in the terminal device 4000 shown in FIG. 16.

FIG. 15 is a schematic structural diagram of an access network device according to an embodiment of this application, for example, a schematic structural diagram of a base station. The access network device 3000 may perform functions of the access network device in the foregoing systems or the RAN in the method embodiments. As shown in the figure, the access network device 3000 may include one or more radio frequency units, for example, a remote radio unit (RRU) 3100 and one or more baseband units (BBUs) (which may also be referred to as distributed units (DUs)) 3200. The RRU 3100 may be referred to as a transceiver unit or a communication unit, and corresponds to the transceiver unit 2010 in FIG. 14. Optionally, the transceiver unit 3100 may also be referred to as a transceiver, a transceiver circuit, or the like, and may include at least one antenna 3101 and a radio frequency unit 3102. Optionally, the transceiver unit 3100 may include a receiving unit and a sending unit. The receiving unit may correspond to a receiver (or referred to as a receiver circuit), and the sending unit may correspond to a transmitter (or referred to as a transmitter circuit). The RRU 3100 is mainly configured to receive and send radio frequency signals and perform conversion between a radio frequency signal and a baseband signal. The BBU 3200 part is mainly configured to: perform baseband processing, control the base station, and so on. The RRU 3100 and the BBU 3200 may be physically configured together, or may be physically configured separately, in other words, in a distributed base station.

The BBU 3200 is a control center of the base station, or may be referred to as a processing unit. The BBU 3200 may correspond to the processing unit 2020 in FIG. 14, and is mainly configured to implement baseband processing functions, for example, channel coding, multiplexing, modulation, and spreading. For example, the BBU (the processing unit) may be configured to control the base station to perform operation procedures related to the access network device in the foregoing method embodiments.

In an example, the BBU 3200 may include one or more boards, and a plurality of boards may jointly support a radio access network (such as an LTE network) having a single access standard, or may separately support radio access networks (for example, an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure related to the access network device in the foregoing method embodiments. The memory 3201 and the processor 3202 may serve one or more boards. In other words, a memory and a processor may be disposed on each board. Alternatively, a plurality of boards may share a same memory and a same processor. In addition, a necessary circuit may further be disposed on each board.

It should be understood that the access network device 3000 shown in FIG. 15 can implement the processes related to the access network device in the foregoing method embodiments. Operations or functions of modules in the access network device 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the access network device and that is described in the foregoing method embodiments, and the RRU 3100 may be configured to perform sending and receiving actions of the access network device that are described in the foregoing method embodiments. For details, refer to the descriptions in the foregoing method embodiments. Details are not described herein again.

FIG. 16 is a schematic structural diagram of a terminal device 4000 according to an embodiment of this application. As shown in the figure, the terminal device 4000 includes a processor 4001 and a transceiver 4002. Optionally, the terminal device 4000 may further include a memory 4003. The processor 4001, the transceiver 4002, and the memory 4003 may communicate with each other through an internal connection path, to transfer a control signal and/or a data signal. The memory 4003 is configured to store a computer program. The processor 4001 is configured to invoke the computer program from the memory 4003 and run the computer program, to control the transceiver 4002 to send and receive a signal.

The processor 4001 and the memory 4003 may be integrated into one processing apparatus 4004. The processor 4001 is configured to execute program code stored in the memory 4003, to implement the foregoing functions. It should be understood that the processing apparatus 4004 shown in the figure is merely an example. During specific implementation, the memory 4003 may alternatively be integrated into the processor 4001, or may be independent of the processor 4001. This is not limited in this application.

The terminal device 4000 may further include an antenna 4010, configured to send, by using a radio signal, uplink data or uplink control signaling output by the transceiver 4002.

It should be understood that, the terminal device 4000 shown in FIG. 16 can implement processes related to the terminal device in the foregoing method embodiments. Operations or functions of modules in the terminal device 4000 are separately intended to implement corresponding procedures in the foregoing method embodiments. For details, refer to the descriptions in the foregoing method embodiments. To avoid repetition, detailed descriptions are properly omitted herein.

Optionally, the terminal device 4000 may further include a power supply 4005, configured to supply power to various components or circuits in the terminal device.

In addition, to improve functions of the terminal device, the terminal device 4000 may further include one or more of an input unit 4006, a display unit 4007, an audio circuit 4008, a camera 4009, a sensor 4008, and the like, where the audio circuit may further include a speaker 40081, a microphone 40082, and the like.

It should be understood that the processing apparatus 4004 or the processor 4001 may be a chip. For example, the processing apparatus 4004 or the processor 4001 may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processor (digital signal processor, DSP), may be a micro controller unit (MCU), or may be a programmable controller (PLD) or another integrated chip. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory 4003 may be a volatile memory or a nonvolatile memory, or may include both a volatile memory and a non-volatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that the memory of the systems and methods described in this specification includes but is not limited to these and any memory of another proper type.

Based on the methods provided in embodiments of this application, this application further provides a computer program product. The computer program product includes computer program code. When the computer program code is run on a computer, the computer is enabled to perform the method of any network element (for example, UE, RAN, DDNMF, PCF, AMF, or AF) in any one of the foregoing method embodiments.

According to the methods provided in embodiments of this application, this application further provides a computer-readable storage medium. The computer-readable medium stores program code. When the program code is run on a computer, the computer is enabled to perform the method of any network element in any one of the foregoing method embodiments.

According to the methods provided in embodiments of this application, this application further provides a system, including one or more of the following: a terminal device, an access network device, a policy control network element, a mobility management network element, and a management network element. Optionally, the system may further include a central control device.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processor (DSP), may be a micro controller unit (MCU), or may be a programmable controller (PLD) or another integrated chip. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers "first", "second", and the like are merely used to distinguish between different objects, for example, to distinguish between different network devices, and do not constitute any limitation on the scope of embodiments of this application. Embodiments of this application are not limited thereto.

It should be further understood that, in this application, both "when" and "if" mean that a network element performs corresponding processing in an objective situation, but do not constitute any limitation on time, do not require the network element to perform a determining action during implementation, and do not mean other limitations either.

It should be further understood that, in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression in this application similar to an expression "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform all or a part of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A proximity service communication method, comprising:
receiving, by a management network element device, a request message from a terminal device, wherein the request message comprises information about a first application, the request message requests a proximity service discovery parameter of the first application, and the proximity service discovery parameter is to be used by the terminal device to discover another terminal device that uses the first application;
obtaining, by the management network element device, information about a first geographic area in which the terminal device is allowed to use the first application through a sidelink, and
location information of the terminal device;
in response to a geographic area indicated by the location information located in the first geographic area, sending, by the management network element device, the proximity service discovery parameter to the terminal device;
obtaining, by the management network element device, first location indication information of the terminal device; and
in response to the first location indication information indicating that the terminal device is not in the first geographic area, sending, by the management network element device, a first update message to the terminal device, wherein the first update message notifies the terminal device that the proximity service discovery parameter becomes invalid.

2. The method according to claim 1, wherein the method further comprises:
in response to the geographic area indicated by the location information not in the first geographic area, sending, by the management network element device, a response message to the terminal device, wherein the response message notifies the terminal device that the management network element device rejects allocation of the proximity service discovery parameter.

3. The method according to claim 1, wherein the first update message further notifies a cause why the proximity service discovery parameter becomes invalid.

4. The method according to claim 1, wherein the method further comprises:

receiving, by the management network element device, second location indication information of the terminal device; and in response to the second location indication information indicating that the terminal device is located in the first geographic area, sending, by the management network element device, a second update message to the terminal device, wherein the second update message is for allocating the proximity service discovery parameter.

5. The method according to claim 1, wherein before the sending the first update message to the terminal device, the method further comprises:

receiving, by the management network element device, sidelink information from the terminal device, wherein the sidelink information comprises:
an identifier of a first sidelink established by the terminal device for the first application, and
information about the first application; and in response to the first location indication information of the terminal device indicating that the terminal device is not in the first geographic area, the method further comprises:

sending, by the management network element device, first resource release indication information to an access network device, wherein the first resource release indication information comprises the identifier of the first sidelink, the first resource release indication information is for releasing a resource for establishing the first sidelink, and/or the first resource release indication information indicates the access network device to release a communication resource corresponding to the first sidelink.

6. A proximity service communication method, comprising:

sending, by a terminal device, a request message to a management network element device, wherein the request message comprises information about a first application, the request message requests a proximity service discovery parameter of the first application, and the proximity service discovery parameter is to be used by the terminal device to discover another terminal device that uses the first application;

receiving, by the terminal device, the proximity service discovery parameter from the management network element device;

establishing, by the terminal device based on the proximity service discovery parameter, a first sidelink with the another terminal device that uses the first application, and obtaining, by the terminal device from an access network device, a communication resource corresponding to the first sidelink; and in response to the terminal device not in a first geographic area, receiving, by the terminal device, a first update message from the management network element device, wherein the first update message notifies the terminal device that the proximity service discovery parameter becomes invalid, and the first geographic area is a geographic area in which the terminal device is allowed to use the first application through a sidelink.

7. The method according to claim 6, wherein the first update message further notifies a cause why the proximity service discovery parameter becomes invalid.

8. The method according to claim 6, wherein the method further comprises:

in response to the terminal device located in the first geographic area again, receiving, by the terminal device, a second update message from the management network element device, wherein the second update message is for allocating the proximity service discovery parameter.

9. The method according to claim 6, wherein before the receiving the first update message from the management network element device, the method further comprises:

sending, by the terminal device, sidelink information to the management network element device, wherein the sidelink information comprises an identifier of the first sidelink and information about the first application.

10. The method according to claim 6, wherein the obtaining the communication resource corresponding to the first sidelink comprises:

sending, by the terminal device, a sidelink configuration request message to the access network device, wherein the sidelink configuration request message comprises an identifier of the first sidelink, and the sidelink configuration request message requests the access network device to configure, for the terminal device, the communication resource corresponding to the first sidelink; and receiving, by the terminal device, a sidelink configuration response message from the access network device, wherein the sidelink configuration response message is for configuring the communication resource corresponding to the first sidelink.

11. The method according to claim 10, wherein the method further comprises:

receiving, by the terminal device, second resource release indication information from the access network device, wherein the second resource release indication information indicates the terminal device to release the communication resource corresponding to the first sidelink.

12. A communication apparatus, comprising:
at least one processor; and
one or more memories coupled to the at least one processor and storing programming instructions for execution by the at least one processor to cause the communication apparatus to perform operations comprising:

receiving a request message from a terminal device, wherein the request message comprises information about a first application, the request message requests a proximity service discovery parameter of the first application, and the proximity service discovery parameter is to be used by the terminal device to discover another terminal device that uses the first application;

obtaining (i) information about a first geographic area in which the terminal device is allowed to use the first application through a sidelink and (ii) location information of the terminal device;

in response to a geographic area indicated by the location information located in the first geographic area, sending the proximity service discovery parameter to the terminal device; and in response to the geographic area indicated by the location information not in the first geographic area, sending a response message to the terminal device, wherein the response message notifies the terminal device that the communication apparatus rejects allocation of the proximity service discovery parameter.

13. The communication apparatus according to claim 12, wherein the operations further comprise:

obtaining first location indication information of the terminal device; and in response to the first location indication information indicating that the terminal device is not in the first geographic area, sending a first update message to the terminal device, wherein the first update message notifies the terminal device that the proximity service discovery parameter becomes invalid.

14. The communication apparatus according to claim 13, wherein the operations further comprise:
   receiving second location indication information of the terminal device; and
   in response to the second location indication information indicating that the terminal device is located in the first geographic area, sending a second update message to the terminal device, wherein the second update message is for allocating the proximity service discovery parameter.

15. A terminal device, comprising:
   at least one processor; and
   one or more memories coupled to the at least one processor and storing programming instructions for execution by the at least one processor to cause the terminal device to perform operations comprising:
   sending a request message to a management network element device, wherein the request message comprises information about a first application, the request message requests a proximity service discovery parameter of the first application, and the proximity service discovery parameter is to be used by the terminal device to discover another terminal device that uses the first application;
   receiving the proximity service discovery parameter from the management network element device;
   establishing, based on the proximity service discovery parameter, a first sidelink with the another terminal device that uses the first application, and obtaining, from an access network device, a communication resource corresponding to the first sidelink; and
   in response to the terminal device not in a first geographic area, receiving a first update message from the management network element device, wherein the first update message notifies the terminal device that the proximity service discovery parameter becomes invalid, and the first geographic area is a geographic area in which the terminal device is allowed to use the first application through a sidelink.

16. The terminal device according to claim 15, wherein the operations further comprise:
   in response to the terminal device located in the first geographic area again, receiving a second update message from the management network element device, wherein the second update message is for allocating the proximity service discovery parameter.

17. The terminal device according to claim 15, wherein the operations further comprise:
   sending sidelink information to the management network element device, wherein the sidelink information comprises an identifier of the first sidelink and information about the first application.

18. The terminal device according to claim 15, wherein the operations further comprise:
   sending a sidelink configuration request message to the access network device, wherein the sidelink configuration request message comprises an identifier of the first sidelink, and the sidelink configuration request message requests the access network device to configure, for the terminal device, the communication resource corresponding to the first sidelink; and
   receiving a sidelink configuration response message from the access network device, wherein the sidelink configuration response message is for configuring the communication resource corresponding to the first sidelink.

* * * * *